United States Patent
Bahreinian et al.

(10) Patent No.: US 12,402,631 B2
(45) Date of Patent: Sep. 2, 2025

(54) OVEN

(71) Applicant: NewAge Products Inc., Toronto (CA)

(72) Inventors: Hessam Bahreinian, Newmarket (CA); Robert Vandenham, Woodbridge (CA)

(73) Assignee: NewAge Products Inc., Toronto (CA)

( * ) Notice: Subject to any disclaimer, the term of this patent is extended or adjusted under 35 U.S.C. 154(b) by 1030 days.

(21) Appl. No.: 17/469,226

(22) Filed: Sep. 8, 2021

(65) Prior Publication Data
US 2023/0074532 A1    Mar. 9, 2023

(51) Int. Cl.
| F24C 15/32 | (2006.01) |
| A21B 1/10  | (2006.01) |
| A21B 1/26  | (2006.01) |
| F24C 15/02 | (2006.01) |
| F24C 15/24 | (2006.01) |
| F24C 15/34 | (2006.01) |
| F24C 15/36 | (2006.01) |

(52) U.S. Cl.
CPC .................. *A21B 1/10* (2013.01); *A21B 1/26* (2013.01); *F24C 15/24* (2013.01); *F24C 15/32* (2013.01); *F24C 15/34* (2013.01); *F24C 15/36* (2013.01); *F24C 15/02* (2013.01)

(58) Field of Classification Search
USPC ........................................ D7/348; 126/273.5
See application file for complete search history.

(56) References Cited

U.S. PATENT DOCUMENTS

| D182,222 | S | * | 3/1958  | Best    | 126/25 R   |
| 4,095,586 | A | * | 6/1978 | Selva   | A21B 1/04  |
|           |   |   |         |         | 126/273 R  |
| D286,812 | S | * | 11/1986 | Rennels | D23/346    |
| 4,706,832 | A | * | 11/1987 | Citino  | A21B 3/15  |
|           |   |   |         |         | 99/422     |
| 5,241,947 | A | * | 9/1993  | Sandolo | A21B 1/24  |
|           |   |   |         |         | 126/273 R  |

(Continued)

FOREIGN PATENT DOCUMENTS

| DE | 102011084571 A1 | 4/2013 |
| DE | 102011088084 A1 | 6/2013 |

(Continued)

OTHER PUBLICATIONS

FR_3044517_A1.*

(Continued)

*Primary Examiner* — Jorge A Pereiro
(74) *Attorney, Agent, or Firm* — Howard & Howard Attorneys PLLC

(57) ABSTRACT

An oven includes upper and lower assemblies, a fire box and a heat absorbing and emanating device. The upper assembly forms a cooking chamber and has a front side with an open entry to the cooking chamber. The lower assembly is located below the upper assembly and has an internal cavity. The fire box is located within the internal cavity and includes a heat source. The device is located between the upper and lower assemblies and absorbs heat from the heat source and emanates heat into the cooking chamber of the upper assembly. The upper assembly includes inner and outer dome assemblies. The inner dome is located within the outer dome and forms first and second airflow pathways.

22 Claims, 36 Drawing Sheets

(56) References Cited

U.S. PATENT DOCUMENTS

| | | | | |
|---|---|---|---|---|
| 5,315,922 A * | 5/1994 | Keller | A47J 36/06 | 99/422 |
| 5,334,242 A * | 8/1994 | O'Toole | C04B 14/42 | 106/737 |
| 5,347,977 A * | 9/1994 | Lehikoinen | F24B 1/26 | 126/1 D |
| 5,365,833 A * | 11/1994 | Chen | A47J 37/01 | D7/354 |
| 5,413,033 A * | 5/1995 | Riccio | F24B 1/207 | 126/21 R |
| 5,492,055 A * | 2/1996 | Nevin | A21B 1/26 | 99/341 |
| 5,605,092 A * | 2/1997 | Riccio | F24C 1/04 | 99/447 |
| 5,620,623 A * | 4/1997 | Baker | F24C 15/322 | 219/400 |
| 5,823,174 A * | 10/1998 | Andress | A47J 37/0718 | 126/25 R |
| 5,928,540 A * | 7/1999 | Antoine | F24C 15/006 | 219/757 |
| 6,000,388 A * | 12/1999 | Andress | A47J 37/0718 | 126/25 AA |
| 6,037,569 A * | 3/2000 | Lincoln | A21B 1/44 | 126/41 A |
| 6,038,964 A * | 3/2000 | Sikes | A47J 37/0704 | 99/473 |
| 6,041,769 A * | 3/2000 | Llodra, Jr. | F24C 3/027 | 126/41 R |
| 6,050,177 A * | 4/2000 | Lassig, Jr. | A47J 37/041 | 126/41 R |
| 6,073,623 A * | 6/2000 | Maschhoff | F21S 8/028 | 362/418 |
| 6,082,352 A * | 7/2000 | Hsu | A47J 37/0664 | 16/259 |
| 6,093,918 A * | 7/2000 | Sohn | H05B 6/6482 | 219/757 |
| 6,098,613 A * | 8/2000 | Wiersma | F24C 15/2007 | 126/21 R |
| 6,143,341 A | 11/2000 | Sikes | | |
| 6,153,858 A * | 11/2000 | Barnes | H05B 6/6444 | 219/492 |
| 6,172,338 B1 * | 1/2001 | Barnes | F24C 15/006 | 219/400 |
| 6,190,450 B1 * | 2/2001 | O'Toole | C04B 28/04 | 106/711 |
| 6,199,548 B1 * | 3/2001 | Hsu | F24C 15/023 | 126/41 R |
| 6,199,549 B1 * | 3/2001 | Yerkes | F24B 1/207 | 126/276 |
| 6,200,131 B1 * | 3/2001 | Birch | F23C 5/02 | 431/155 |
| 6,234,161 B1 * | 5/2001 | Levi | F24C 15/006 | 126/21 R |
| 6,414,278 B1 * | 7/2002 | Frohlich | F24C 7/06 | 219/428 |
| 6,425,388 B1 * | 7/2002 | Korinchock | A21B 1/28 | 126/41 R |
| 6,521,870 B2 * | 2/2003 | Nolan | H05B 6/6485 | 219/400 |
| 6,657,167 B2 | 12/2003 | Loveless | | |
| 6,681,758 B1 * | 1/2004 | Collard | A47J 37/0647 | 126/19 R |
| 6,745,758 B1 * | 6/2004 | Minidis | A21B 1/44 | 126/277 |
| 6,813,995 B1 * | 11/2004 | Sikes | A47J 37/0754 | 99/481 |
| 6,951,214 B2 * | 10/2005 | Beech | A21B 3/00 | 126/144 |
| 7,227,101 B2 * | 6/2007 | Harned | F24C 15/026 | 219/393 |
| D547,111 S * | 7/2007 | Loyd | D7/348 | |
| 7,267,544 B2 | 9/2007 | Spangrud | | |
| 7,296,565 B2 * | 11/2007 | Kim | F24C 15/006 | 126/21 R |
| 7,320,278 B2 | 1/2008 | Sikes | | |
| 7,357,131 B2 * | 4/2008 | Moreth, III | F24C 15/006 | 126/193 |
| 7,368,684 B2 * | 5/2008 | Kim | F24C 15/2007 | 219/400 |
| 7,372,000 B2 * | 5/2008 | Stockley | F24C 15/16 | 219/400 |
| 7,422,011 B2 * | 9/2008 | Bachinski | F24B 13/004 | 126/110 E |
| 7,431,029 B2 * | 10/2008 | Kim | F24C 15/04 | 126/193 |
| 7,619,182 B2 * | 11/2009 | Morrow | A47B 77/08 | 219/409 |
| 7,655,884 B2 * | 2/2010 | Engelhardt | A21B 1/44 | 219/393 |
| 7,686,010 B2 * | 3/2010 | Gustavsen | F24B 1/003 | 126/29 |
| 7,798,138 B2 * | 9/2010 | Babington | A21B 1/26 | 126/21 A |
| 7,856,973 B2 * | 12/2010 | Kim | H05B 6/642 | 126/193 |
| D637,860 S * | 5/2011 | Petty | D7/333 | |
| 7,954,485 B2 * | 6/2011 | Cadima | F24C 15/006 | 219/400 |
| 8,061,348 B1 * | 11/2011 | Rodriguez | F24B 1/182 | 126/1 E |
| 8,291,896 B1 * | 10/2012 | Gonnella | F24C 3/067 | 126/39 C |
| 8,375,849 B2 * | 2/2013 | Sajjad | F24C 15/006 | 219/400 |
| D688,507 S * | 8/2013 | Hill | D7/323 | |
| 8,499,944 B2 | 8/2013 | Parks et al. | | |
| 8,528,537 B2 * | 9/2013 | Chilton | F24C 3/008 | 126/21 R |
| 8,578,927 B2 * | 11/2013 | Gustavsen | F24B 1/003 | 126/1 R |
| D715,084 S * | 10/2014 | Hill | D7/332 | |
| D720,569 S * | 1/2015 | Hill | D7/334 | |
| 9,016,191 B2 * | 4/2015 | Krolick | F24B 1/003 | 99/447 |
| 9,074,775 B2 * | 7/2015 | McCary, Sr. | F24B 1/182 | |
| 9,134,036 B2 * | 9/2015 | Bagwell | F24C 15/2007 | |
| 9,289,097 B2 * | 3/2016 | Contarino, Jr. | A47J 37/0786 | |
| 9,351,607 B2 * | 5/2016 | Pothetes | A47J 37/0704 | |
| 9,420,800 B1 * | 8/2016 | Froelicher | A21B 1/24 | |
| 9,433,321 B2 * | 9/2016 | Piazzi | A47J 37/0704 | |
| 9,476,587 B2 * | 10/2016 | Bettinzoli | F23D 14/105 | |
| 9,482,437 B2 * | 11/2016 | Kemper | F24C 15/028 | |
| 9,491,951 B2 * | 11/2016 | Case | A47J 37/0658 | |
| 9,492,031 B2 * | 11/2016 | Diaz | A47J 37/0623 | |
| 9,635,979 B2 * | 5/2017 | Abrams | A47J 37/0658 | |
| 9,643,037 B2 * | 5/2017 | Vermeersch | A62C 4/00 | |
| 9,668,615 B2 * | 6/2017 | Contarino, Jr. | A47J 37/0786 | |
| 9,677,774 B2 * | 6/2017 | McKee | F24C 15/166 | |
| 9,681,775 B2 * | 6/2017 | Contarino, Jr. | F24B 1/207 | |
| 9,726,379 B2 * | 8/2017 | Wiseman | F24C 7/085 | |
| 9,777,929 B2 | 10/2017 | Bagwell et al. | | |
| 9,795,147 B2 * | 10/2017 | Hegarty | A21B 1/44 | |
| 9,848,731 B2 * | 12/2017 | Dahle | F24C 15/16 | |
| 9,879,865 B2 * | 1/2018 | McKee | F24C 15/322 | |
| 9,883,771 B2 * | 2/2018 | Minnich | F24B 3/00 | |
| 9,888,692 B2 * | 2/2018 | Froelicher | F24C 15/22 | |
| 9,907,435 B2 * | 3/2018 | Kohler | A47J 37/0623 | |
| 9,995,492 B2 * | 6/2018 | Froelicher | F24C 15/322 | |
| 10,006,639 B2 * | 6/2018 | Johnson | A47B 96/20 | |
| 10,012,392 B2 * | 7/2018 | Froelicher | F24C 15/32 | |
| 10,018,363 B1 * | 7/2018 | Wang | A21B 1/40 | |
| 10,024,547 B2 * | 7/2018 | Johnson | F24C 15/322 | |
| 10,039,417 B2 * | 8/2018 | Chen | A47J 37/0745 | |
| 10,041,685 B2 * | 8/2018 | Kim | F24C 15/023 | |
| 10,051,997 B2 | 8/2018 | Contarino, Jr. | | |
| 10,085,595 B2 | 10/2018 | Minnich | | |
| 10,105,007 B2 * | 10/2018 | Colston | A47J 37/0754 | |
| 10,105,008 B2 * | 10/2018 | Contarino, Jr. | A47J 37/0704 | |
| 10,117,546 B2 * | 11/2018 | Le Grand | A47J 43/0716 | |
| 10,119,706 B2 * | 11/2018 | Chadwick | F24C 15/006 | |

(56) References Cited

U.S. PATENT DOCUMENTS

| | | | |
|---|---|---|---|
| 10,125,999 B2* | 11/2018 | Froelicher | F24C 15/32 |
| 10,132,502 B2 | 11/2018 | Contarino, Jr. | |
| 10,145,566 B2* | 12/2018 | Di Tommaso | F24C 15/04 |
| 10,215,421 B2 | 2/2019 | Bagwell et al. | |
| 10,228,145 B2* | 3/2019 | Erbe | F24C 7/085 |
| 10,238,236 B2* | 3/2019 | Borovicka | A47J 37/0786 |
| 10,247,425 B2* | 4/2019 | Adelmann | F24C 15/325 |
| 10,288,295 B2* | 5/2019 | Chadwick | F24C 15/006 |
| 10,288,298 B2* | 5/2019 | Chadwick | F24C 15/006 |
| 10,337,745 B2* | 7/2019 | McKee | F24C 15/16 |
| 10,405,699 B2 | 9/2019 | Contarino, Jr. | |
| 10,413,123 B2 | 9/2019 | Dahle et al. | |
| 10,420,347 B2 | 9/2019 | Hegarty et al. | |
| 10,433,558 B2* | 10/2019 | Froelicher | A21B 1/22 |
| 10,480,769 B2* | 11/2019 | Luo | F24C 15/006 |
| 10,480,793 B2* | 11/2019 | Widmer | F24B 1/189 |
| 10,502,431 B2* | 12/2019 | Lee | F23M 5/00 |
| 10,508,815 B2* | 12/2019 | Signorino | F24C 15/008 |
| 10,524,616 B2 | 1/2020 | Contarino, Jr. | |
| 10,575,680 B2* | 3/2020 | Fagg | A47J 37/0786 |
| 10,578,362 B2* | 3/2020 | Tseng | F27D 1/0033 |
| 10,624,353 B1* | 4/2020 | Langley | A21B 1/52 |
| 10,655,864 B2* | 5/2020 | Howard | F24C 15/08 |
| 10,677,468 B2* | 6/2020 | Tseng | F23D 14/147 |
| 10,687,667 B2 | 6/2020 | Contarino, Jr. | |
| D889,898 S* | 7/2020 | Juli Soler | D7/348 |
| 10,756,470 B2* | 8/2020 | Bally | H01R 33/18 |
| 10,788,266 B2* | 9/2020 | Tseng | A21B 1/02 |
| 10,823,425 B2* | 11/2020 | Tseng | F24B 1/24 |
| 10,823,426 B2* | 11/2020 | Tseng | F24C 15/2007 |
| 10,827,878 B2* | 11/2020 | Baker | A47J 37/0885 |
| 10,856,692 B2* | 12/2020 | Ahmed | A47J 37/0713 |
| 10,912,307 B2* | 2/2021 | Moretti | F27D 1/06 |
| 10,920,988 B2* | 2/2021 | Tseng | A21B 1/28 |
| 10,920,989 B2* | 2/2021 | Tseng | F24B 1/24 |
| 10,941,945 B2* | 3/2021 | Tapaninaho | A47J 37/0704 |
| 11,054,143 B2* | 7/2021 | Jung | F24C 15/024 |
| 11,092,343 B2* | 8/2021 | Raghavan | F24C 13/00 |
| 11,225,750 B2* | 1/2022 | Lang | E05B 47/0004 |
| D965,374 S* | 10/2022 | Chen | D7/337 |
| 2002/0036195 A1* | 3/2002 | Loveless | F24C 15/16 219/400 |
| 2004/0031782 A1* | 2/2004 | Westfield | F24C 15/022 126/190 |
| 2006/0070614 A1* | 4/2006 | Spangrud | A47J 37/0713 126/25 R |
| 2006/0191528 A1* | 8/2006 | Spangrud | F24C 3/027 126/275 R |
| 2007/0006869 A1 | 1/2007 | Spangrud | |
| 2007/0221191 A1* | 9/2007 | O'Brien | A47J 37/0713 126/25 R |
| 2007/0267402 A1* | 11/2007 | Harned | F24C 15/026 219/408 |
| 2008/0041359 A1* | 2/2008 | Kim | A47J 37/0718 126/25 R |
| 2008/0047915 A1* | 2/2008 | Parks | F24C 15/16 211/90.03 |
| 2008/0121118 A1 | 5/2008 | Sikes | |
| 2008/0210217 A1* | 9/2008 | Offredi | F24C 3/087 431/354 |
| 2008/0276925 A1* | 11/2008 | Griswold | F24C 15/022 126/197 |
| 2009/0020111 A1* | 1/2009 | Immordino | A21B 1/52 126/9 R |
| 2010/0124596 A1* | 5/2010 | Nelson | A23L 5/15 426/523 |
| 2011/0186036 A1* | 8/2011 | Kim | F24C 3/087 126/39 E |
| 2011/0209694 A1* | 9/2011 | Yang | F24C 15/22 126/19 R |
| 2011/0271947 A1* | 11/2011 | Nilssen, II | A47J 37/0704 126/1 R |
| 2012/0138043 A1 | 6/2012 | Spangrud | |
| 2013/0000630 A1* | 1/2013 | Catalogne | F24C 15/10 126/39 E |
| 2014/0026880 A1* | 1/2014 | Froelicher | F24C 15/32 126/15 R |
| 2014/0196609 A1* | 7/2014 | Snyman | A47J 37/043 99/340 |
| 2014/0216268 A1* | 8/2014 | Burch | A23B 4/0523 99/352 |
| 2014/0216273 A1* | 8/2014 | Burch | A23B 4/0523 99/445 |
| 2014/0216434 A1* | 8/2014 | Moreth, III | A21B 2/00 126/92 AC |
| 2014/0224241 A1* | 8/2014 | McCary | A47J 37/0623 126/25 R |
| 2015/0233585 A1* | 8/2015 | Creel | F24B 1/22 29/428 |
| 2015/0323190 A1* | 11/2015 | Stein | F24B 1/003 219/390 |
| 2015/0338104 A1* | 11/2015 | Lipinski | F24B 1/022 126/21 R |
| 2016/0198896 A1* | 7/2016 | Turner | A47J 37/0623 99/446 |
| 2016/0209042 A1* | 7/2016 | Yu | F24B 1/24 |
| 2017/0172158 A1* | 6/2017 | Lipinski | A47J 37/0704 |
| 2017/0336076 A1* | 11/2017 | Walters | F24C 3/025 |
| 2018/0213973 A1* | 8/2018 | Tapaninaho | A47J 37/0623 |
| 2018/0228169 A1* | 8/2018 | Froelicher | F24C 15/006 |
| 2019/0107290 A1* | 4/2019 | Signorino | F24C 15/008 |
| 2019/0195506 A1* | 6/2019 | Tseng | F24C 3/047 |
| 2019/0212015 A1 | 7/2019 | Bagwell et al. | |
| 2019/0231123 A1* | 8/2019 | Borovicka | A47J 37/0718 |
| 2019/0255494 A1* | 8/2019 | Charopoulos | B01F 27/80 |
| 2019/0293299 A1* | 9/2019 | Lee | F24C 15/006 |
| 2020/0015484 A1 | 1/2020 | Hegarty et al. | |
| 2020/0025390 A1* | 1/2020 | Lee | F24C 15/101 |
| 2020/0037816 A1* | 2/2020 | Hackley | A47J 37/0664 |
| 2020/0054167 A1* | 2/2020 | Formisano | F24B 1/022 |
| 2020/0054168 A1* | 2/2020 | Anderson | A47J 37/0786 |
| 2020/0077839 A1 | 3/2020 | Dahle et al. | |
| 2020/0080724 A1 | 3/2020 | Widmer | |
| 2020/0191405 A1* | 6/2020 | Balingao | F24C 15/006 |
| 2020/0191406 A1* | 6/2020 | Yun | F24C 15/025 |
| 2020/0200396 A1* | 6/2020 | Kim | F24C 14/025 |
| 2020/0245811 A1* | 8/2020 | Pruitt | A47J 37/0704 |
| 2020/0345176 A1* | 11/2020 | Bert | F24B 13/02 |
| 2020/0348026 A1* | 11/2020 | Widmer | F24B 1/1955 |
| 2020/0352385 A1* | 11/2020 | Home | A47J 37/0763 |
| 2021/0015301 A1 | 1/2021 | Baker | |

FOREIGN PATENT DOCUMENTS

| | | |
|---|---|---|
| DE | 102012200309 A1 | 7/2013 |
| DE | 102012213126 A1 | 1/2014 |
| DE | 202014101826 U1 | 6/2014 |
| DE | 102013106623 A1 | 1/2015 |
| DE | 102013107618 A1 | 1/2015 |
| DE | 102015116016 A1 | 3/2016 |
| DE | 102014118166 A1 | 6/2016 |
| DE | 202016105795 U1 | 1/2018 |
| DE | 102016215651 A1 | 2/2018 |
| DE | 102016215652 A1 | 2/2018 |
| DE | 102016010198 A1 | 3/2018 |
| DE | 102016014481 B3 | 3/2018 |
| DE | 202018105140 U1 | 9/2018 |
| DE | 102017223100 A1 | 6/2019 |
| DE | 102018108016 A1 | 10/2019 |
| DE | 102018204776 A1 | 10/2019 |
| DE | 202020004998 U1 | 2/2021 |
| DE | 102020209243 A1 | 1/2022 |
| EP | 2469178 A1 | 6/2012 |
| EP | 2469179 A2 | 6/2012 |
| EP | 2469180 A1 | 6/2012 |
| EP | 2918917 A1 | 9/2015 |
| EP | 2614309 B1 | 11/2016 |
| EP | 2735804 B1 | 5/2018 |
| EP | 2558784 B1 | 6/2018 |
| EP | 2956038 B1 | 6/2018 |
| EP | 2977684 B1 | 10/2018 |

(56) References Cited

FOREIGN PATENT DOCUMENTS

| | | | |
|---|---|---|---|
| EP | 2758718 B1 | 11/2018 | |
| EP | 3421893 A1 | 1/2019 | |
| EP | 3079541 B1 | 3/2019 | |
| EP | 3155323 B1 | 7/2019 | |
| EP | 3542685 A1 | 9/2019 | |
| EP | 3091153 B1 | 10/2019 | |
| EP | 2969477 B1 | 11/2019 | |
| EP | 2927603 B1 | 12/2019 | |
| EP | 3599423 A1 | 1/2020 | |
| EP | 2652408 B1 | 3/2020 | |
| EP | 3234470 B1 | 3/2020 | |
| EP | 3530160 B1 | 8/2020 | |
| EP | 3421888 B1 | 9/2020 | |
| EP | 3760931 A1 | 1/2021 | |
| EP | 3359893 B1 | 7/2021 | |
| EP | 3754680 B1 | 8/2021 | |
| EP | 3734165 B1 | 2/2022 | |
| EP | 3450857 B1 | 3/2022 | |
| EP | 3353472 B1 | 5/2022 | |
| FR | 2884595 A1 | 10/2006 | |
| FR | 2991158 A1 * | 12/2013 | .......... A47J 37/0623 |
| FR | 3044517 A1 * | 6/2017 | |
| GB | 2489421 B | 7/2014 | |
| GB | 2488076 B | 12/2015 | |
| IT | MO20090187 A1 | 1/2011 | |
| IT | 20130002 UI | 4/2013 | |
| IT | BO20110585 A1 | 4/2013 | |
| IT | 1401740 B1 | 8/2013 | |
| IT | TO20131034 A1 | 6/2015 | |
| IT | UB20152351 | 1/2017 | |
| IT | 201700033032 A1 * | 9/2018 | |
| JP | 2020141842 A * | 9/2020 | |
| KR | 200478529 Y1 * | 10/2015 | |
| WO | 9843022 A1 | 10/1998 | |
| WO | 2011098399 A1 | 8/2011 | |
| WO | 2012012408 A1 | 1/2012 | |
| WO | 2013079985 A1 | 6/2013 | |
| WO | 2015092642 A1 | 6/2015 | |
| WO | 2017097790 A1 | 6/2017 | |
| WO | 2017201530 A1 | 11/2017 | |
| WO | 2018063182 A1 | 4/2018 | |
| WO | 2018070996 A1 | 4/2018 | |
| WO | 2018151704 A1 | 8/2018 | |
| WO | 2019086281 A1 | 5/2019 | |
| WO | 2019180411 A1 | 9/2019 | |
| WO | 2020148164 A1 | 7/2020 | |
| WO | 2020176492 A2 | 9/2020 | |
| WO | 2020176596 A2 | 9/2020 | |
| WO | 2020223606 A1 | 11/2020 | |
| WO | 2020229941 A1 | 11/2020 | |

OTHER PUBLICATIONS

IT_201700033032_A1.*
KR_101899144_B1.*
KR_20190091597_A.*
FR_2991158_A1.*
JP_2020141842_A.*
KR_200478529_Y1.*
English language abstract for WO 98/43022 A1 extracted from espacenet.com database on Nov. 10, 2021, 1 page.
Design U.S. Appl. No. 29/806,993, filed Sep. 8, 2021.
English language abstract for DE 10 2011 084 571 A1 extracted from espacenet.com database on Jul. 13, 2022, 1 page.
English language abstract for DE 10 2011 088 084 A1 extracted from espacenet.com database on Jul. 13, 2022, 1 page.
English language abstract for DE 10 2012 200 309 A1 extracted from espacenet.com database on Jul. 13, 2022, 1 page.
English language abstract for DE 10 2012 213 126 A1 extracted from espacenet.com database on Jul. 13, 2022, 1 page.
Computer-geneated English language abstract for DE 20 2014 101 826 U1 extracted from espacenet.com database on Jul. 13, 2022, 2 pages.
Computer-generated English language abstract for DE 10 2013 106 623 A1 extracted from espacenet.com database on Jul. 13, 2022, 2 pages.
English language abstract for DE 10 2013 107 618 A1 extracted from espacenet.com database on Jul. 13, 2022, 1 page.
English language abstract for DE 10 2013 218 573 A1 extracted from espacenet.com database on Jul. 13, 2022, 1 page.
Computer-generated English language abstract for DE 10 2014 118 166 A1 extracted from espacenet.com database on Jul. 13, 2022, 1 page.
Computer-generated English language abstract for DE 10 2015 116 016 A1 extracted from espacenet.com database on Jul. 13, 2022, 2 pages.
Computer-generated English language abstract for DE 20 2016 105 795 U1 extracted from espacenet.com database on Jul. 13, 2022, 2 pages.
Computer-generated English language abstract for DE 10 2016 01 198 A1 extracted from espacenet.com database on Jul. 13, 2022, 2 pages.
Computer-generated English language abstract for DE 10 2016 014 481 B3 extracted from espacenet.com database on Jul. 13, 2022, 2 pages.
Computer-generated English language abstract for DE 10 2016 215 651 A1 extracted from espacenet.com database on Jul. 13, 2022, 2 pages.
Computer-generated English language abstract for DE 10 2016 215 652 A1 extracted from espacenet.com database on Jul. 13, 2022, 2 pages.
Computer-generated English language abstract for DE 20 2018 105 140 U1 extracted from espacenet.com database on Jul. 13, 2022, 2 pages.
Computer-generated English language abstract for DE 10 2017 223 100 A1 extracted from espacenet.com database on Jul. 13, 2022, 3 pages.
Computer-generated English language abstract for DE 10 2018 108 016 A1 extracted from espacenet.com database on Jul. 13, 2022, 2 pages.
Computer-generated English language abstract for DE 10 2018 204 776 A1 extracted from espacenet.com database on Jul. 13, 2022, 2 pages.
Computer-generate English language abstract for DE 10 2020 209 243 A1 extracted from espacenet.com database on Jul. 13, 2022, 3 pages.
Computer-generated English language abstract for DE 20 2020 004 998 U1 extracted from espacenet.com database on Jul. 13, 2022, 2 pages.
English language abstract for EP 2 469 178 A1 extracted from espacenet.com database on Jul. 13, 2022, 2 pages.
English language abstract for EP 2 469 179 A2 extracted from espacenet.com database on Jul. 13, 2022, 1 page.
English language abstract for EP 2 469 180 A1 extracted from espacenet.com database on Jul. 13, 2022, 1 page.
English language abstract for EP 2 652 408 B1 extracted from espacenet.com database on Jul. 13, 2022, 2 pages.
English language abstract for EP 2 735 804 B1 extracted from espacenet.com database on Jul. 13, 2022, 2 pages.
English language abstract for EP 2 758 718 B1 extracted from espacenet.com database on Jul. 13, 2022, 1 page.
Computer-generated English language abstract for EP 2 901 085 B1 extracted from espacenet.com database on Jul. 13, 2022, 2 pages.
English language abstract for EP 2 956 038 B1 extracted from espacenet.com database on Jul. 13, 2022, 1 page.
English language abstract for EP 3 359 893 B1 extracted from espacenet.com database on Jul. 13, 2022, 1 page.
Computer-generatedEnglish language abstract for EP 3 530 160 B1 extracted from espacenet.com database on Jul. 13, 2022, 3 pages.
Computer-generated English language abstract for EP 3 542 685 A1 extracted from espacenet.com database on Jul. 13, 2022, 2 pages.
Computer-generated English language abstract for EP 3 75 680 A1 extracted from espacenet.com database on Jul. 13, 2022, 2 pages.
English language abstract for FR 2 884 595 A1 extracted from espacenet.com database on Jul. 13, 2022, 2 pages.

(56) References Cited

OTHER PUBLICATIONS

English language abstract for IT 1401740 B1 extracted from espacenet.com database on Jul. 13, 2022, 1 page.
Computer-generated English language translation for ITBO 20110585 A1 extracted from espacenet.com database on Jul. 13, 2022, 8 pages.
Computer-generated English language translation for ITFR 20130002 U1 extracted from espacenet.com database on Jul. 13, 2022, 3 pages.
English language abstract for ITMO 20090187 A1 extracted from espacenet.com database on Jul. 13, 2022, 2 pages.
English language abstract for ITTO 2013134 A1 extracted from espacenet.com database on Jul. 13, 2022, 2 pages.
English language abstract for ITUB 70152351 A1 extracted from espacenet.com database on Jul. 13, 2022, 1 page.
English language abstract for WO 2019/086281 A1 extracted from espacenet.com database on Jul. 13, 2022, 2 pages.
Computer-generated English language translation for IT 201700033032 A1 extracted from WIPO database on Jul. 21, 2022, 11 pages.

* cited by examiner

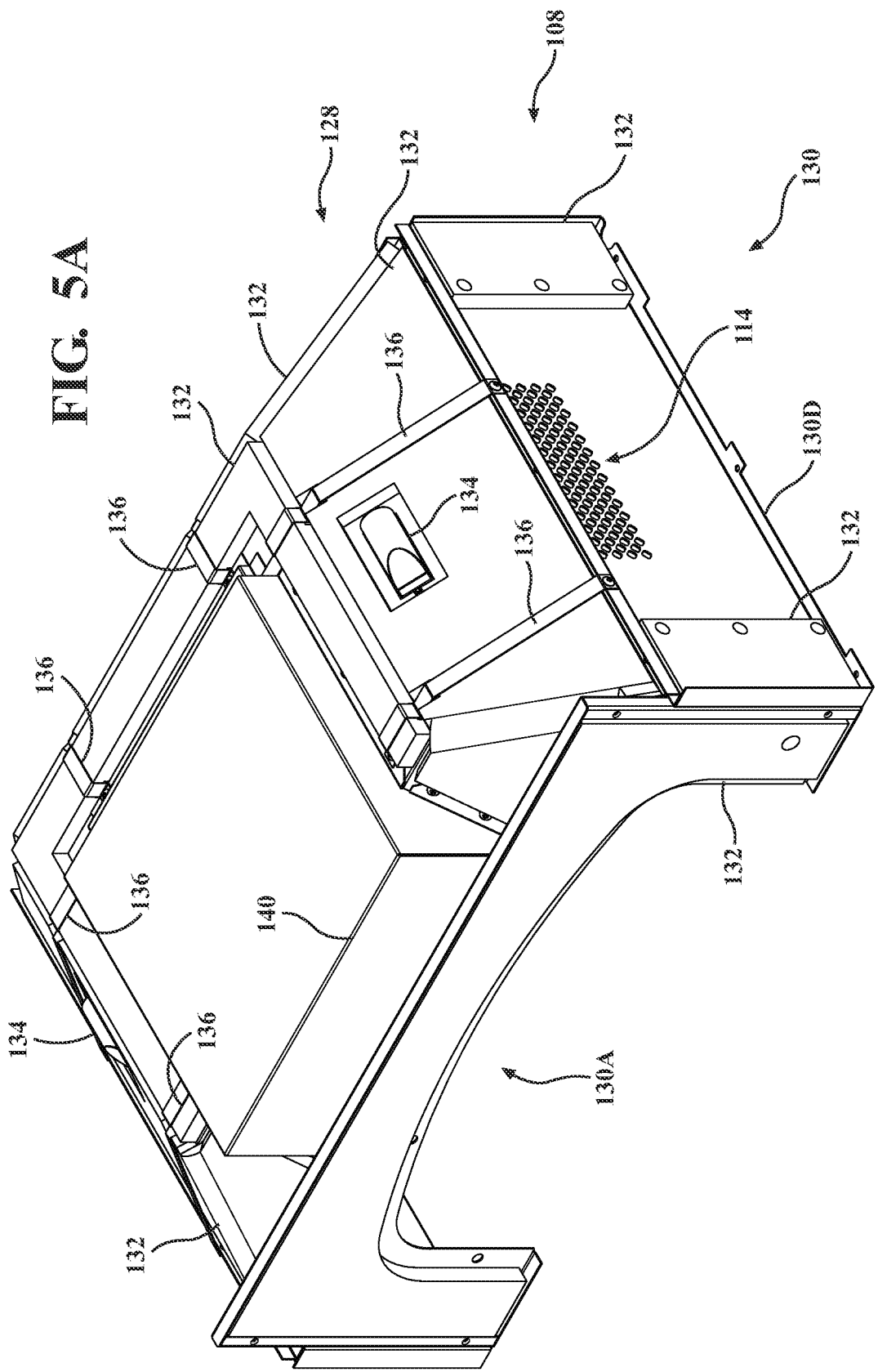

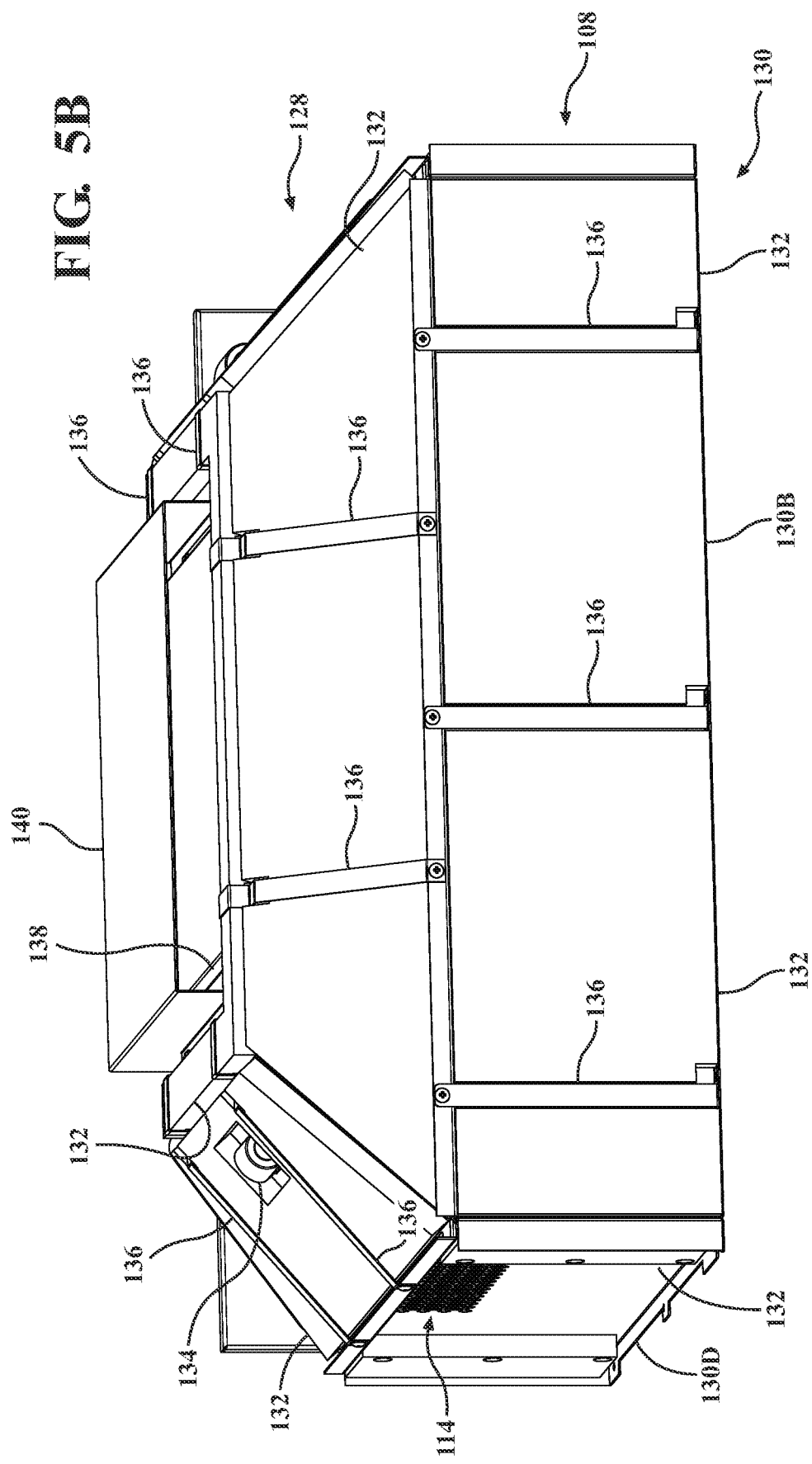

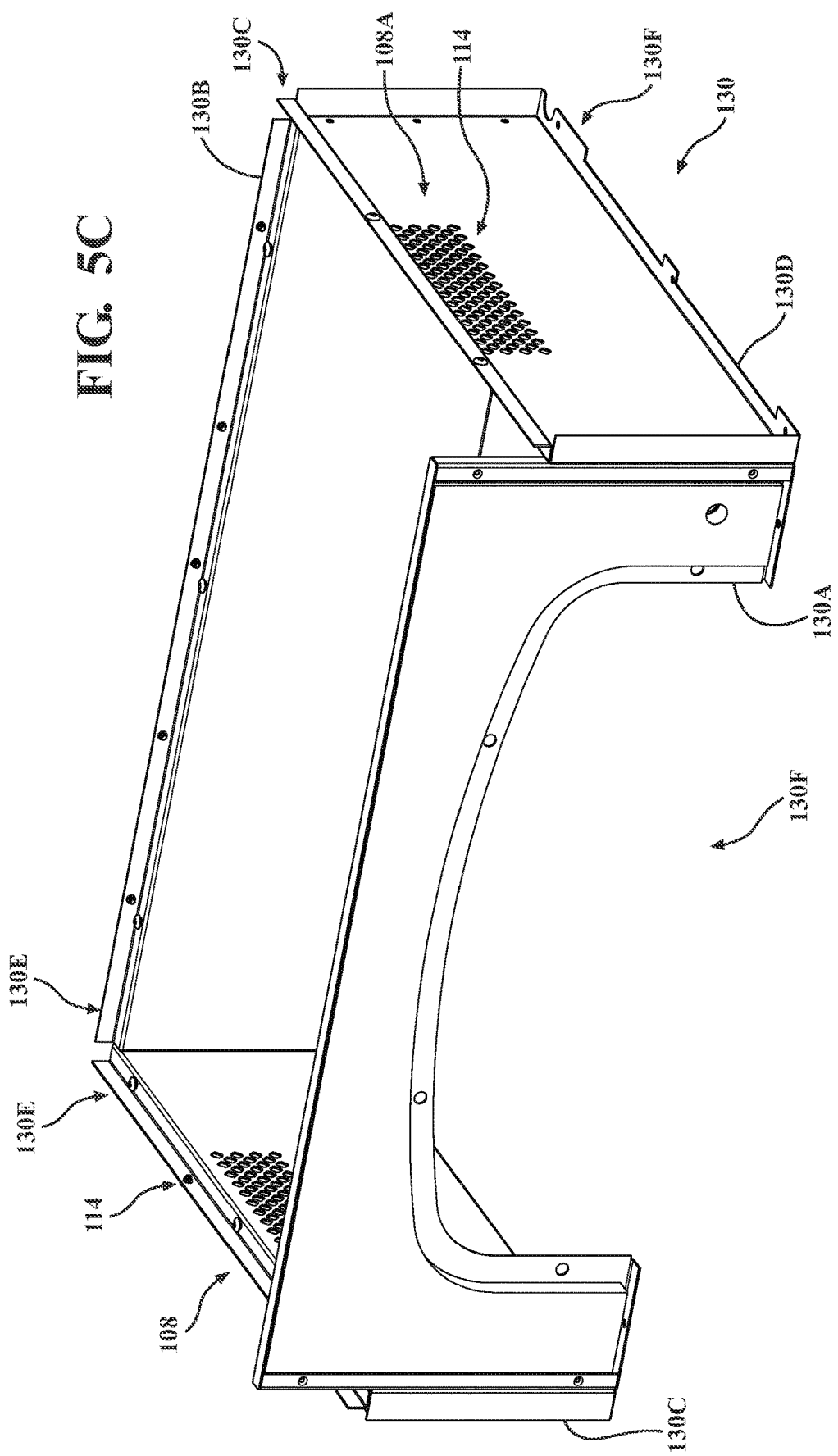

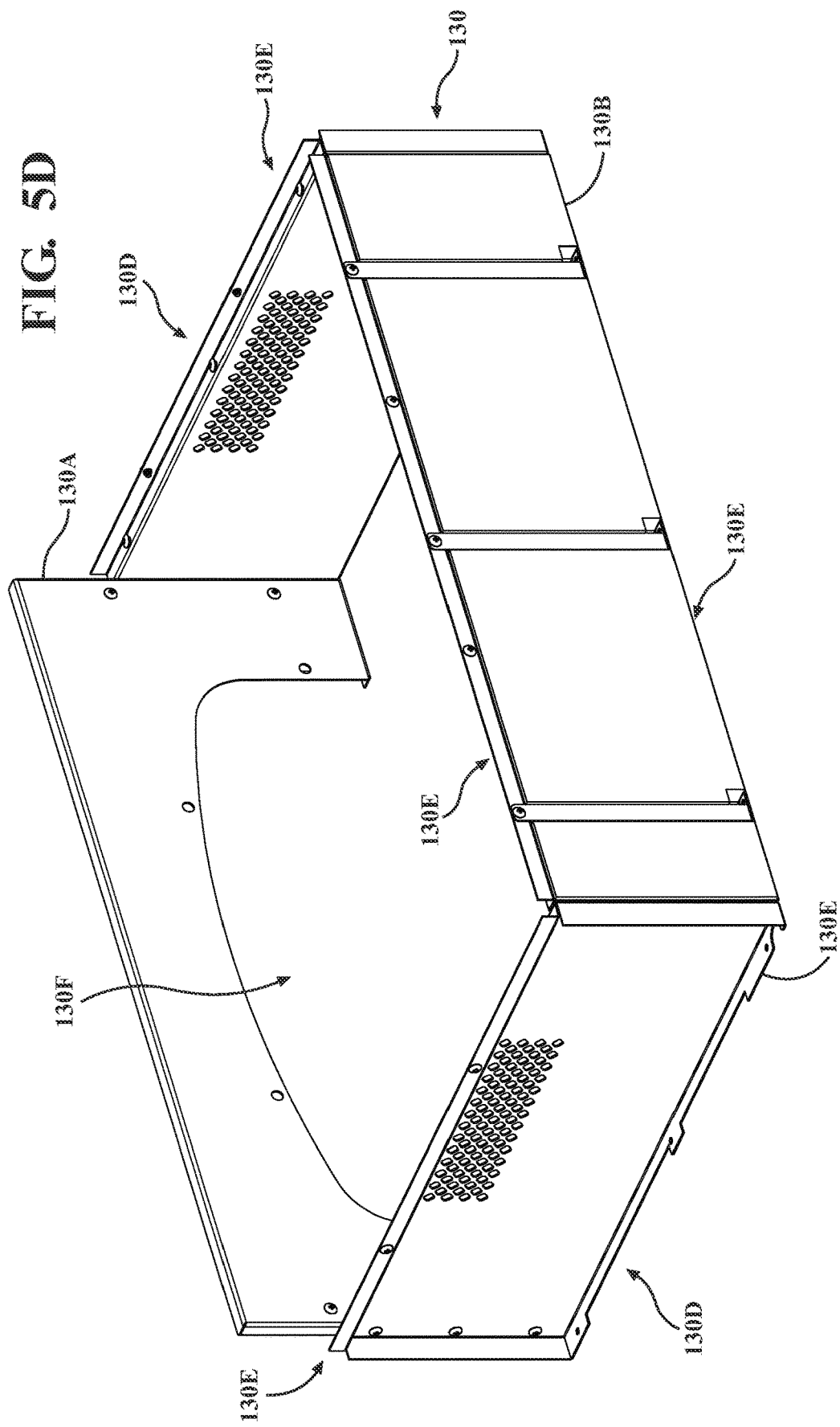

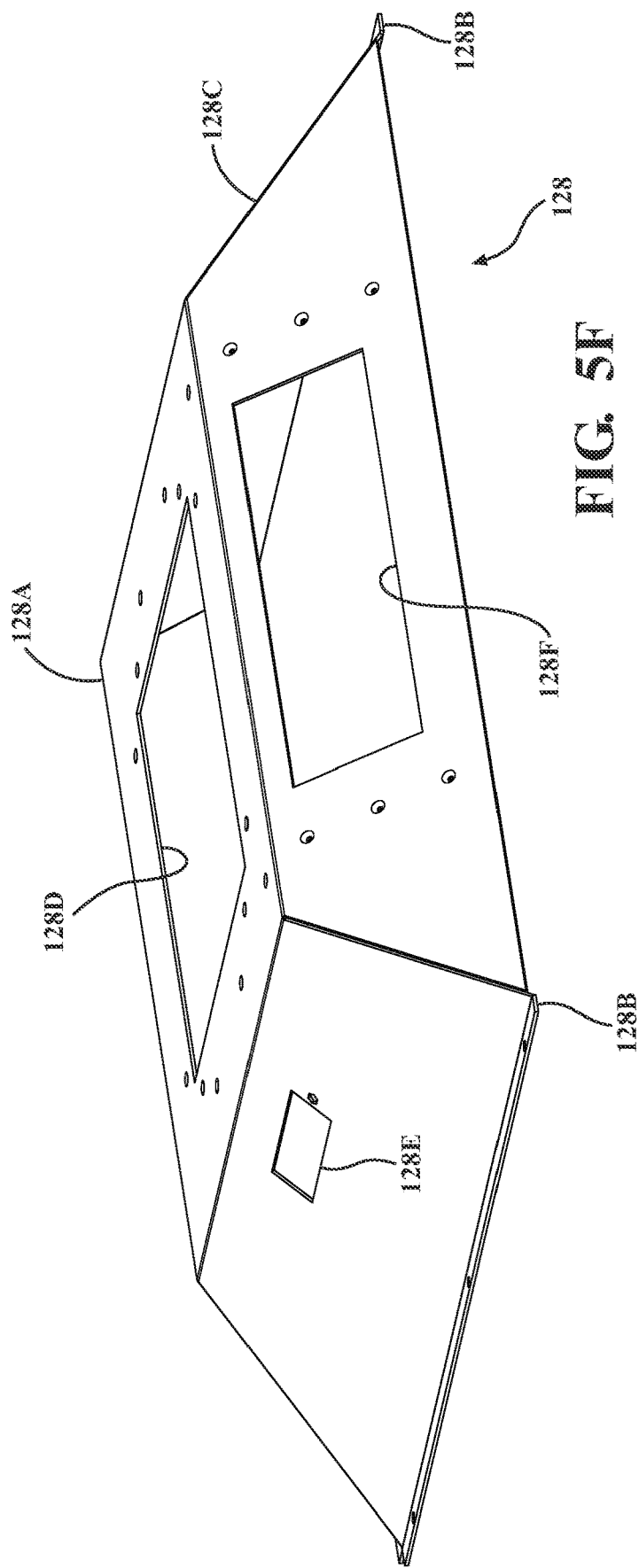

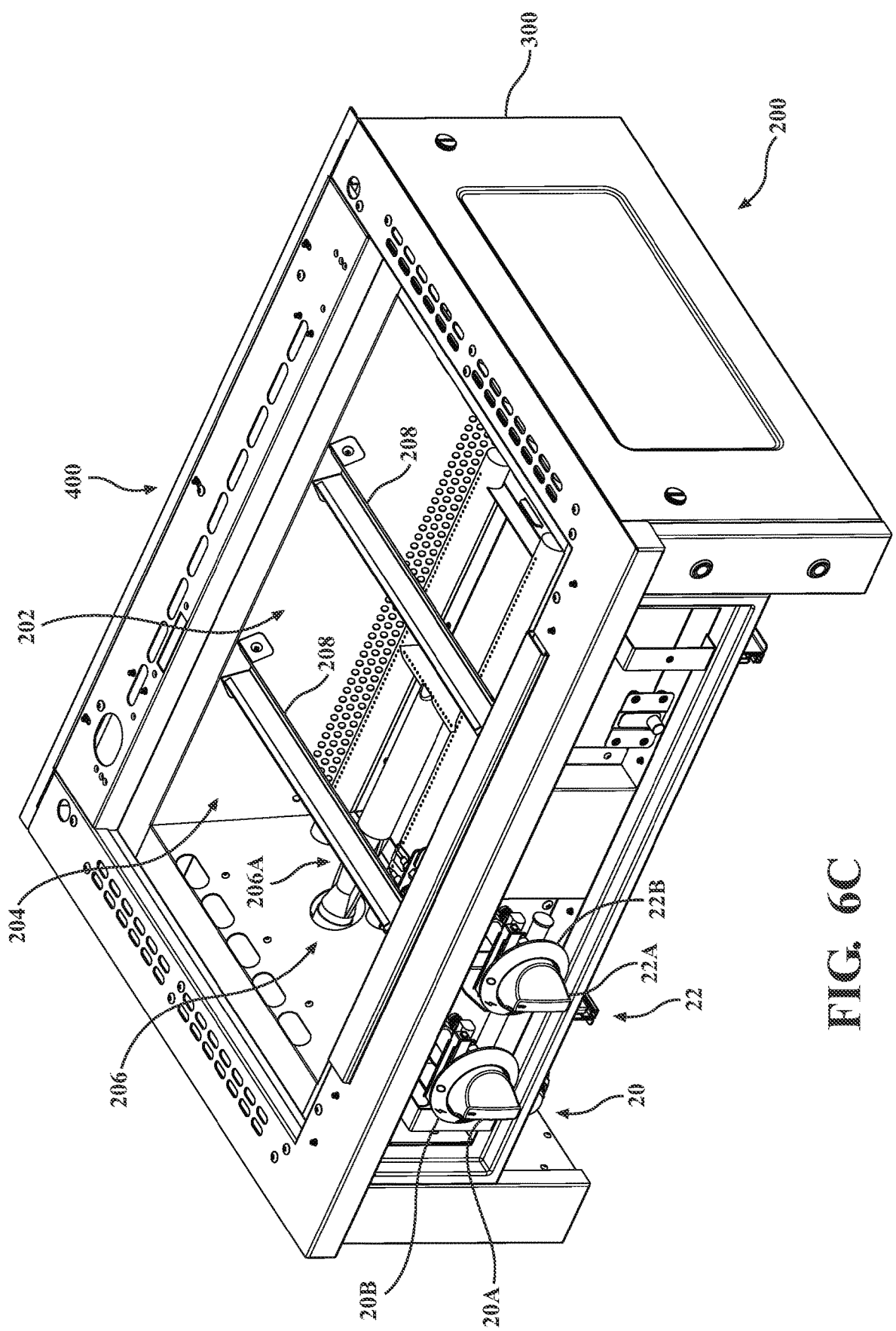

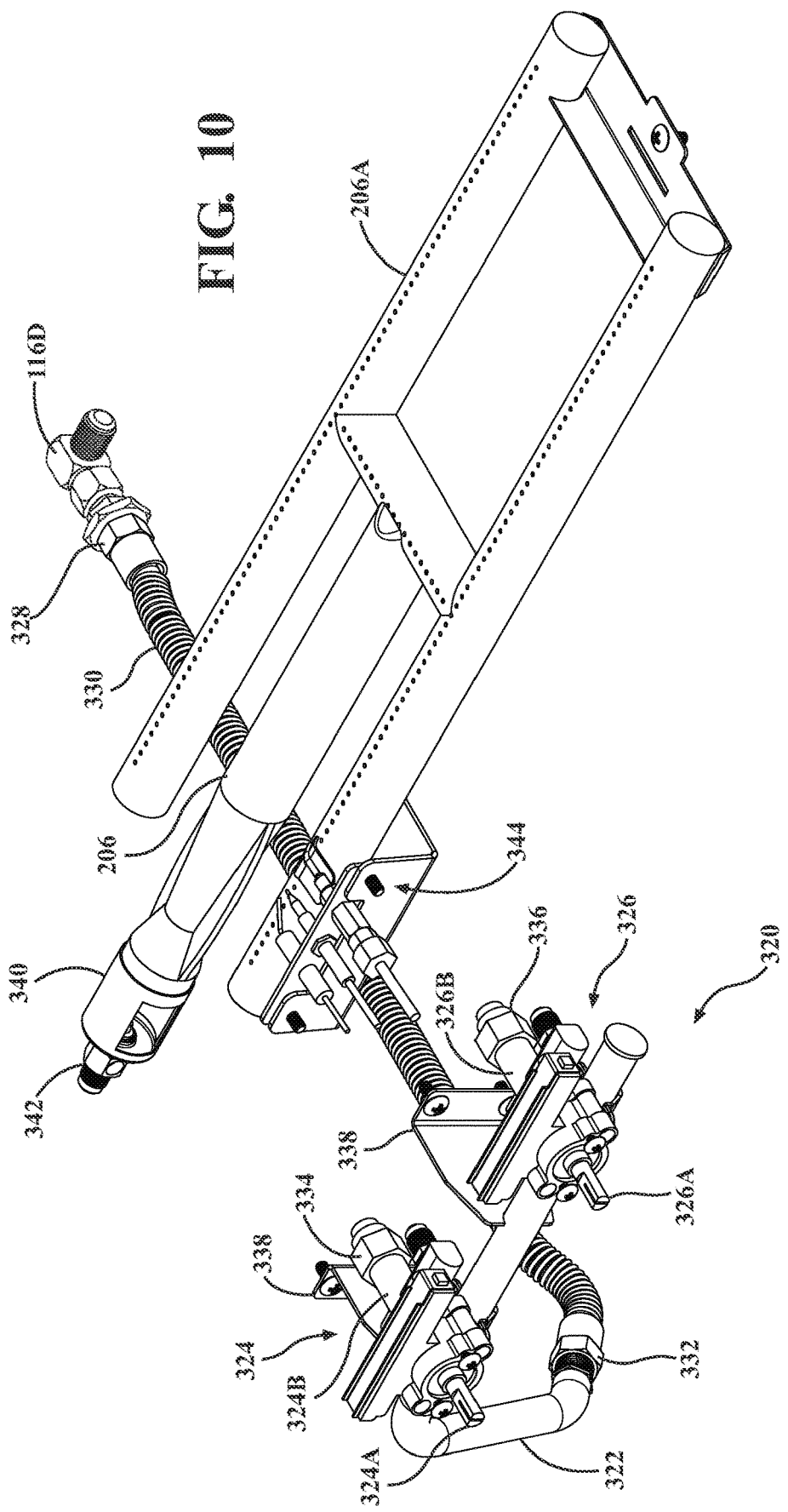

OVEN

FIELD OF THE INVENTION

The present invention relates to ovens, and more specifically, to an oven having a lower assembly with a fire box, a cooking chamber and an upper assembly with two airflow pathways connected to the fire box.

BACKGROUND OF THE INVENTION

Many people enjoy cooking, indoor or outdoor, to prepare or cook a variety of foods, for example, pizza. Ovens that are designed or adapted specifically for cooking pizzas are widely popular. Generally, such ovens are capable of reaching very high temperatures and cooking a pizza within minutes. However, traditional pizza ovens tend to be large, cumbersome and inefficient.

The present invention is aimed at one or more of the problems identified above.

SUMMARY OF THE INVENTION

In one aspect of the present invention, an oven having upper and lower assemblies, a firebox and a heat absorbing and emanating device is provided. The upper assembly forms a cooking chamber and has a front side with an open entry to the cooking chamber. The lower assembly is located below the upper assembly and has an internal cavity. The firebox is located within the internal cavity of the lower assembly and includes a heat source. The heat absorbing and emanating device is located between the upper and lower assemblies and is configured to absorb heat from the heat source and to emanate heat into the cooking chamber of the upper assembly. The upper assembly includes outer and inner dome assemblies. The inner dome is located within the outer dome and forms first and second airflow pathways, a second airflow pathway, each of the first and second airflow pathways having an open end located at a bottom of the upper assembly and being open to the internal cavity of the lower assembly, the first airflow pathway having a second end terminating at a heating vent located on an inner wall of the inner dome and configured to allow heated air from the heat source to enter the cooking chamber, the second airflow pathway having a second end located terminating in an upper portion of the upper assembly.

In a second aspect of the present invention, an oven having upper and lower assemblies, a firebox, first and second heat sources, a heat guard, a thermometer, at least one removable door and heat absorbing and emanating device. The upper assembly has an upper portion and a bottom. The upper assembly forms a cooking chamber and has a front side with an open entry to the cooking chamber. The lower assembly is located below the upper assembly with the lower assembly having an internal cavity. The firebox is located within the internal cavity of the lower assembly. The first heat source is located within the firebox. The second heat source is located within the upper assembly for heating the cooking chamber. The heat guard is located between the second heat source and the cooking chamber. The thermometer is coupled to the lower assembly for sensing a temperature associated with the cooking chamber. The at least one removable door is rotatably coupled to the upper assembly within the open entry. The heat absorbing and emanating device is located between the upper and lower assemblies and is configured to absorb heat from the heat source and emanate heat into the cooking chamber of the upper assembly. The upper assembly includes an outer dome and an inner dome with the inner dome being located within the outer dome. First and second airflow pathways are disposed between the inner and outer domes. Each of the first and second airflow pathways has an open end located at the bottom of the upper assembly and are open to the internal cavity of the lower assembly. The first airflow pathway has a second end terminating at a heating vent located on an inner wall of the inner dome and is configured to allow heated air from the heat source to enter the cooking chamber. The second airflow pathway has a second end terminating in the upper portion of the upper assembly. The upper assembly further includes at least one exhaust vent located within the upper portion of the upper assembly near the second end of the second airflow path for allowing heated gas to exit the oven. The outer dome forms an exterior of the upper assembly. The inner dome forms at least a portion of the cooking chamber. The first and second airflow pathways being located between the inner and outer domes.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5A is a first perspective view of an inner dome, having an inner dome upper portion and an inner dome lower portion, according to an embodiment of the present invention;

FIG. 5B is a second perspective view of the inner dome of FIG. 5A;

FIG. 5C is a first perspective view of the inner dome lower portion of FIG. 5A;

FIG. 5D is a second perspective view of the inner dome lower portion of FIG. 5A;

FIG. 5F is a second perspective view of the inner dome upper portion of FIG. 5A;

FIG. 6C is a third perspective view of the lower assembly of the oven of FIG. 1A;

FIG. 10 is a perspective view of a main burner of the oven of FIG. 1A;

DETAILED DESCRIPTION OF INVENTION

Figure 2A:
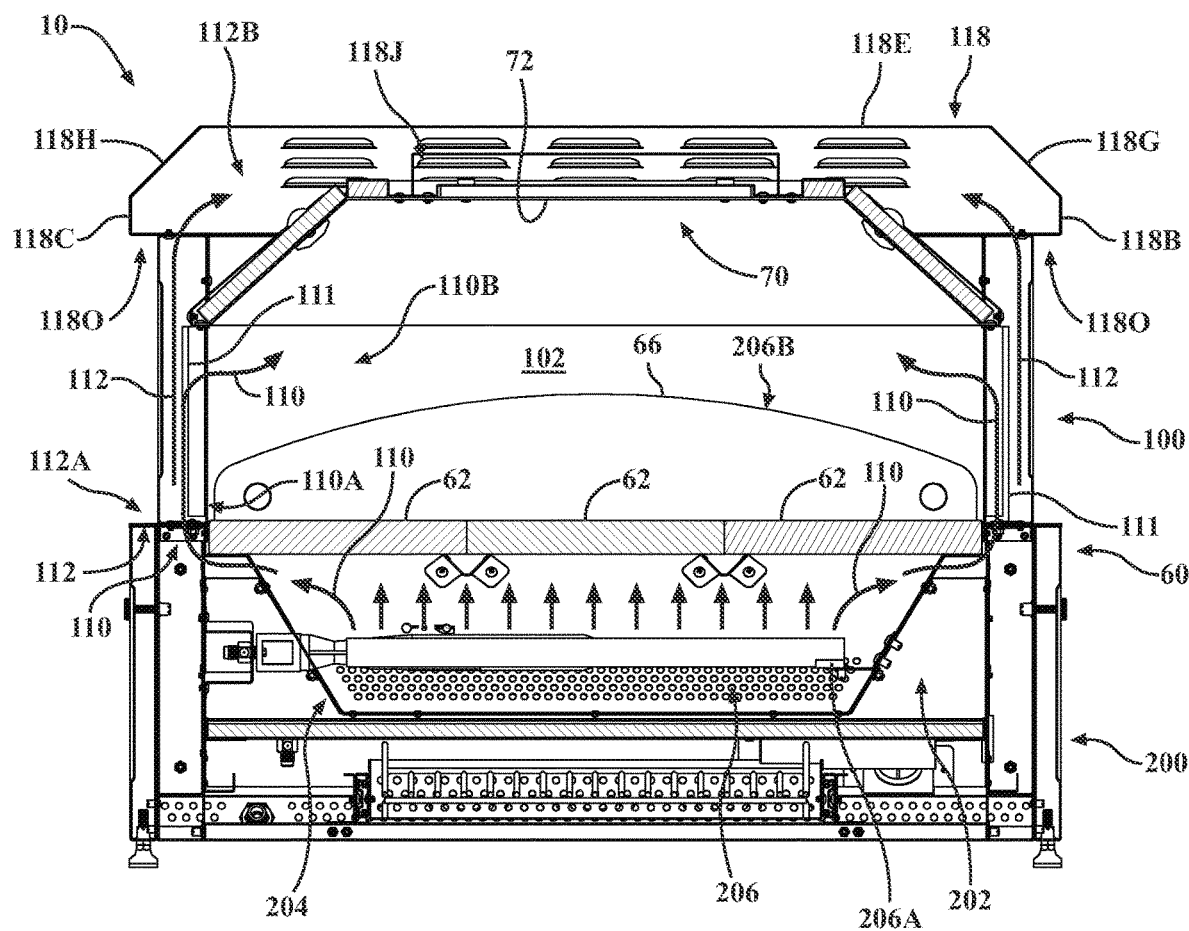
FIG. 2A is a cross-sectional view of the oven shown in FIG. 1A.
Figure 2B:
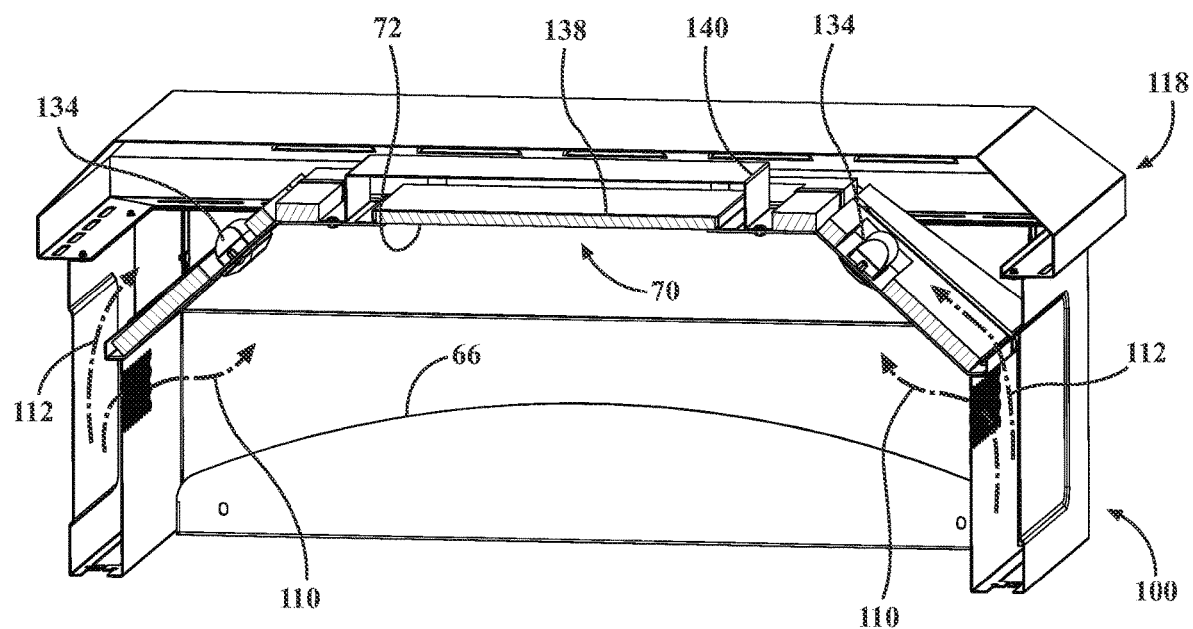
FIG. 2B is a cross-sectional view of the upper assembly of the oven shown in FIG. 1A.
Figure 2C:
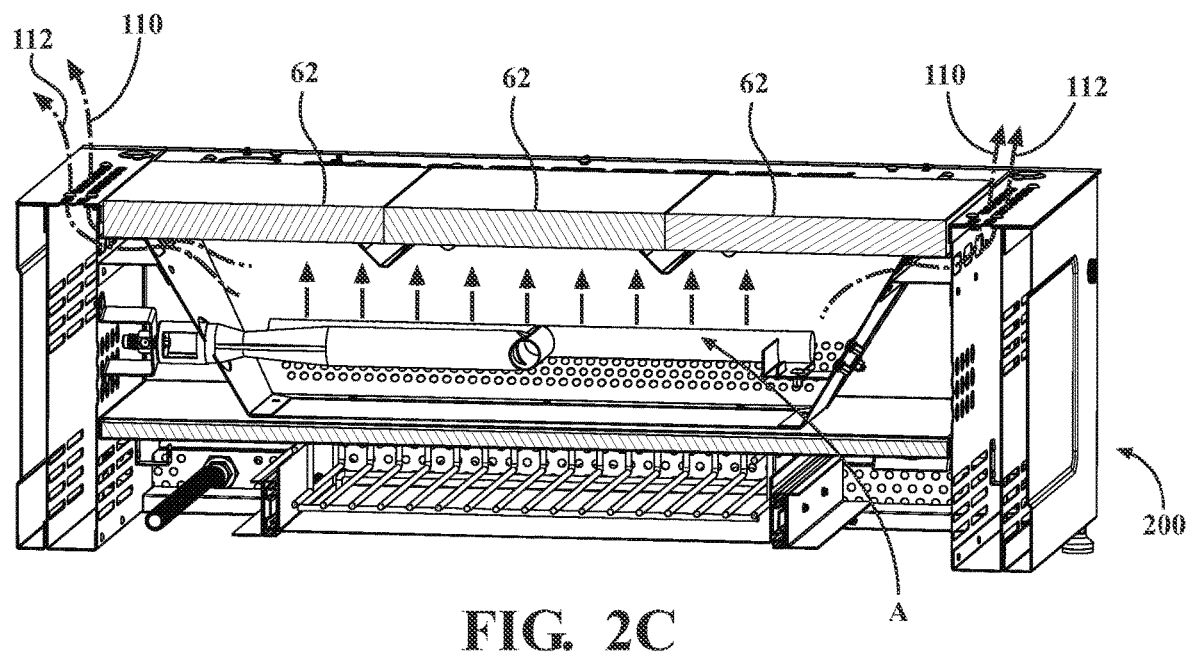
FIG. 2C is a cross-sectional view of the lower assembly of the oven shown in FIG. 1A.

Referring to the FIGS., wherein like numerals indicate like or corresponding parts throughout the several views, an embodiment of an oven 10 having an upper assembly 100 and a lower assembly 200 for cooking items of food, such as pizza, as shown. With reference to FIGS. 2A-2C, the upper assembly 100 includes a cooking chamber 102 and an oven opening 104 through which the cooking chamber 102 may accessed.

Figure 1A:
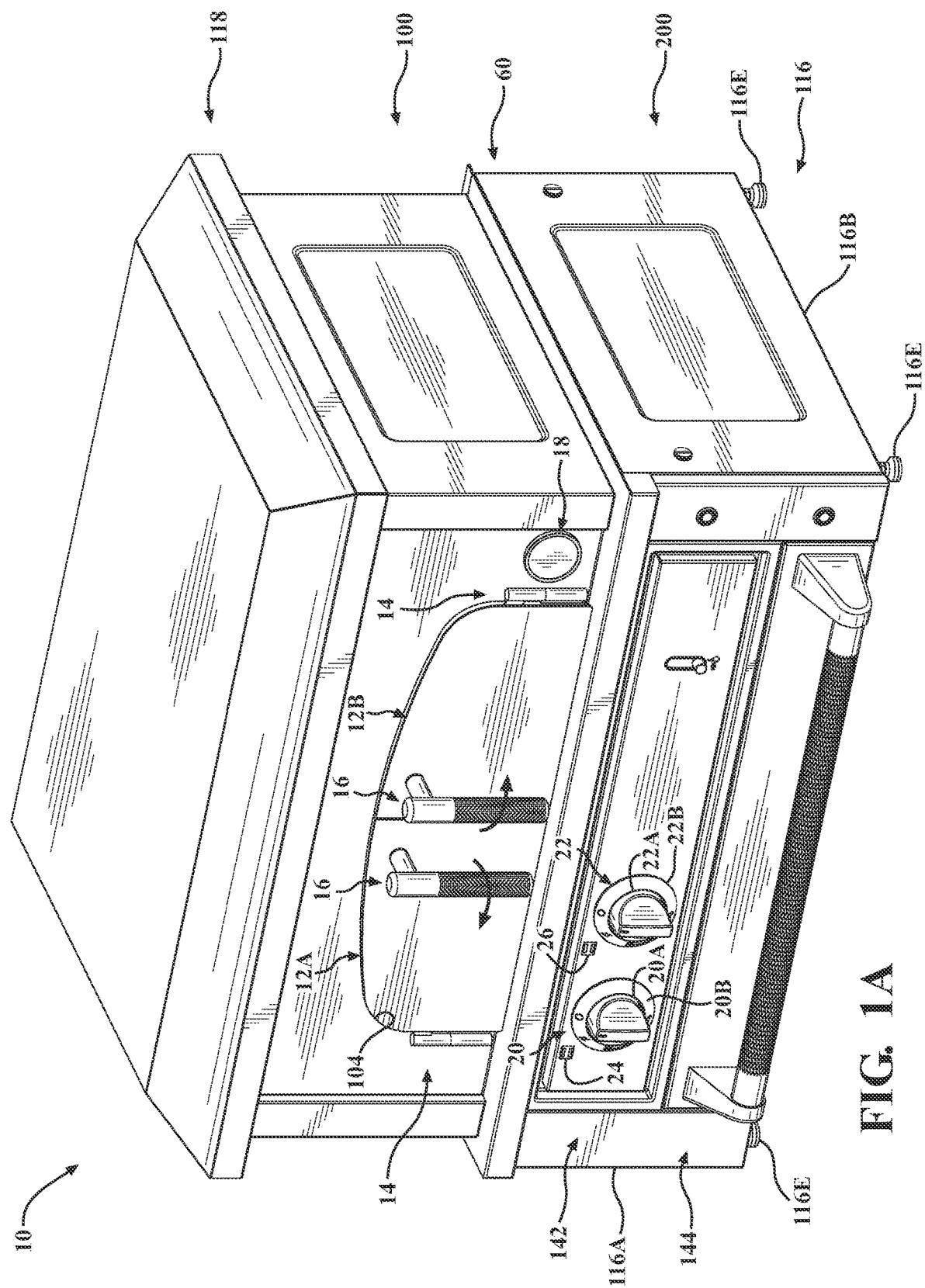
FIG. 1A is a perspective view of an oven in a tabletop configuration, having an upper assembly and a lower assembly, according to a first embodiment of the present invention.
Figure 1B:
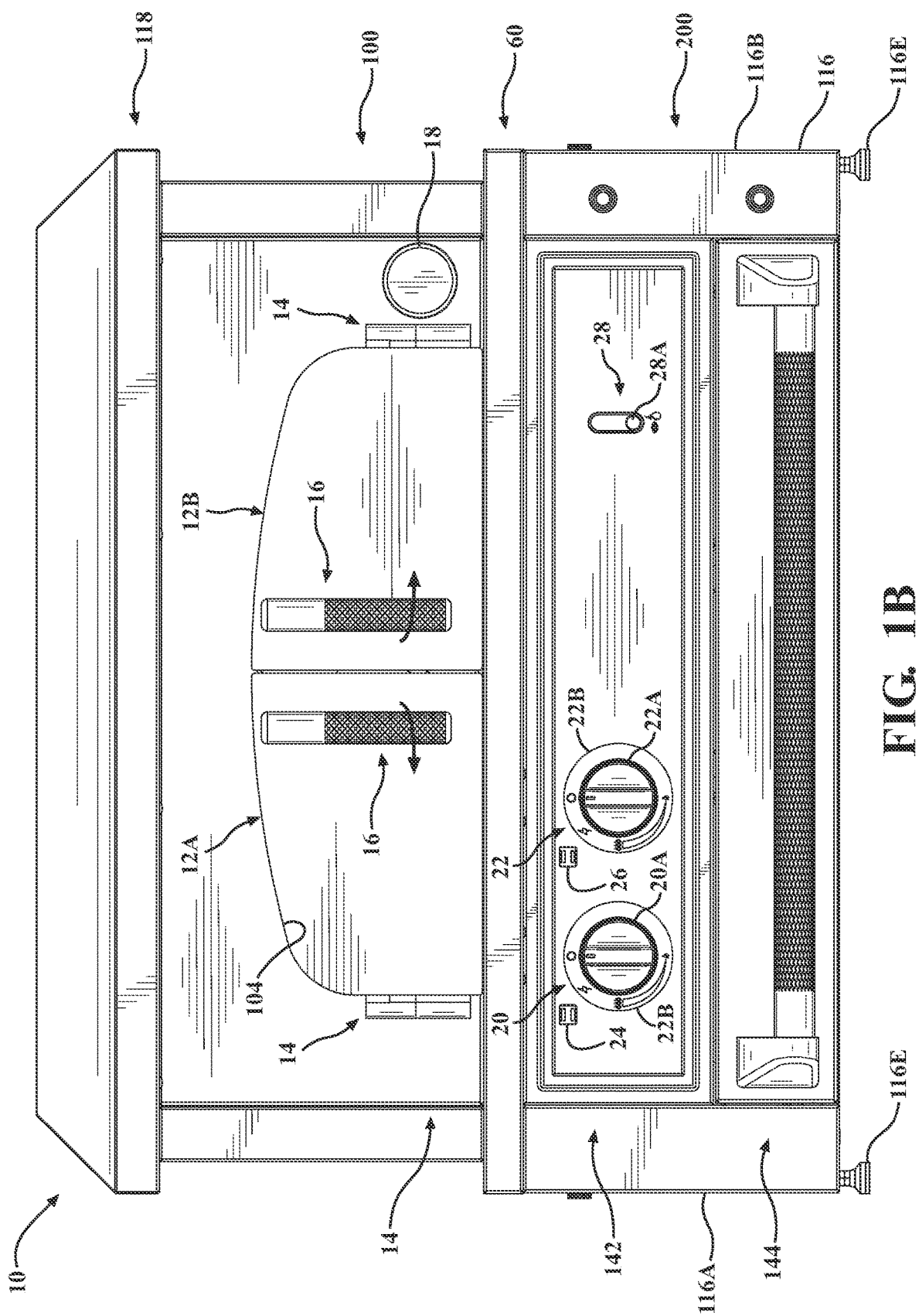
FIG. 1B is a front elevational view of the oven shown in FIG. 1A.

Returning to FIGS. 1A-1D, in the illustrated embodiment, the oven 10 includes first and second doors 12A, 12B. As explained in further detail below, the first and second doors 12A, 12B may commercial, dual-layered doors and include a sealing gasket (see below) and are rotatably coupled to the upper assembly 100 via respectively hinges 14. The first and second doors 12A, 12B assist in quickly heating and maintaining the heat within the cooking chamber 102. In another aspect of the present invention, the first and second doors 12A, 12B may be removable. The oven 10 includes first and second handles 16 mounted to the respective first and second doors 12A, 12B. In one embodiment, the handles 16 may be rotated to lock/unlock the doors. In the illustrated embodiment, the first and second doors 12A, 12B are locked when the handles 16 are upright and parallel (as shown in FIG. 1B). The first and second doors 12A, 12B may be unlocked by rotating the handles 16 in opposite directions, as indicated by the arrows in FIG. 1B. A thermometer 18 measures and displays the temperature of the cooking chamber 102. The handles 16 may have a textured surface. For example, in the illustrated embodiment the surface of the handles 16 are knurled, i.e., have small ridges.

The oven 10 may be provided or arranged in difference configurations. For example as shown in FIGS. 1A and 1B, the oven 10 may be arranged in a tabletop configuration in which the lower assembly 200 of oven 10 is mounted inside an enclosure 116 and a lower edge or bottom of the lower assembly 200 is suspended a short distance over a resting surface, such as a non-combustible countertop (not shown). With particular reference to FIG. 1E, the enclosure 116 may include a first enclosure side panel 116A, a second enclosure side panel 116B and a back enclosure panel 116C which connects that first and second enclosure side panels 116A, 116B. Fuel or gas may be fed to the oven 10 via a swiveling elbow connector 116D. A plurality of swivel leveling mounts 116E are mounted to a bottom side of the first and second enclosure panels 116A, 116B. The swivel leveling mounts 116E are adjustable and allow the oven 10 to be leveled.

Figure 1C:
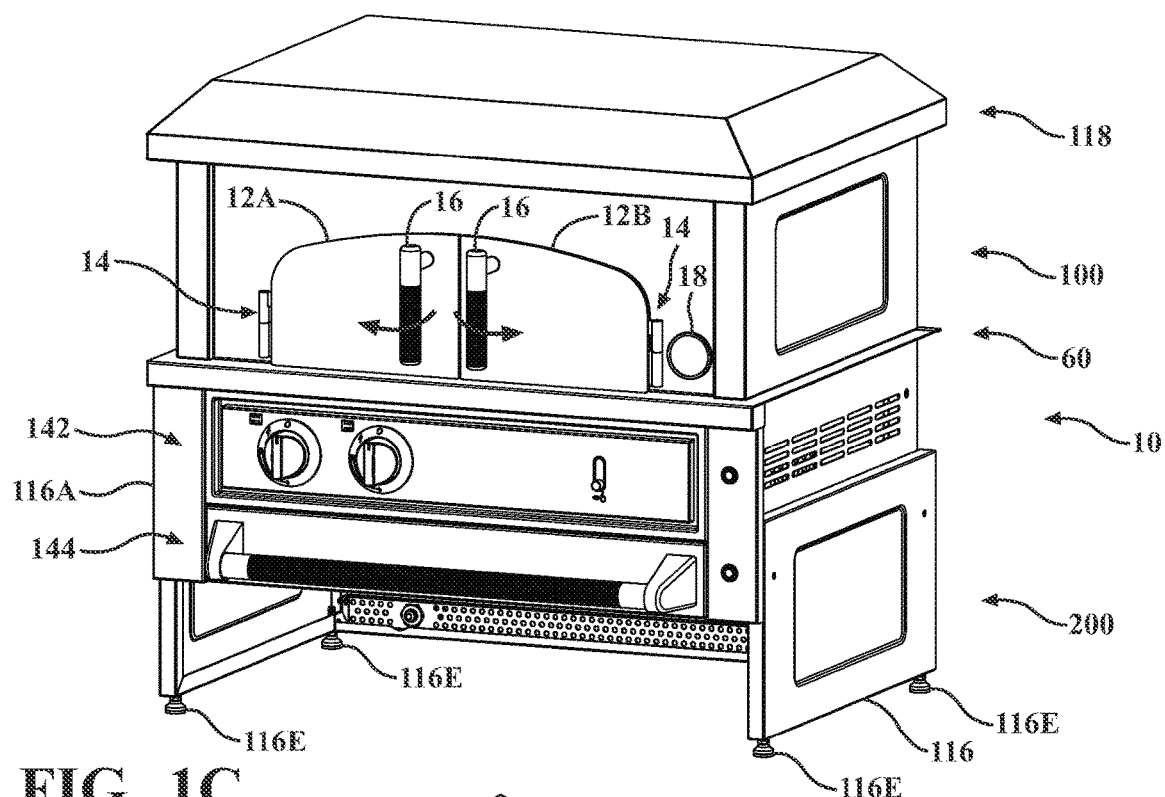
FIG. 1C is a perspective view of the oven shown in FIG. 1A in an elevated configuration.
Figure 1D:
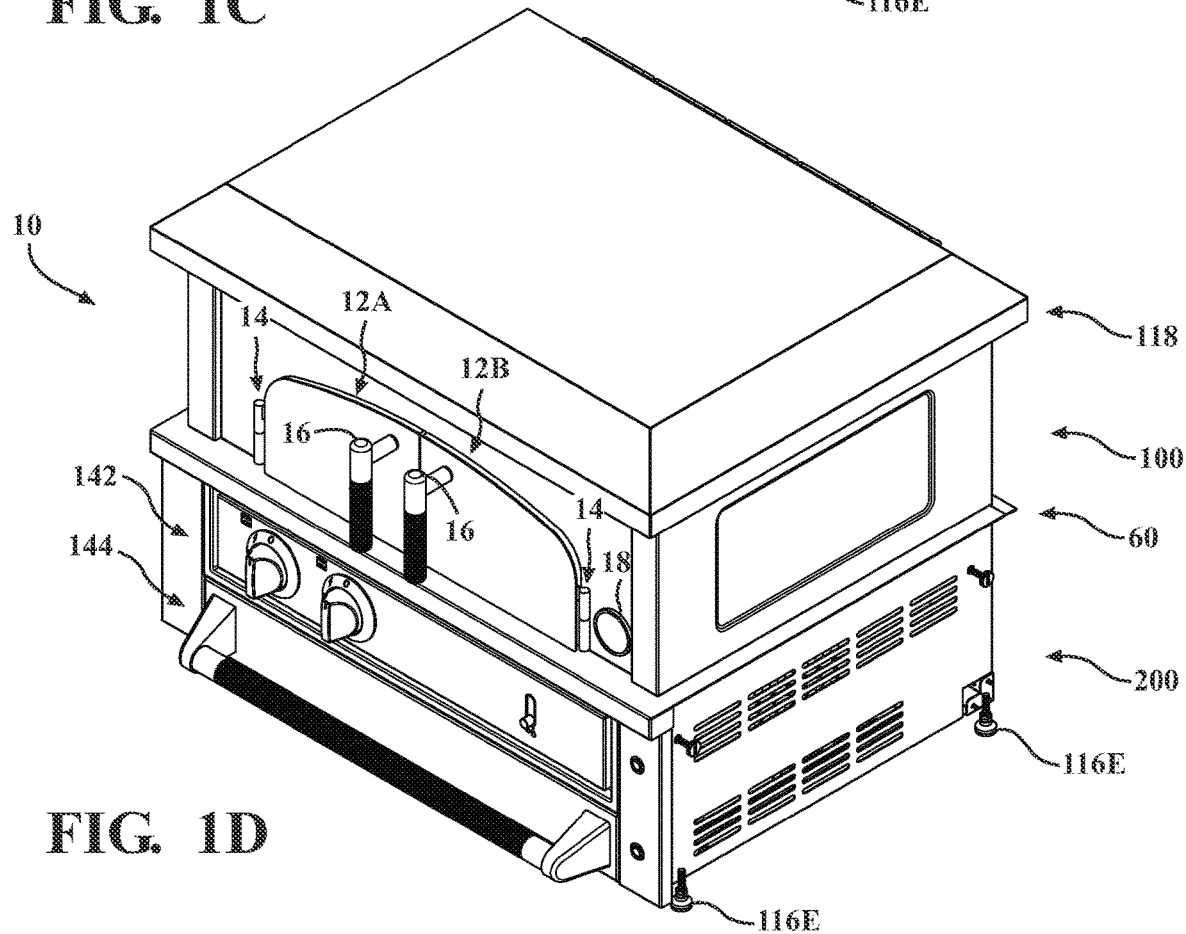
FIG. 1D is a perspective view of the oven shown in FIG. 1A in a built-in configuration.
Figure 1E:
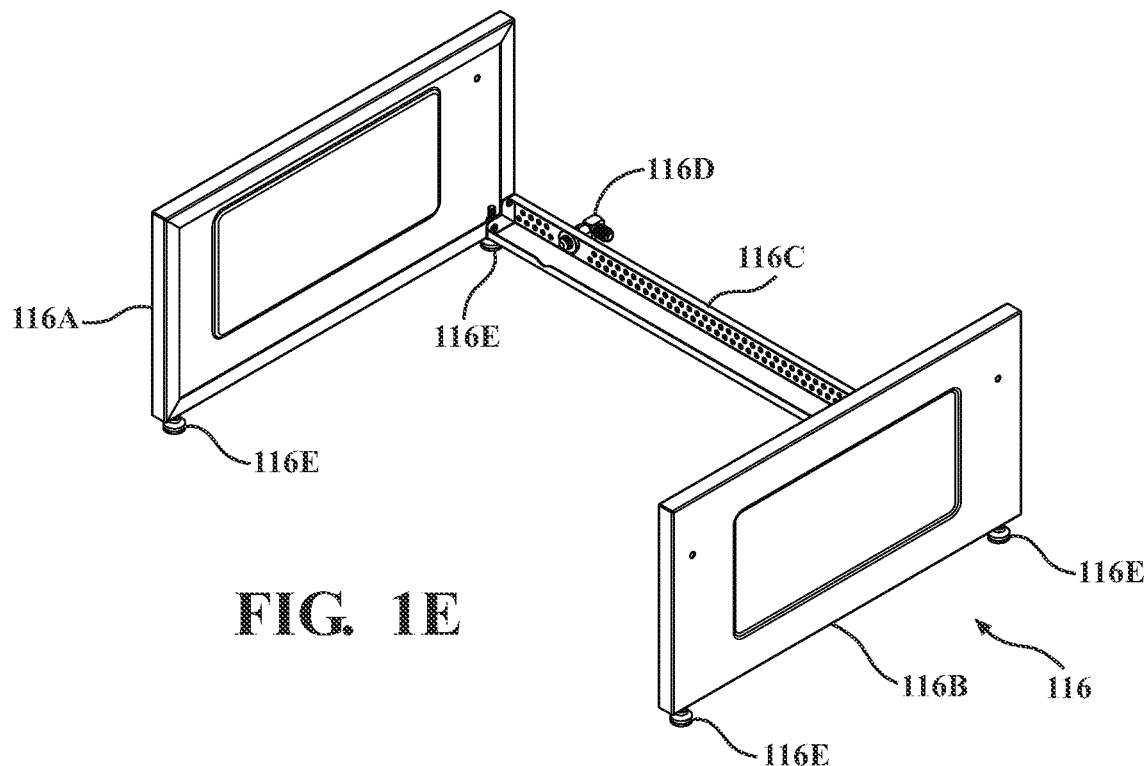
FIG. 1E is a perspective view of an enclosure that may be used with the oven shown in FIG. 1A.

As shown, in FIG. 1C, the oven 10 may be arranged in an elevated configuration in which the lower assembly 200 is mounted within the enclosure 116 at an elevated or raised position. In the elevated configuration, the lower assembly 200 is mounted within the enclosure 116 such that the lower edge or bottom of the lower assembly 200 is elevated a greater distance above the resting surface (not shown) to provide additional airflow underneath the oven 10.

Additionally, the oven 10 may be provided or used without the enclosure 116 in a built-in configuration. The oven 10 in the built-in configuration may be mounted, for example, within other or existing indoor or outdoor cabinetry (not shown).

As shown in FIGS. 2A-2C, the lower assembly 200 includes an internal cavity 202 and a fire box 204 located within the internal cavity 202. The fire box 204 includes a first heat source 206. In one embodiment, the first heat source 206 includes a first (or main) gas burner 206A. In the illustrated embodiment, the first gas burner 206A is "H-shaped" and is rated at 18,000 BTU. A second (or back) heat source gas burner 206B (see below) extends above the lower assembly 200 into the cooking chamber 102 of the upper assembly 100. The second heat source 206B may be a rear gas tube burner rated at, e.g., 22,000 BTU.

The oven 10 further includes a first heat absorbing and emanating device 60 located between the upper and lower assemblies 100, 200. The first heat absorbing and emanating device 60 is configured to absorb heat from the heat source 206 and emanate heat into the cooking chamber 102 of the upper assembly 100. As shown in the illustrated embodiment, the first heat absorbing and emanating device 60 includes a plurality, e.g., three, of food grade ceramic cooking stones 62 that form a cooking surface 64. The ceramic cooking stones 62 may have a thickness of 30 mm. The plurality of ceramic cooking stones 62 are heated directed from below by the first gas burner 206A (as shown by arrows A) and emanate heat into the cooking chamber 102 to ensure that the bottom of the food product placed on the ceramic cooking stones 62 are heated thoroughly. The second gas burner 206B directly heats the cooking chamber 102 to cook the food product. A heat guard 66 separates the second gas burner 206B from the rest of the cooking chamber 102 of the upper assembly 100 to protect the food product from the flames from the second gas burner 206B.

In the illustrated embodiment, the oven 10 includes a second heat absorbing and emanating device 70 positioned at the top of the cooking chamber 102. As shown, includes a ceramic cooking stone 72.

As shown in FIGS. 2A-2C, the upper assembly 100 includes an outer dome 106 and an inner dome 108. The outer dome 106 forms the exterior of the upper assembly 100. The inner dome 108 is located within the outer dome 106 and forms a first airflow pathway 110 and a second airflow pathway 112. As shown, in the illustrated embodiment, each of the first and second airflow pathways 110, 112 having a first end 110A, 112A located at a bottom of the upper assembly 100 and being open to the internal cavity 202 of the lower assembly 200. The first airflow pathway 110 has a second end 110B that terminates at a heating vent 114 located on an inner wall 108A of the inner dome 108. The first airflow pathway 110 is configured to allow heated air from the heat source 206 to enter the cooking chamber 102. The second airflow pathway 112 has a second end 112B located at an upper portion of the upper assembly 100. As discussed in more detail below, the outer dome 106 includes a number of upper and lower (or exhaust) vents 118J, 118O to allow heated air to escape the oven 10. In one embodiment, as shown in FIG. 2A, the first and second airflow pathways 110, 112 are separated by an interior wall 111.

In operation, the ceramic cooking stone 72 of the second heat absorbing and emanating device 70 absorbs and retains heat from the heated air of the first airflow pathway 110.

Figure 1F:
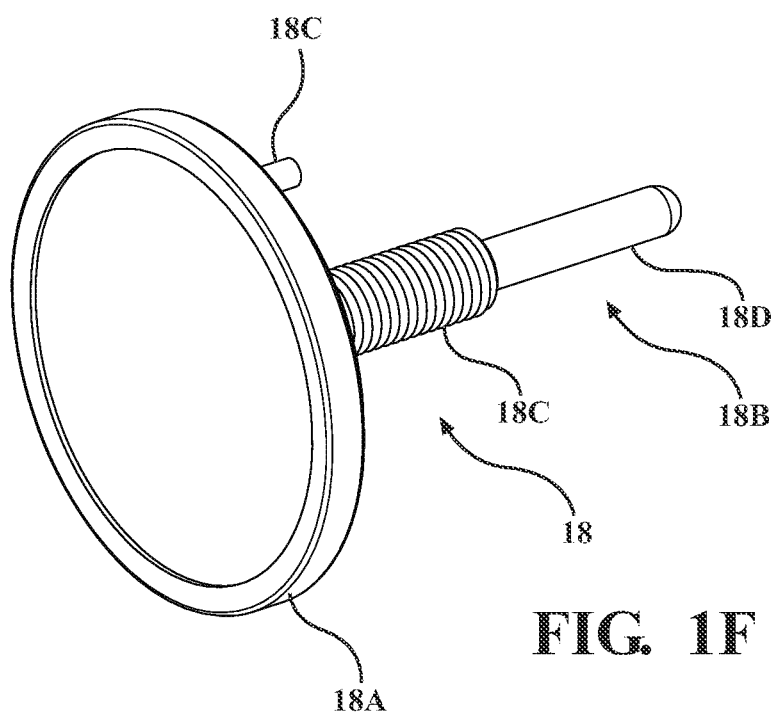
FIG. 1F is a perspective view of a thermometer of the oven of FIG. 1A.

As shown in FIG. 1F, the thermometer 18 includes a dial 18A that includes an indicator (not shown), such as a radial indicator, to provide a visual indication of the temperature in the cooking chamber 102. The thermometer 18 further includes a stem 18B extending from the back of the dial 18A. The stem 18B is threaded at an upper end 18C located adjacent the dial 18A. A sensing element (not shown) is located within a lower end 18D of the stem 18B. A positioning pin 18E assists orientating the thermometer 18 within the upper assembly 100.

Figure 3A:
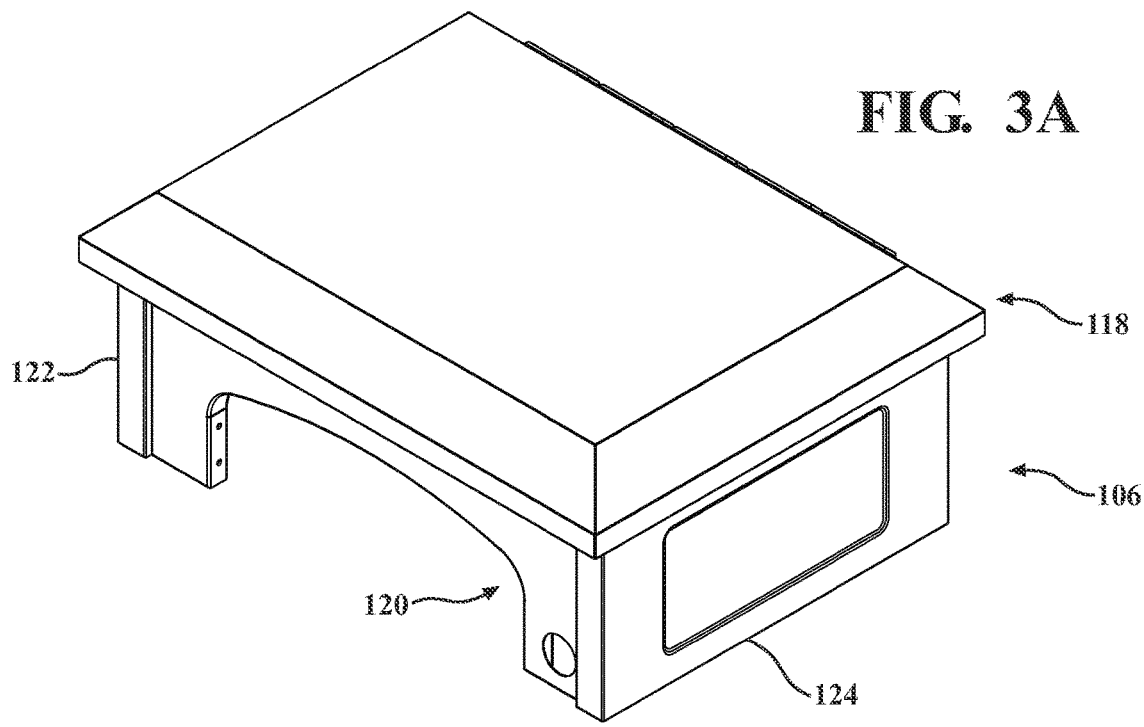
FIG. 3A is a first perspective view of an outer dome of the upper assembly of the oven of FIG. 1A.
Figure 3B:
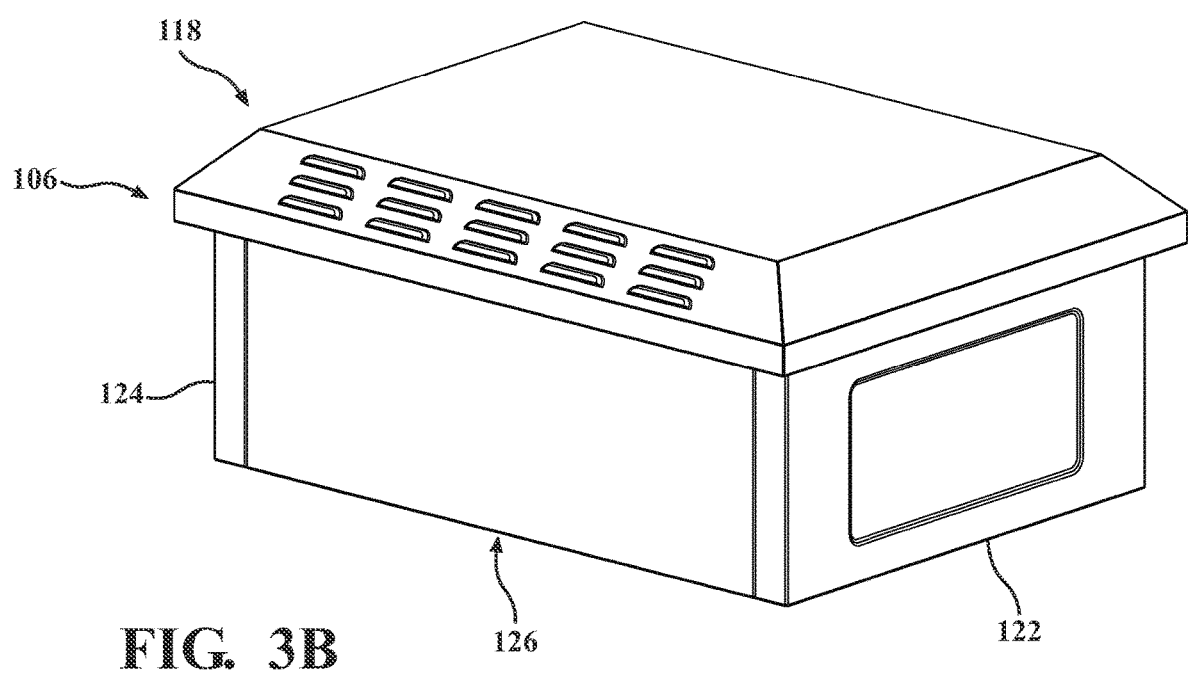
FIG. 3B is a second perspective view of the outer dome of FIG. 3A.

With reference to FIGS. 3A-3B, the outer dome 106 includes an outer dome top panel 118, an outer dome front panel 120, an outer dome first side panel 122, an outer dome second side panel 124 and an outer dome back panel 126. In one embodiment of the present invention, the outer dome panels 118, 120, 122,124, 126 are composed from stainless steel and are connected using fasteners, such as screws, to form the outer dome 106.

Figure 3C:
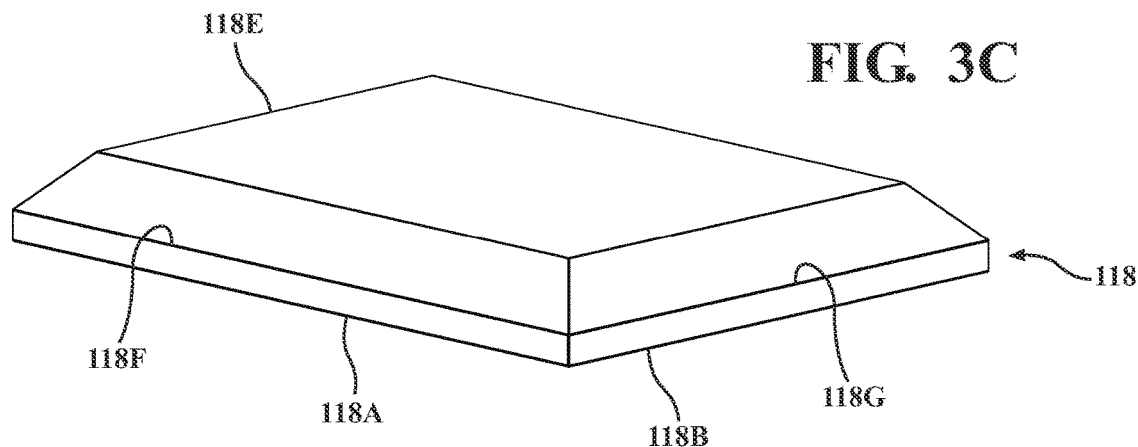
FIG. 3C is a first perspective view of an outer dome top panel of the outer dome of FIG. 3A.
Figure 3D:
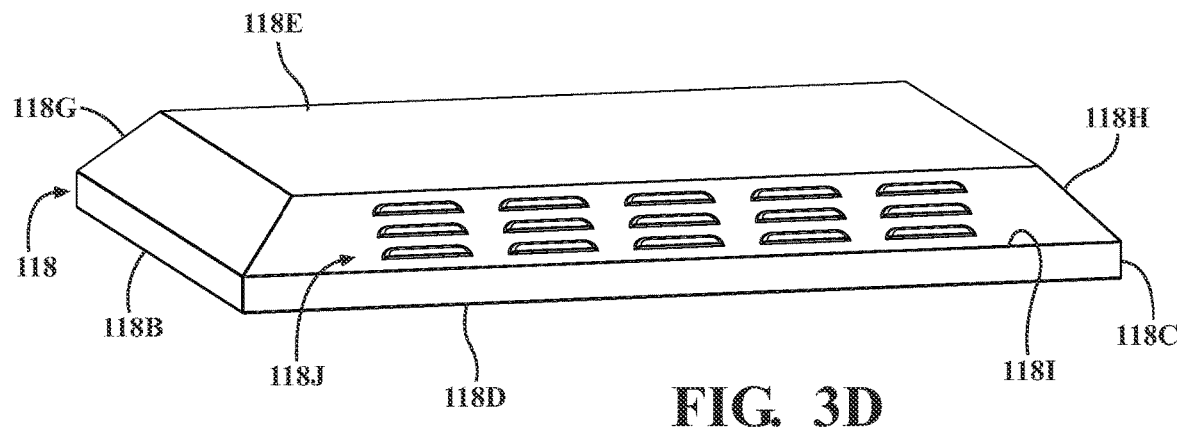
FIG. 3D is a second perspective view of the outer dome top panel of FIG. 3C.
Figure 3E:
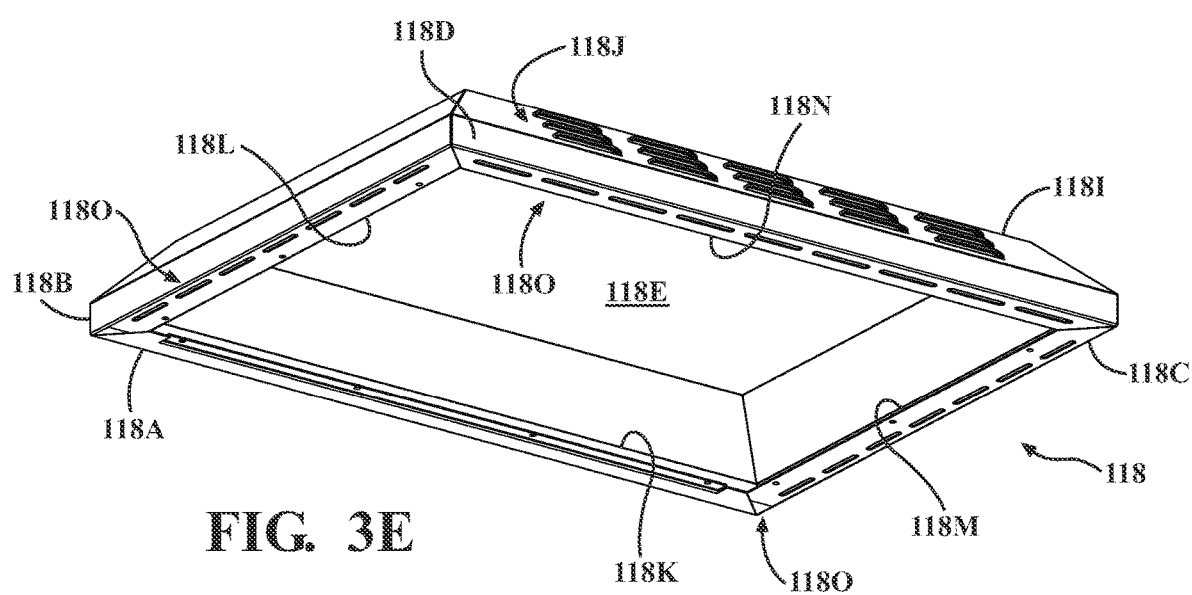
FIG. 3E is a third perspective view of the outer dome top panel of FIG. 3C.

With respect to FIGS. 3C, 3D and 3E, in the illustrated embodiment, the outer dome top panel 118 has a generally rectangular outer shape formed by first, second, third and fourth lower sides 118A, 118B, 118C, 118D. A rectangular top surface 118E forms the top of the outer dome top panel 118. Upper edges of each of the first, second, third and fourth sides 118A, 118B, 118C, 118D are connected to outer sides of the rectangular top surface 118E by respective first, second, third and fourth sloping side walls 118F, 118G, 118H, 118I.

One or more of the sloping side walls 118F, 118G, 118H, 118I may include a plurality of upper vents 118J. As shown in FIG. 3E, first, second, third and fourth flanges 118K, 118L, 118M, 118N extend inward from the respective first, second, third and fourth sides 118A, 118B, 119C, 118D. One or more of the flanges 118K, 118L, 118M, 118N may include a plurality of downwardly facing lower vents 118O. Returning to FIG. 2, the upper vents 118J and the lower vents 118O are located at the end of the second airflow pathway 112. The upper and lower vents 118J, 118O act as exhaust vents by providing a pathway for heated air to exit the oven 10.

Figure 3F:
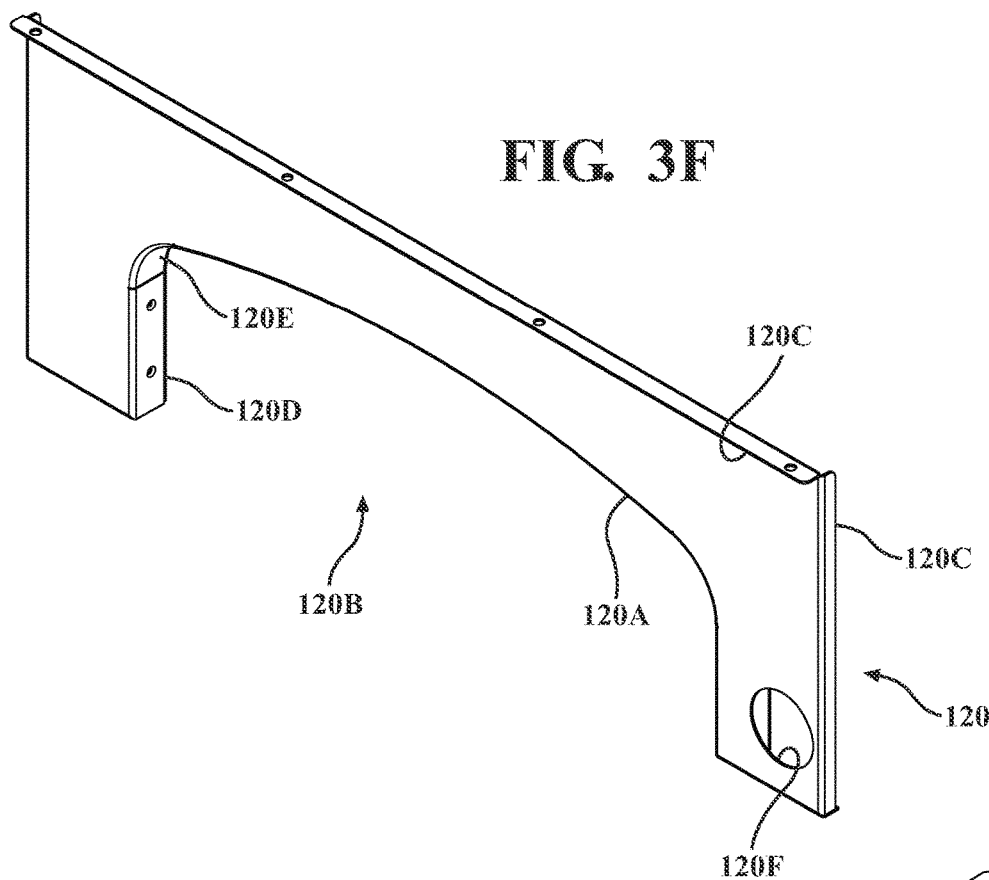
FIG. 3F is a first perspective view of an outer dome front panel of the outer dome of FIG. 3A.
Figure 3G:
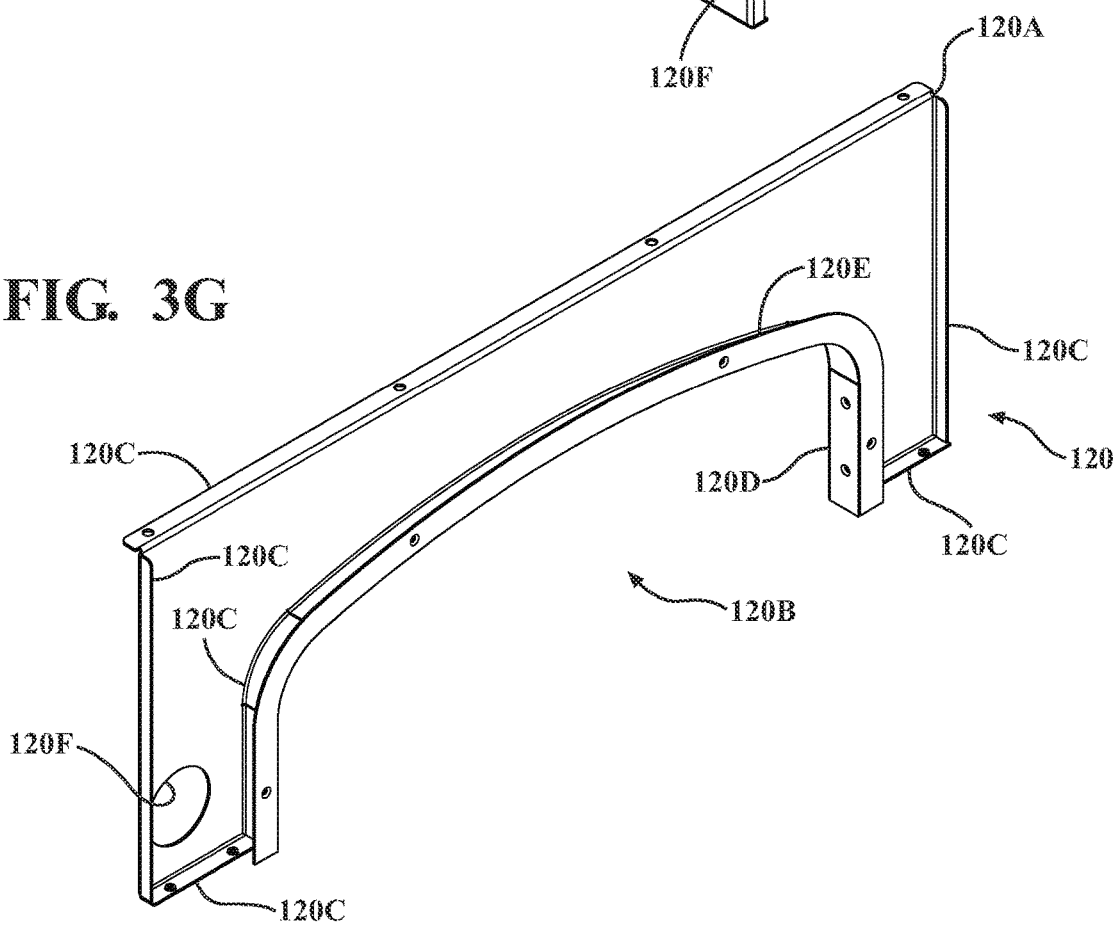
FIG. 3G is a second perspective view of the outer dome front panel of FIG. 3F.

With reference to FIGS. 3F and 3G, the outer dome front panel 120 includes an outer dome front inner side 120A. The outer dome front inner side 120A includes a door cutout 120B for receiving the first and second doors 12A, 12B. In the illustrated embodiment, a plurality of flanges 120C extend away from (inwardly or outwardly) the edges of the outer dome front inner side 120A. The flanges 120C may include one or more apertures for receiving fasteners (not shown) to connect the outer dome front panel 120 to the outer dome top panel 118, the outer dome first and second side panels 122, 124 and/or the lower assembly 200. The hinge 14 may be mounted to hinge support brackets 120D which are connected to the flange 120C extending inwardly from the door cutout 120B. An outer dome front panel support 120E connected to the flange 120C extending inwardly from the door cutout 120B may provide additional support to the first and second doors 12A, 12B and the hinges 14. The front inner panel 12D may further include a thermometer cutout 120F for receiving the thermometer 18.

Figure 3H:
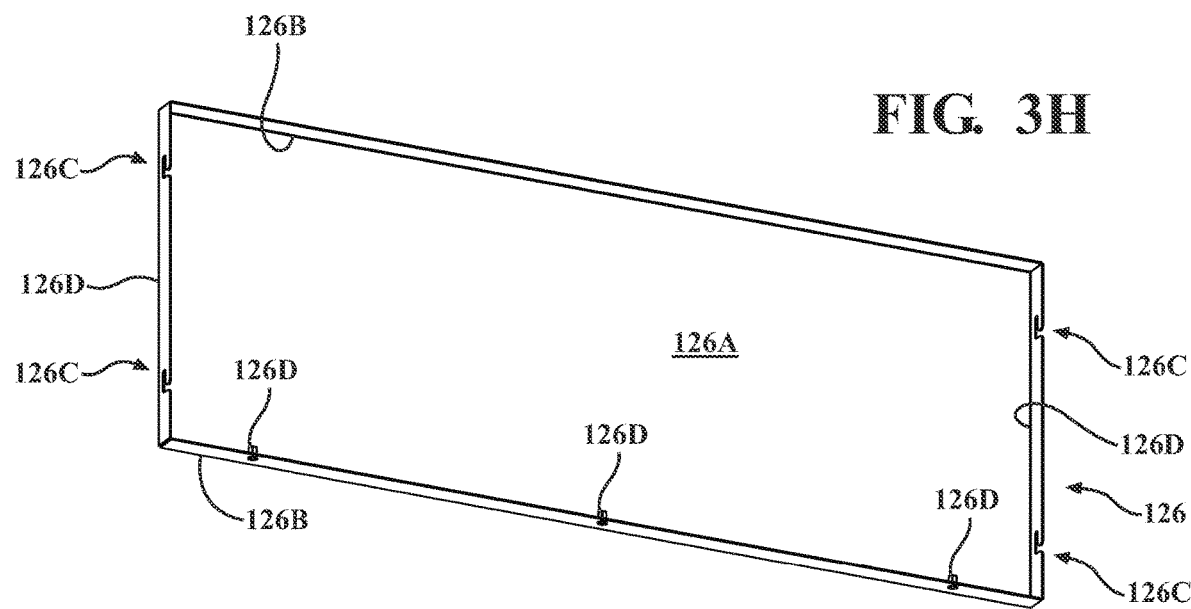
FIG. 3H is a perspective view of an outer dome back panel of the outer dome of FIG. 3A.

With reference to FIG. 3H, the outer dome back panel 126 includes an outer dome back side 126A and a plurality of outer dome back panel flanges 126B extending away from the edge of the outer dome back side 126A. The outer dome back panel flanges 126B may include one or more apertures or slots 126C for receiving fasteners (not shown) to connect the outer dome back panel 126 to the outer dome side panels 122, 124 and/or the lower assembly 200. In the illustrated embodiment, a plurality of rivet nuts 126D may be coupled to a lower one of the outer dome back panel flanges 126B for receiving appropriate fasteners (not shown).

Figure 3I:
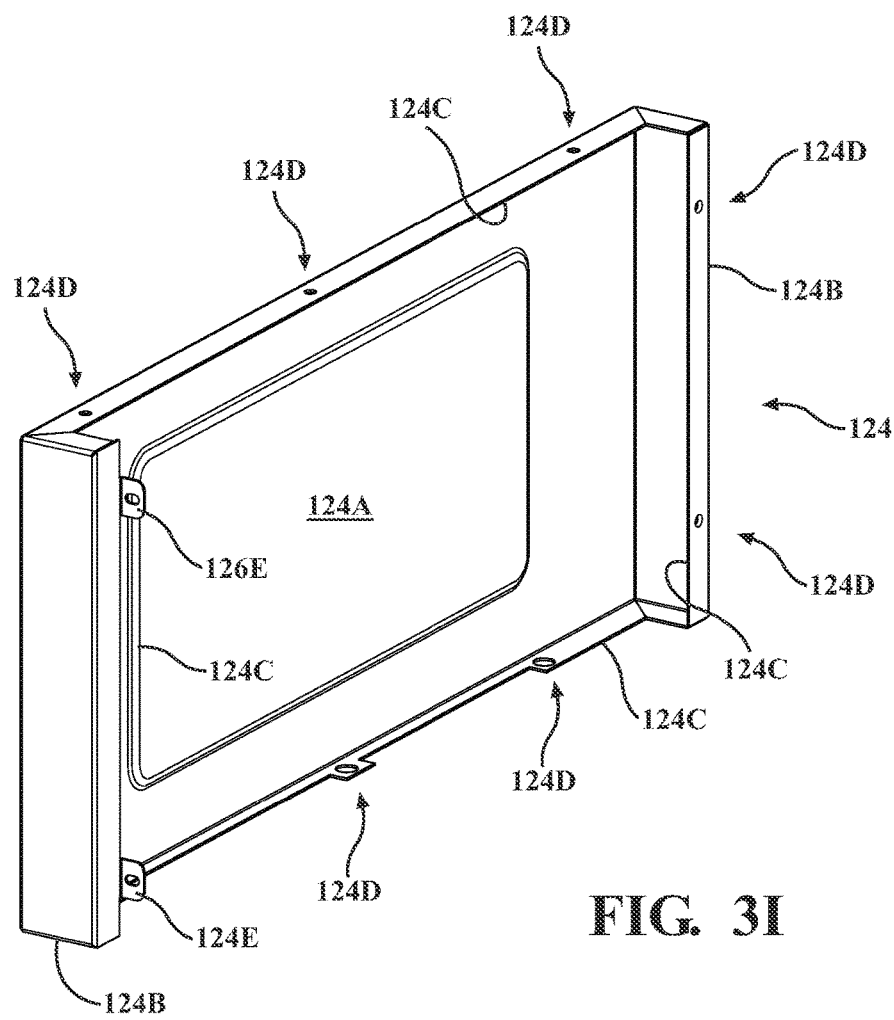
FIG. 3I is a perspective view of an outer dome side panel of the outer dome of FIG. 3A.

With reference to FIG. 3I, a perspective view of the outer dome second side panel 124 is shown. The outer dome first side panel 122 is similar. The outer dome second side panel 124 includes an outer dome side panel side 124A and outer dome side panel extensions 124B. A plurality of flanges 124C extend from top and bottom edges of the outer dome side panel side 124A and from the outer dome side panel extensions 124B. The flanges 124C may include apertures 124D or tabs with apertures 124E for receiving fasteners (not shown) to connect the outer dome side panel 124 to the outer dome top panel 118, the first and second side panels 122, 124, and the lower assembly 200.

Figure 4A:
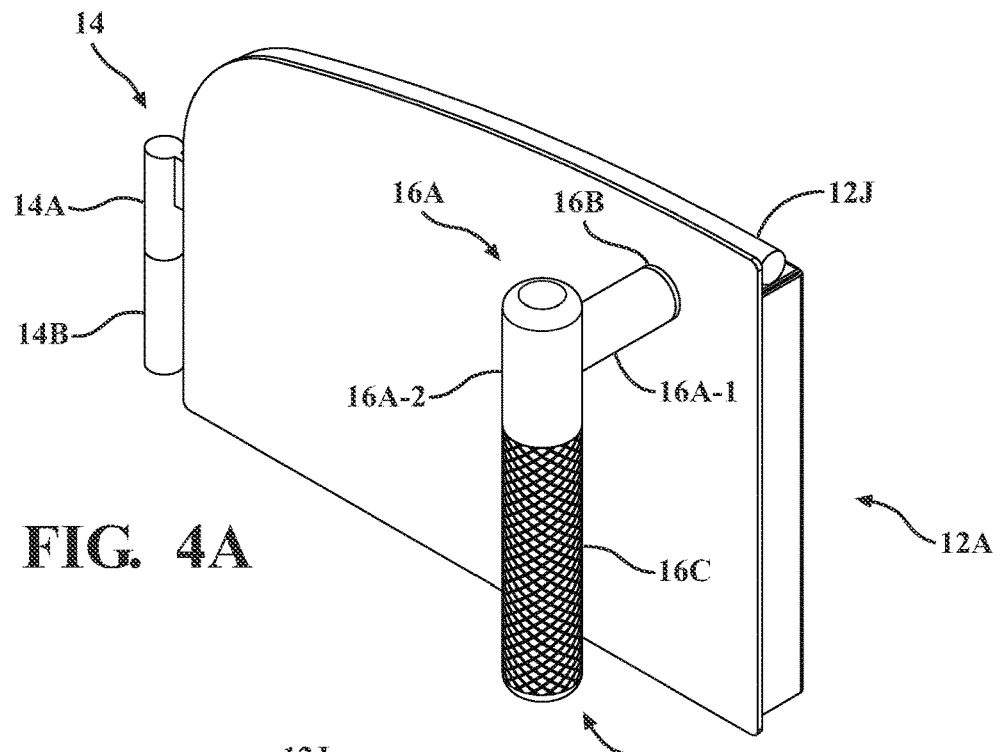
FIG. 4A is a first perspective view of a first door of the oven of FIG. 1A.
Figure 4B:
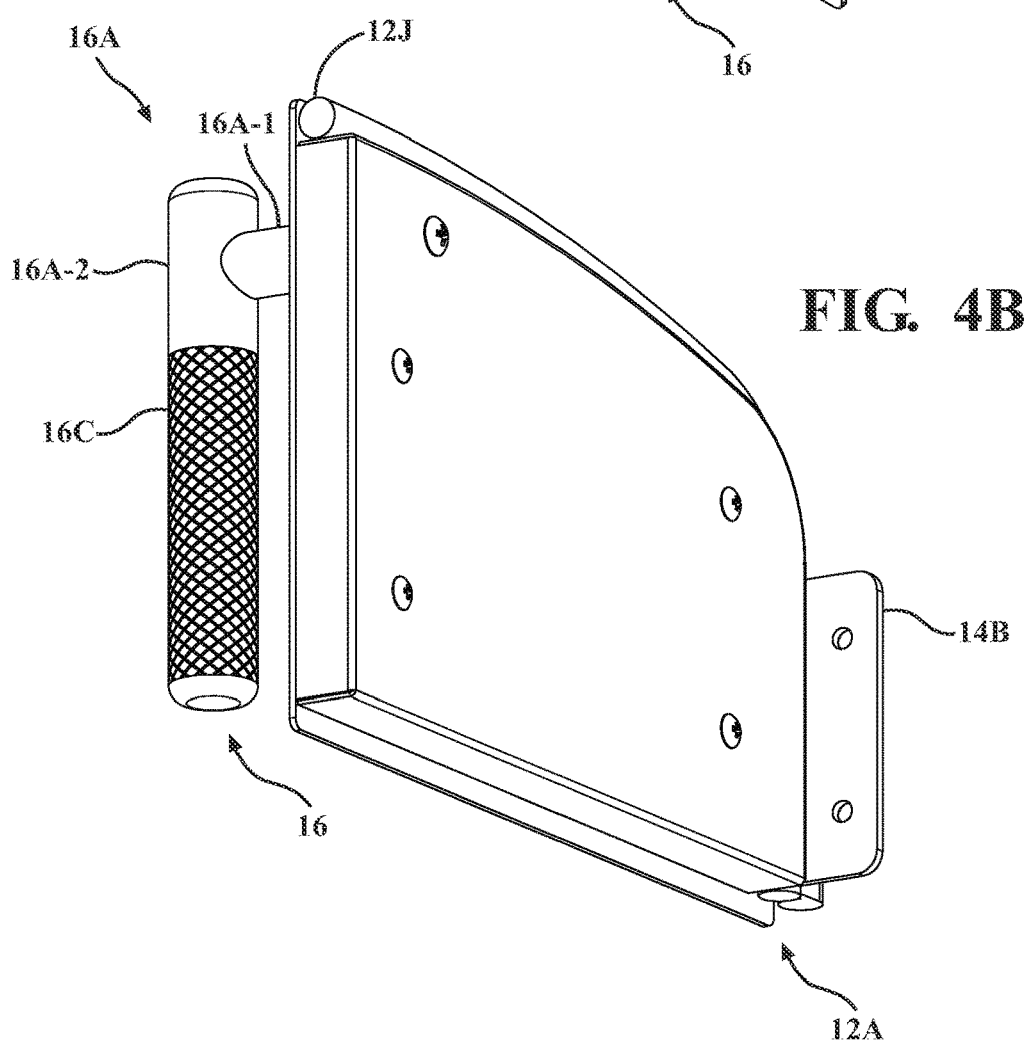
FIG. 4B is a second perspective view of the first door of FIG. 4A.
Figure 4C:
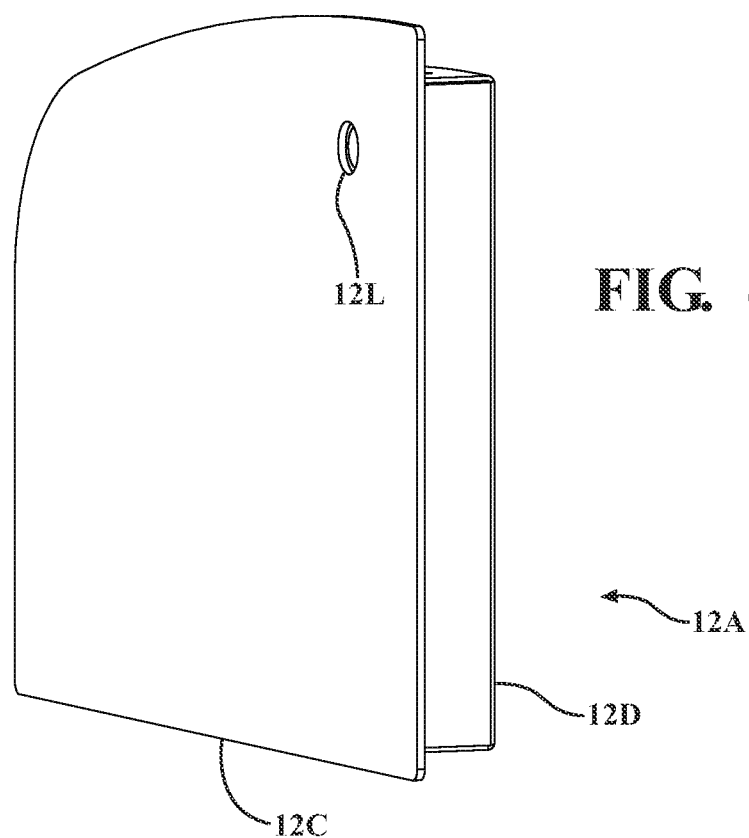
FIG. 4C is a first perspective view of an outer door panel of the first door of FIG. 4A.
Figure 4D:
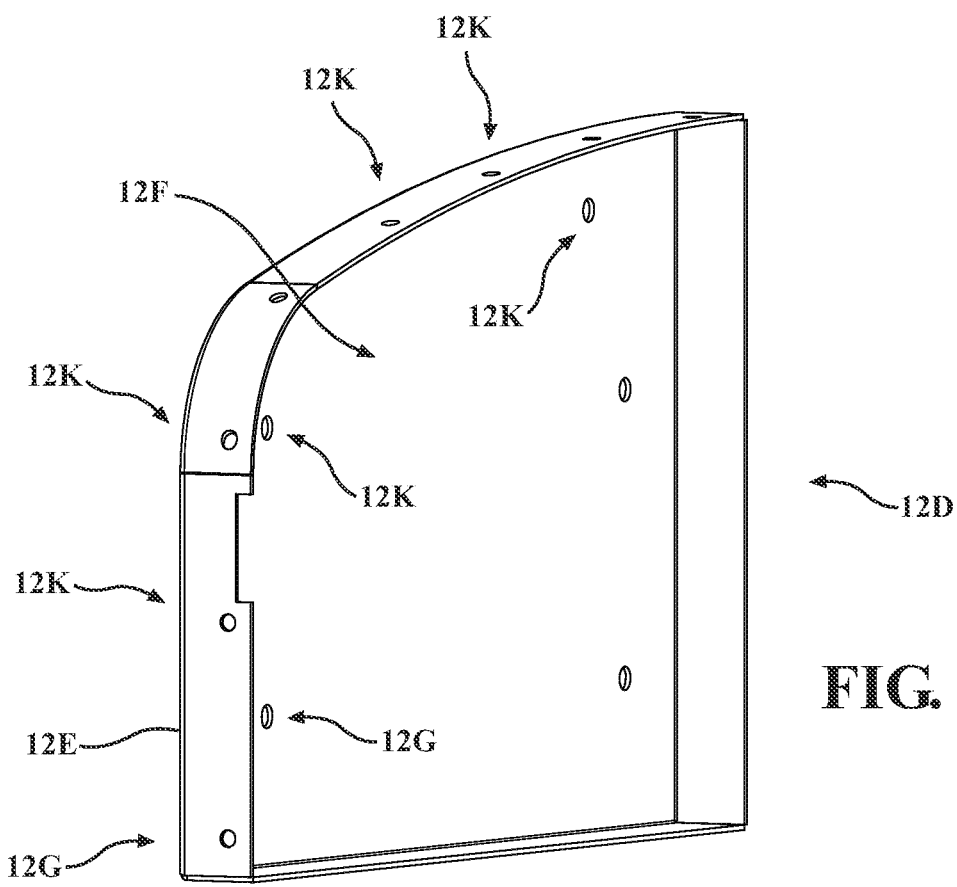
FIG. 4D is a second perspective view of the outer door panel of FIG. 4C.
Figure 4E:
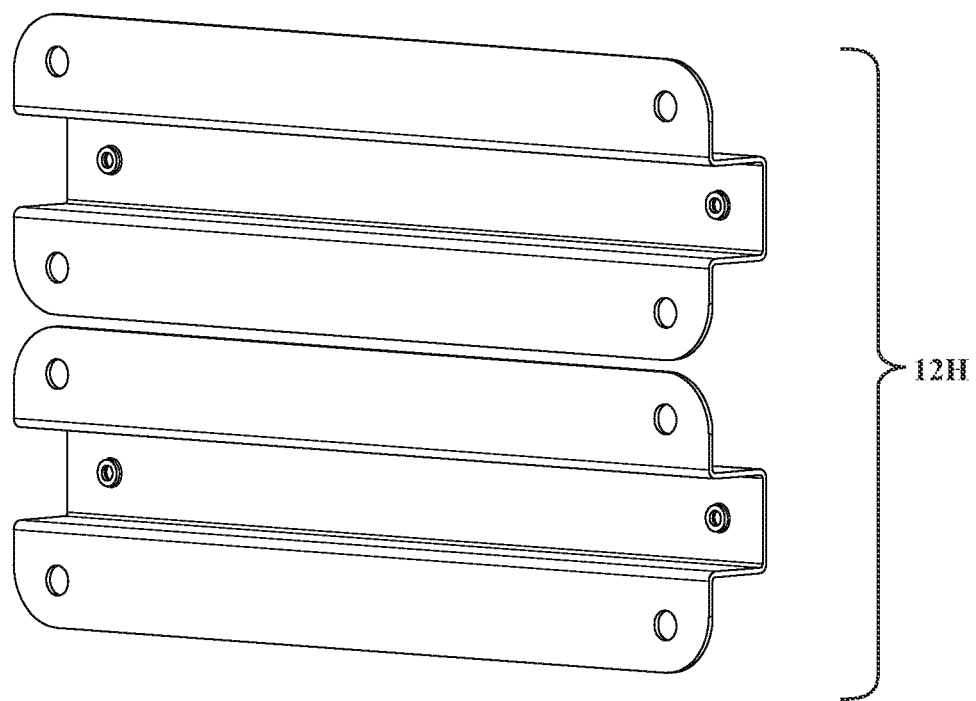
FIG. 4E is a perspective view of a plurality of door brackets of the first door of FIG. 4A.
Figure 4F:
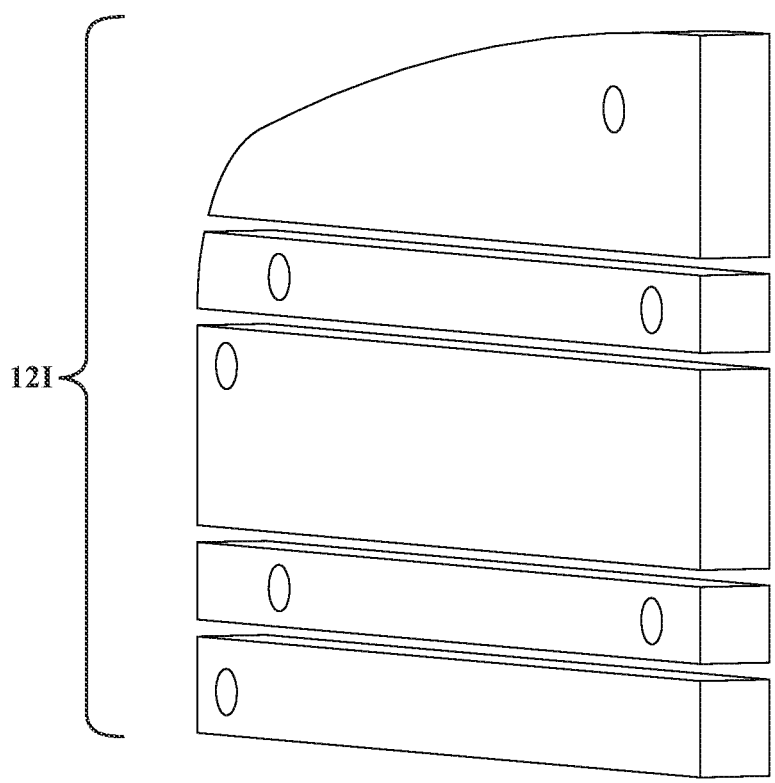
FIG. 4F is a perspective view of a plurality of insulation panels of the first door of FIG. 4A.
Figure 4G:
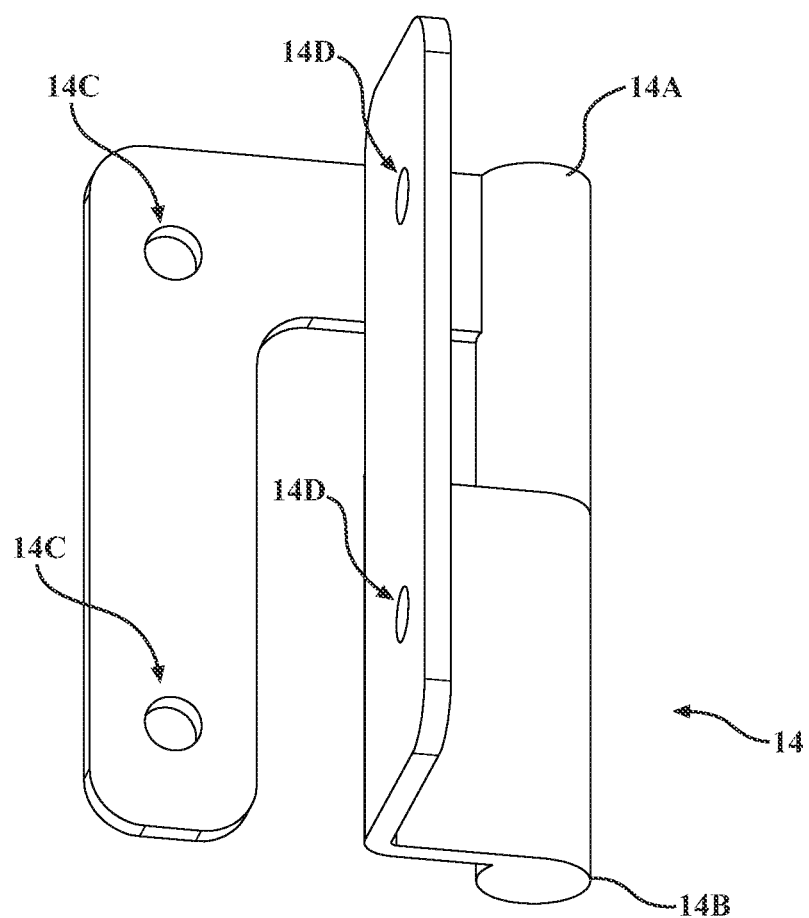
FIG. 4G is a perspective view of a hinge for the first door.
Figure 5E:
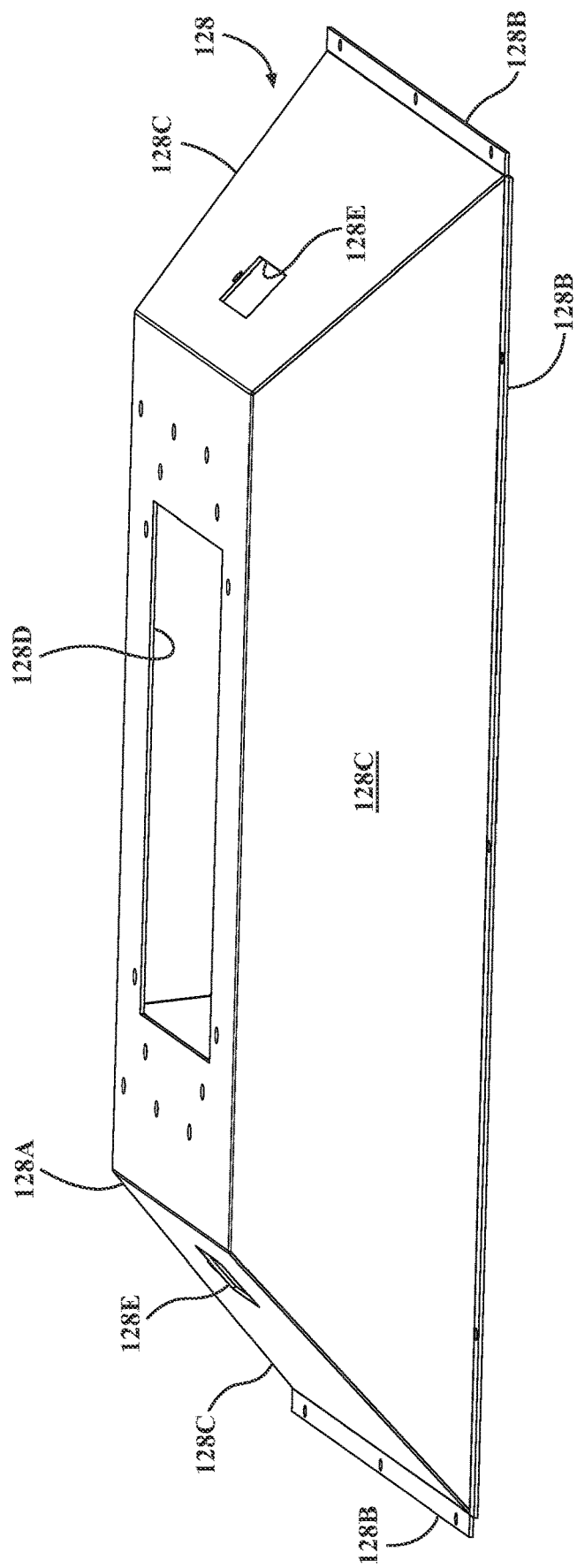
FIG. 5E is a first perspective view of the inner dome upper portion of FIG. 5A.

With reference to FIGS. 4A-4G, the first door 12A includes an outer door panel 12C and an inner door panel 12D. As shown, the hinge 14 includes an upper hinge portion 14A and a lower hinge portion 14B. The upper hinge portion 14A includes apertures 14C for receiving fasteners (not shown) to couple the first door 12A to an inner surface of the outer door panel 12C. The lower hinge portion 14B includes a plurality of apertures 14D for receiving fasteners (not shown) to couple the first door 12A to the outer dome front panel 120. With reference to FIGS. 4C and 4D, the inner door panel 12D includes a flange 12E that extends from the outer periphery of the inner door panel 12D towards the outer door panel 12C to form an inner door cavity 12F between the outer and inner door panels 12C, 12D. A notch 12M within the flange 12E receives the lower hinge portion 14B. A plurality of door brackets 12H (FIG. 4E) and a plurality of insulation panels 121 are located within the inner door cavity 12F. A seal 12J may be affixed to at least a portion of an outer surface of the flange 12E. In the illustrated embodiment, the seal 12J has a diameter of 0.5 inches. The insulation panels 121 and the seal 12J help to retain heat within the cooking chamber 102. The inner door panel 12D and the flange 12E include a plurality of apertures 12K for receiving respective fasteners to connect the door brackets 12H, the outer door panel 12C and the hinge 14 to the inner door panel 12D. The outer door panel 12C includes a door handle aperture 12L for receiving the handle 16.

The second door 12B is similar, but in an opposite configuration, to the first door 12A, and therefore not shown in greater detail.

As mentioned above, the first and second doors 12A, 12B may be removable. The upper hinge portion 14A allows the respective first or second door 12A, 12B to be opened and closed and is removable from the lower portion 12B by lifting the first or second door 12A, 12B and the upper hinge portion 14A then the first or second door 12A, 12B is in the open position.

As shown in FIGS. 1A-4B, each handle 16 includes a handle base 16A, an insulation washer 16B and a handle portion 16C. The handle base 16A includes a handle base first portion 16A-1 is fastened to the respective first or second door 12A, 12B and extends outward therefrom. The insulation washer 16B is positioned between the handle base first portion 16A-1 and the outer door panel 12C. The handle base 16A includes a handle base second portion 16A-2 that is coupled to the handle base first portion 16A-1 and extends at a right angle therefrom as shown. In the illustrated embodiment, the handle portion 16C is located at an opposite end of the handle base second portion 16A-2. The handle portion 16C may have a textured surface, such as having grooves or ridges, to provide a gripping surface.

With reference to FIGS. 5A-5G, the inner dome 108 includes an inner dome upper portion 128 and a lower dome portion 130. A plurality of insulation pads 132 are affixed, for example, by adhesive, to an outer surface 128A of the inner dome upper portion 128 and the lower dome portion 130 to assist in keeping heat within the cooking chamber 102. A pair of halogen light assemblies 134 are mounted to the outside of the inner dome upper portion 128 which provide lighting to the cooking chamber 102. A plurality of insulation support brackets 136 mounted to the inner dome upper portion 128 by fasteners help maintain the insulation panels 132 mounted to the inner dome upper portion 128 in place.

With specific reference to FIGS. 5A-5D, the inner dome lower portion 130 includes an inner dome lower portion front panel 130A, inner dome lower portion back panel 130B and first and second inner dome lower portion side panels 130C, 130D. The inner dome lower portion front, back and side panels 130A, 130B, 130C, 130D are composed from stainless steel held together using appropriate fasteners (not shown). Flanges 130E extend from the inner dome lower portion side panels 130A, 130B, 130C, 130D include apertures for receiving appropriate fasteners to connect the inner dome lower portion 130 to the inner dome upper portion 128 and to the lower assembly 200. The inner dome lower portion front panel 130A includes a door cutout 130F that is aligned with the door cutout 120B in the outer dome front panel 120. The inner dome lower portion side panels 130C, 130D form part of the inner wall of the inner dome 108A (see above). In the illustrated each inner dome lower portion side panels 130C, 130D includes an exhaust vent 114. A first airflow pathway 110 is located on each side of the upper assembly 100 terminating at the respective heating vent 114.

With specific reference to FIGS. 5A, 5B, 5E and 5F, the inner dome upper portion 128 includes an upper portion top surface 128A. In the illustrated embodiment, the inner dome upper portion 128 has a generally rectangular shape define by the upper portion top surface 128A and an upper portion flange 128B. A plurality of upper portion side panels 128C extend from the upper portion top surface 128A to the upper portion flange 128B. The upper portion top surface 128A, upper portion flange 128B and upper portion side panels 128C are composed from stainless steel held together using appropriate fasteners (not shown).

The upper portion top surface 128A includes a cooking stone opening 128D. As shown in FIGS. 2A and 2B, the ceramic cooking stone 72 of the second heat absorbing and emanating device 70 rests on the inner dome upper portion 128 such that the ceramic cooking stone 72 is exposed to the cooking chamber 102. An inner dome upper portion 128 is fastened to the upper portion top surface 128A and retains the ceramic cooking stone 72 in place.

The pair of halogen light assemblies 134 are mounted to opposites upper portion side panels 128C. Light from the halogen light assemblies 134 enters the cooking chamber 102 through a pair of respective light openings 128E in the upper portion side panels 128C.

An inner dome heat exhaust panel 140 is fastened above the inner dome stone cover 138. Air from the cooking chamber 102 exhausts through an exhaust opening 128F and is routed towards the lower and upper vents 118O, 118J by an inner dome heat exhaust panel 140 fastened to the outer dome top panel 118 above the inner dome stone cover 138.

With reference to FIGS. 1D-1E, 6A-6B, 12 and 13, the oven 10 includes a control panel assembly 142 and a drawer assembly 144. The control panel assembly 142 provides controls to allow the burners 206A, 206B to be ignited and adjusted to heat the cooking chamber 102 to a desired temperature (see below). The drawer assembly 144 includes a drawer 144A in which food may be placed and kept warm (see below). In the illustrated embodiment the drawer 144A may have a depth of 15" and a depth of 14". The temperature within the drawer assembly 144 is dependent upon the temperature within the cooking chamber 102. In the illustrated embodiment, the ambient temperature within the drawer may range from 80-200 degrees Fahrenheit.

The control panel assembly 142 includes first and second knob assemblies 20, 22 and first and second ignition buttons 24, 26. Each burner knob assembly 20, 22 includes a respective rotatable knob 20A, 22A and bezel 20B, 22B. The first burner knob assembly and first and second ignition buttons 24, 26 may be used to ignite the first or main gas burner 206A and the second burner knob assembly and first and second ignition buttons 24, 26 may be used to ignite the second or rear gas burner 206B. For example, to ignite the first gas burner 206A, the first burner knob assembly 20 must be rotated to an ignition position (as indicated on the respective bezel 20B, 22B) and pushed inward (to allow gas to flow to the main gas burner 206A). Then the first ignition button 24 may be pressed to ignite the gas. Once the gas burner 206A, 206B has been ignited, the burner knob assemblies 20A, 20B to the desired level. The control panel assembly 142 further includes a see-through slide indicator 28. The see-through slide indicator 28 includes an indicator knob 28A. Indicator knob 28A is moveable between an open position and a closed position (shown in FIG. 1A). When the indicator knob 28A is in the open position, the interior of the lower assembly 200 is viewable such that visual configuration that the gas burner 206A is lit may be seen through a viewing glass (not shown).

Figure 13:
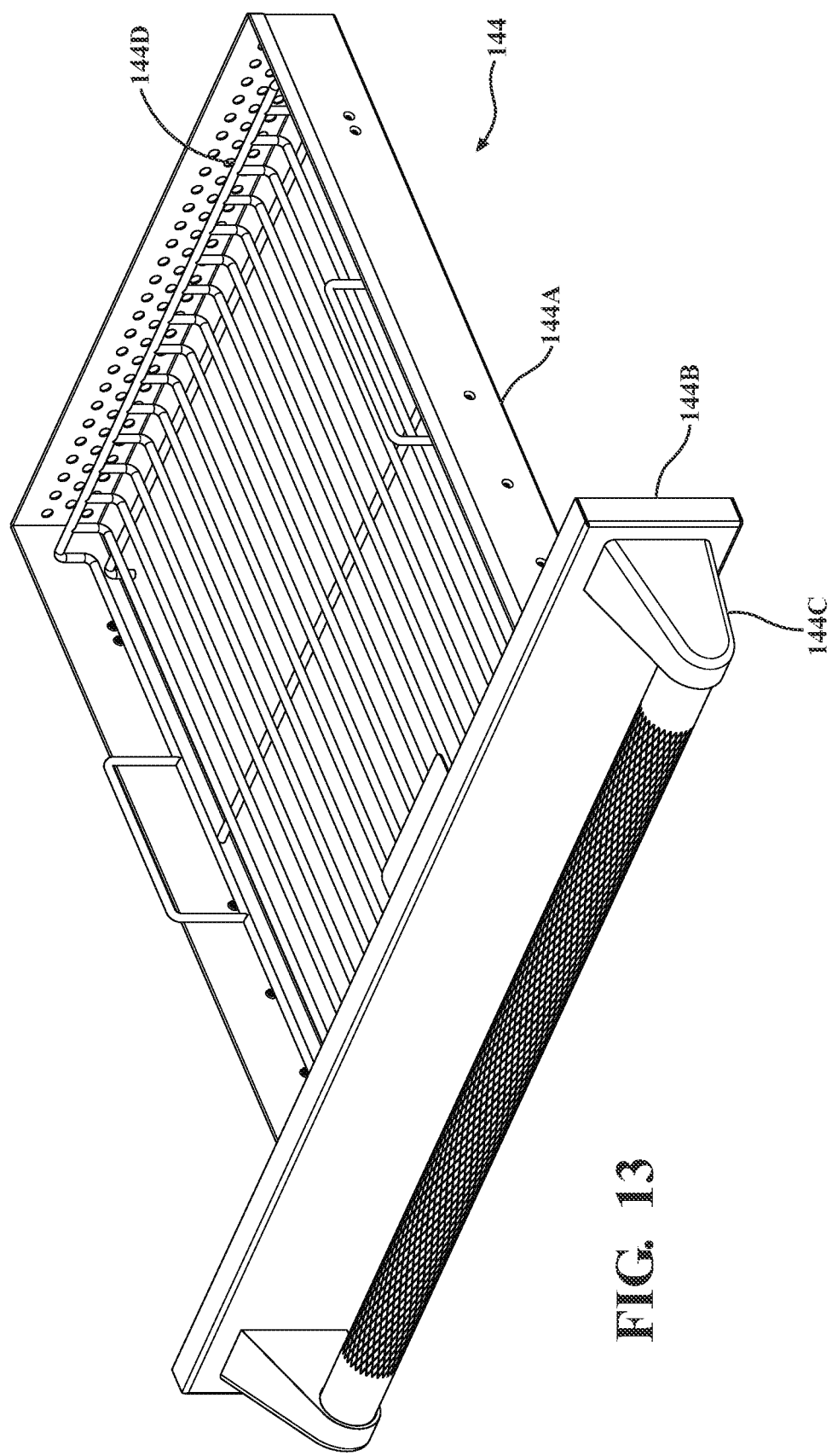

With reference to FIG. 13, the drawer assembly 144 includes the drawer 144A, a drawer front panel 144B, a drawer handle 144C and a warming rack 144D. The warming rack 144D fits within, and is removable from, the drawer 144A. The drawer front panel 144B is mounted to the drawer 144A and the drawer handle 144C is mounted to the drawer front panel 144B.

Figure 6A:
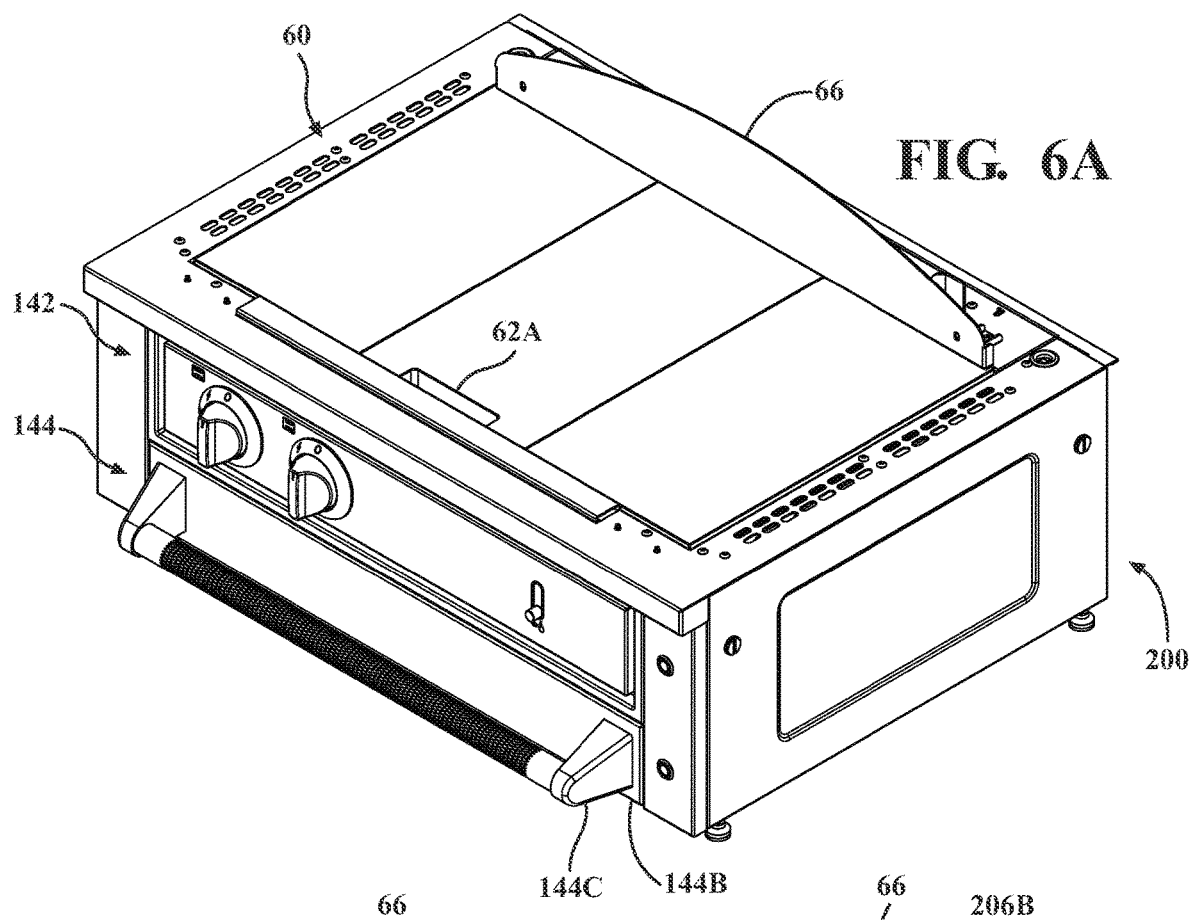
FIG. 6A is a first perspective view of the lower assembly of the oven of FIG. 1A.
Figure 6B:
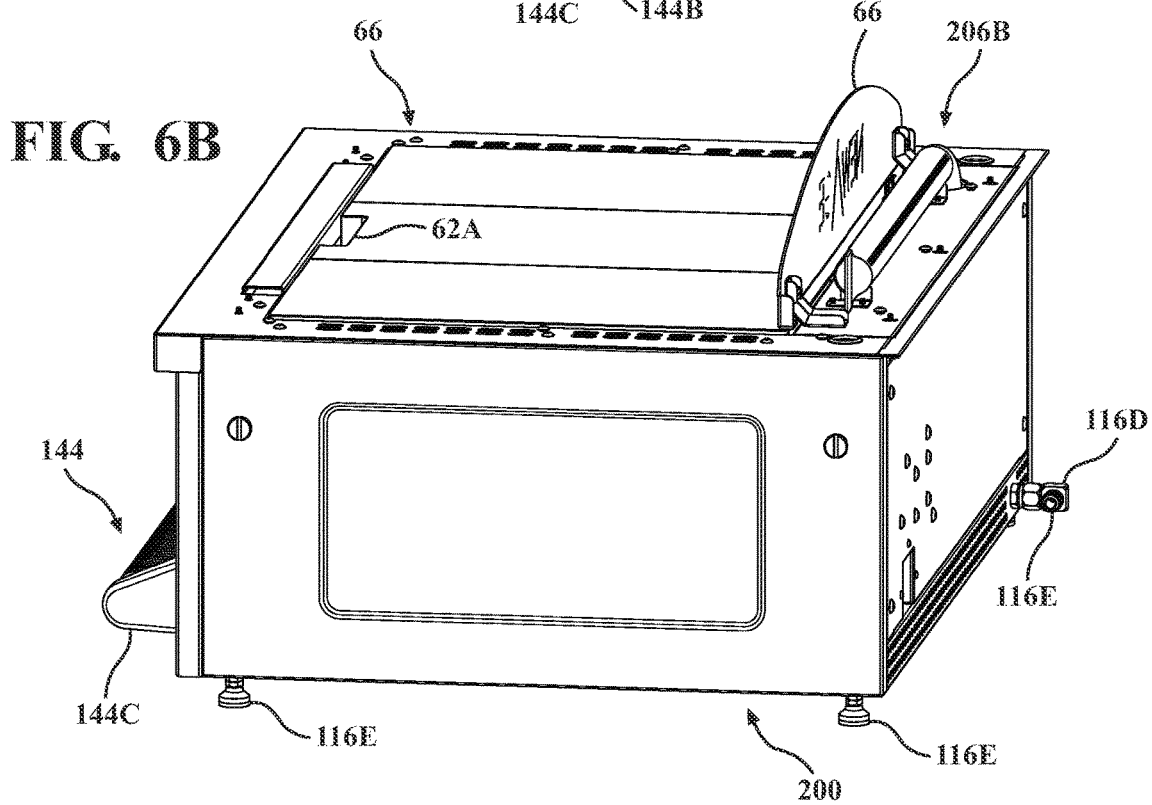
FIG. 6B is a second perspective view of the lower assembly of the oven of FIG. 1A.

With reference to FIGS. 6A-6C, 7A-7D, 8A-8F and 9A-9E, the lower assembly 200 includes an outer enclosure 300, an inner enclosure 400 and the fire box 204. The lower assembly 200 is shown in FIG. 6C without the enclosure 116, the drawer assembly 144, and the ceramic cooking stones 62 to illuminate the interior of lower assembly 200. With specific reference to FIG. 6C, a pair of stone main supports 208 are mounted to the fire box 204 to support the ceramic cooking stones 62.

Figure 7A:
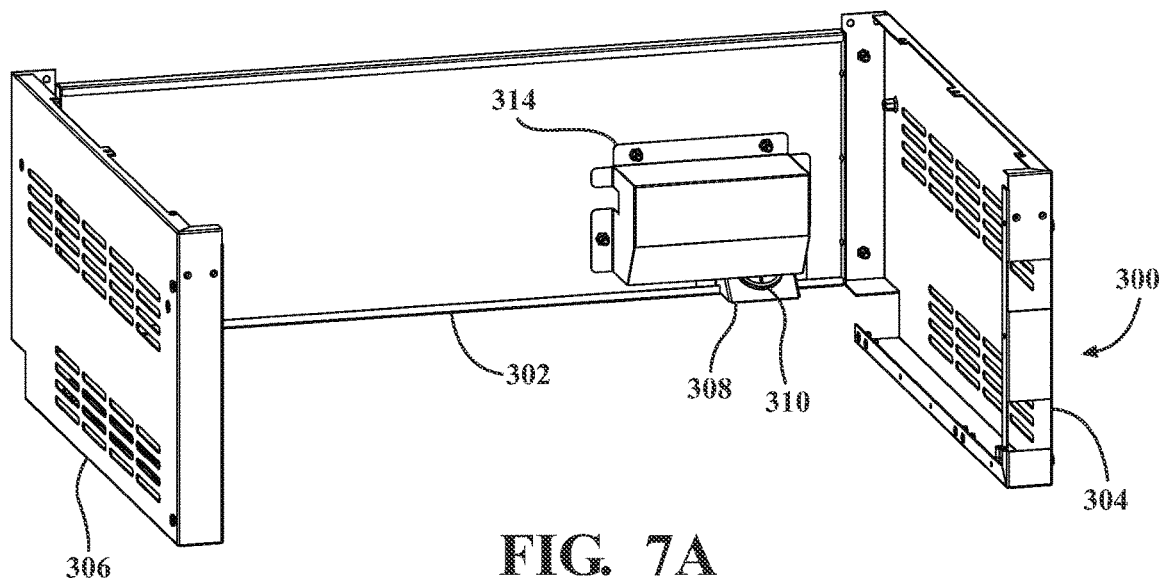
FIG. 7A is a first perspective view of an outer enclosure of the lower assembly of the oven of FIG. 1A.
Figure 7B:
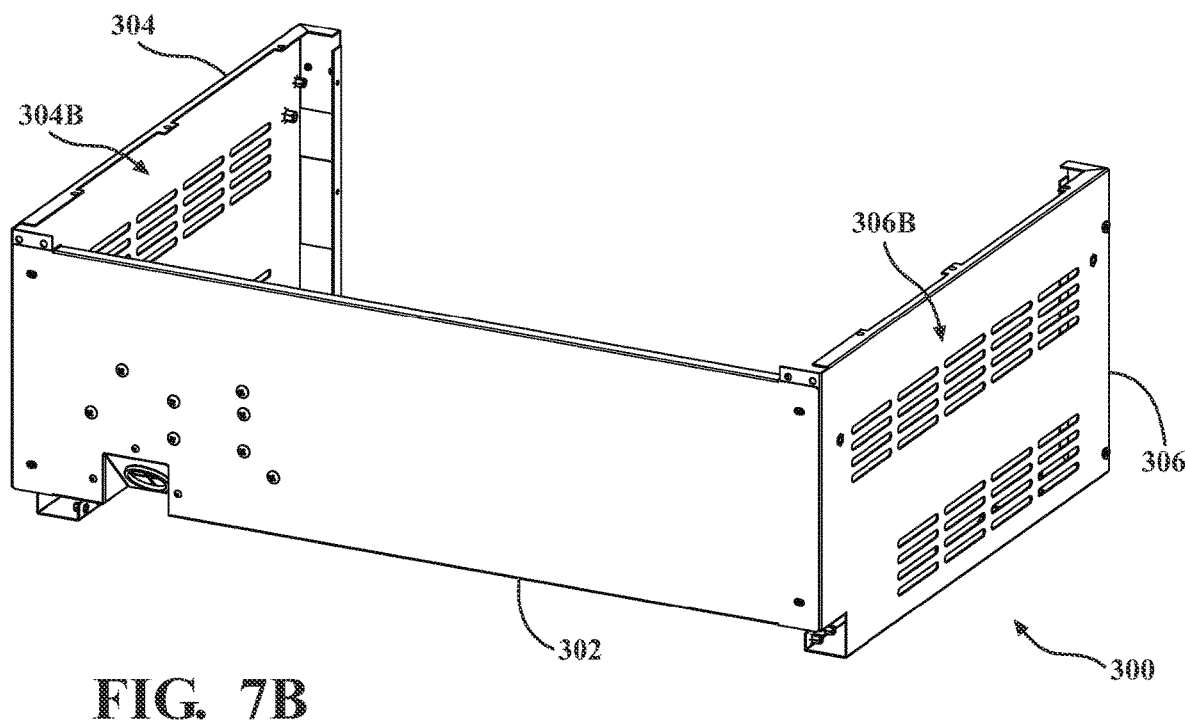
FIG. 7B is a second perspective view of the outer enclosure of FIG. 7A.
Figure 7C:
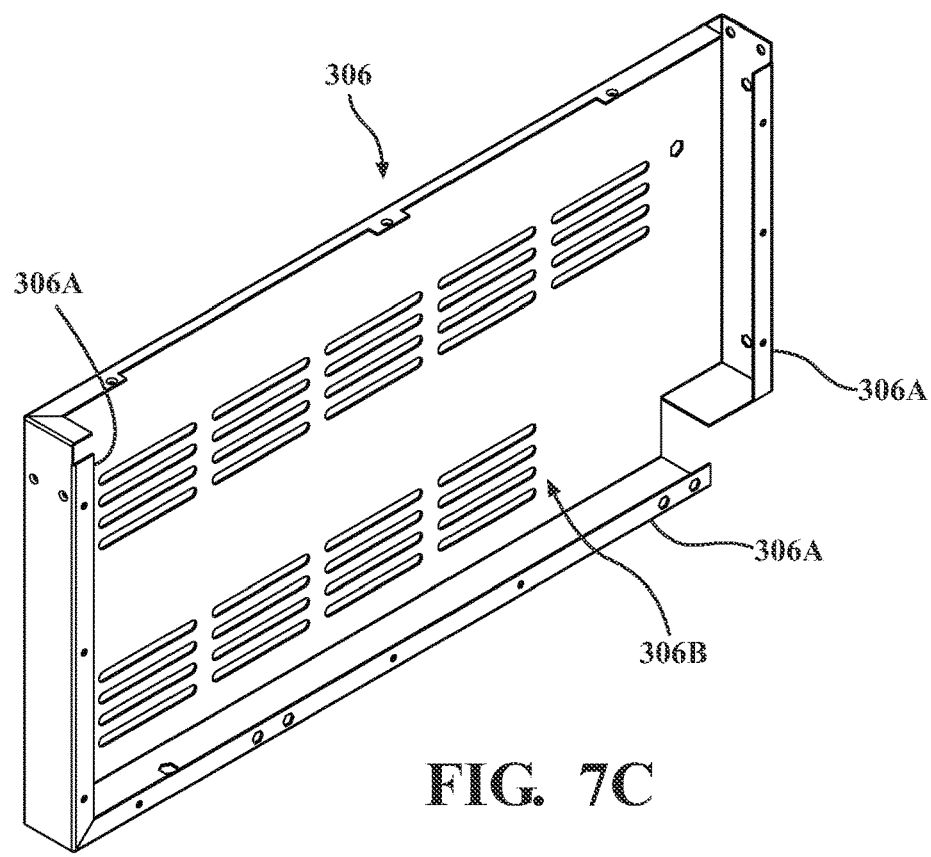
FIG. 7C is a perspective view of a first side panel of the outer enclosure of FIG. 7A.
Figure 7D:
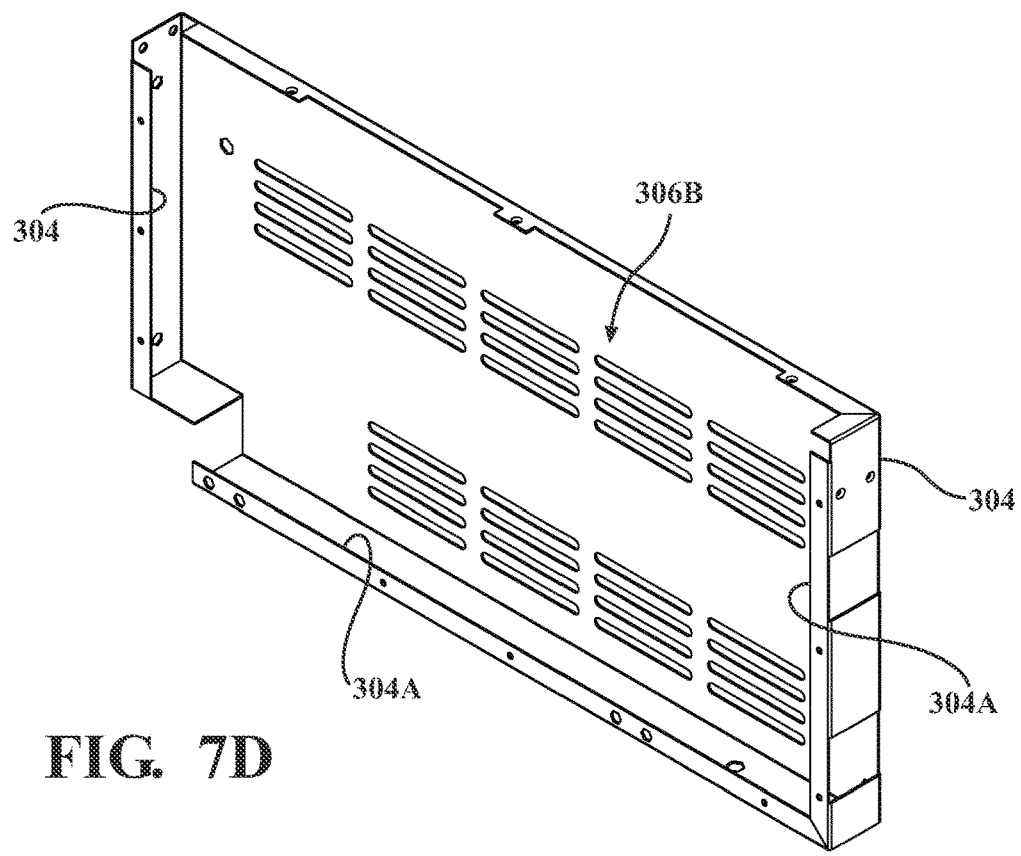
FIG. 7D is a perspective view of a second side panel of the outer enclosure of FIG. 7A.
Figure 7E:
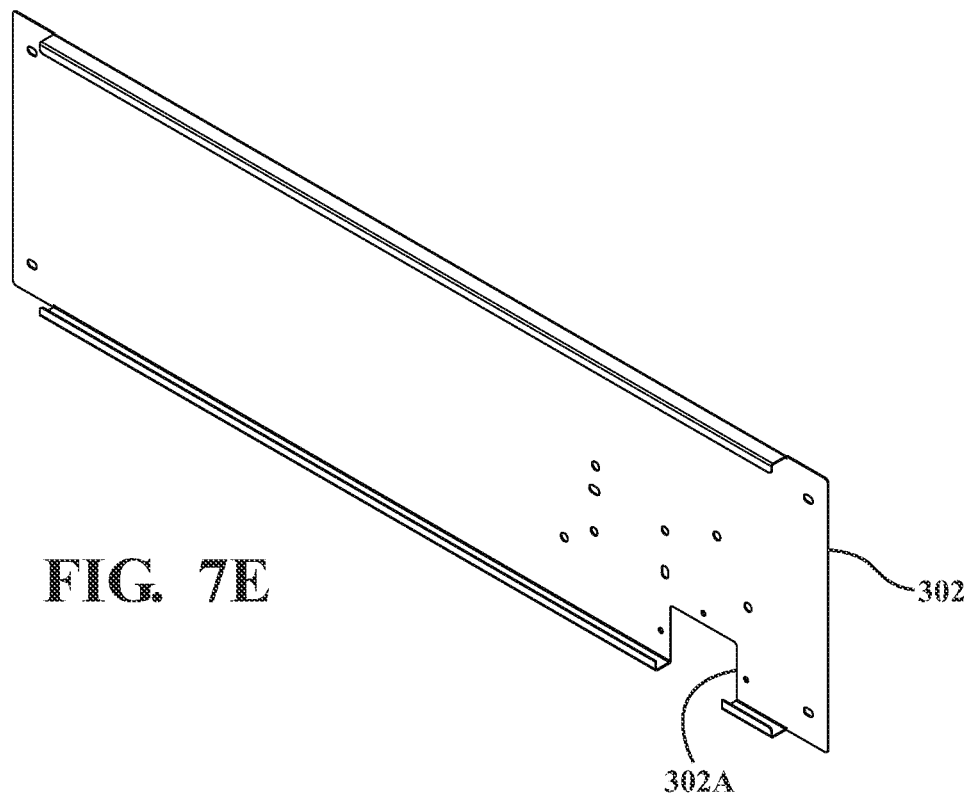
FIG. 7E is a perspective view of a back panel of the outer enclosure of FIG. 7A.
Figure 7F:
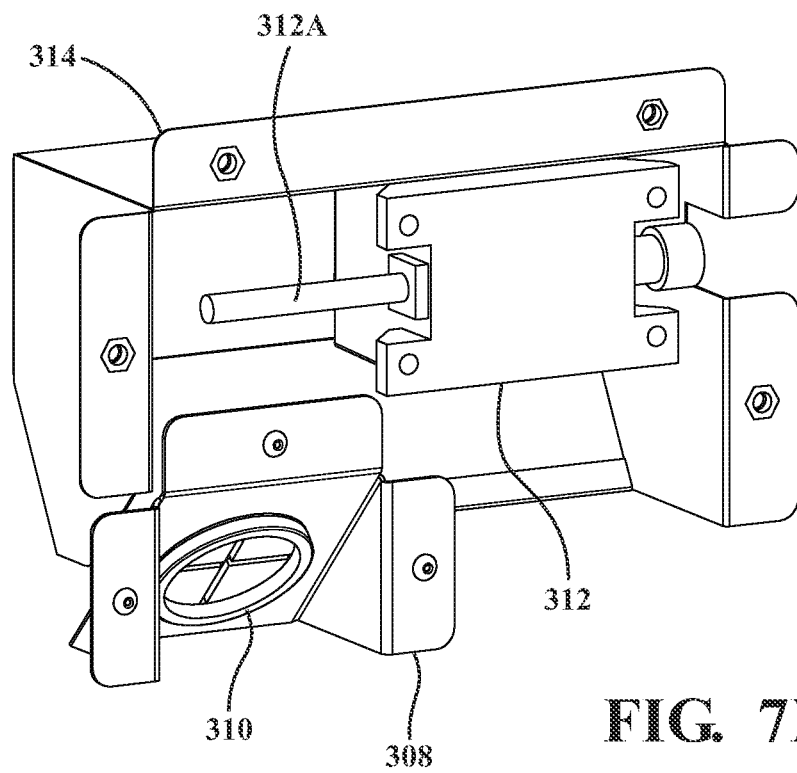
FIG. 7F is a perspective view of a transformer assembly of the outer enclosure of FIG. 7A.
Figure 8A:
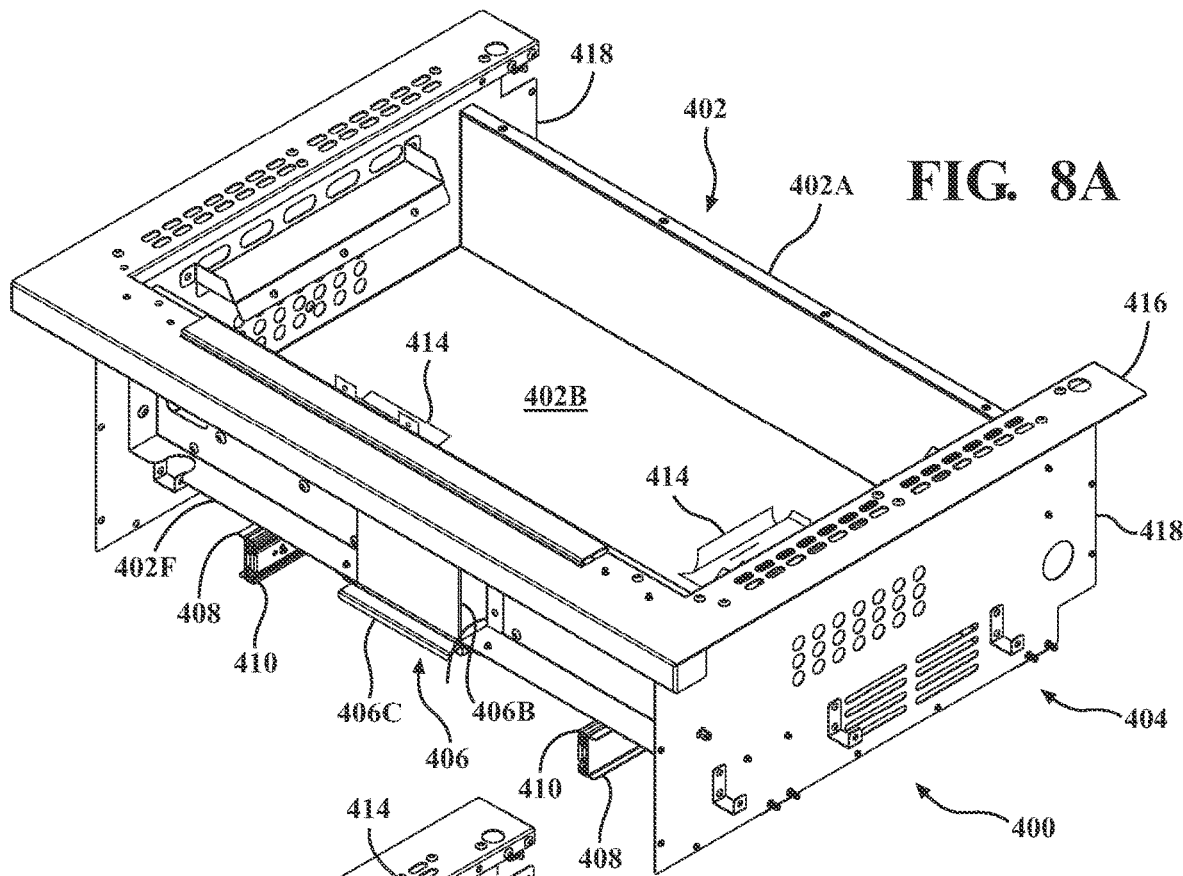
FIG. 8A is a first perspective view of an outer enclosure of the lower assembly of the oven of FIG. 1A.
Figure 8B:
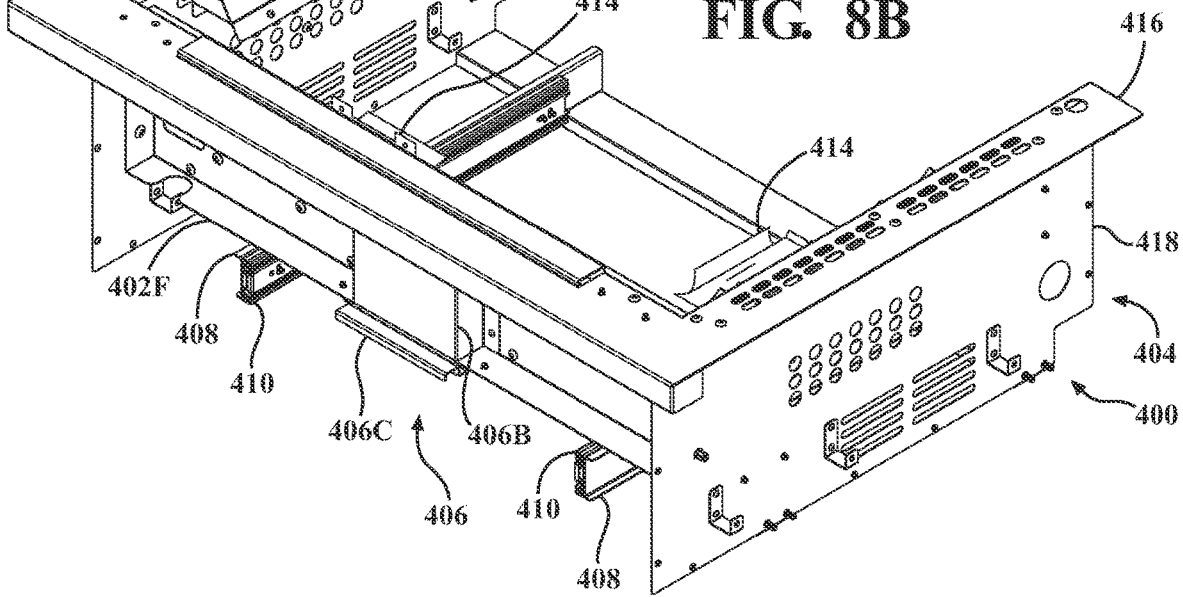
FIG. 8B is a second perspective view of the outer enclosure of FIG. 8A.
Figure 8C:
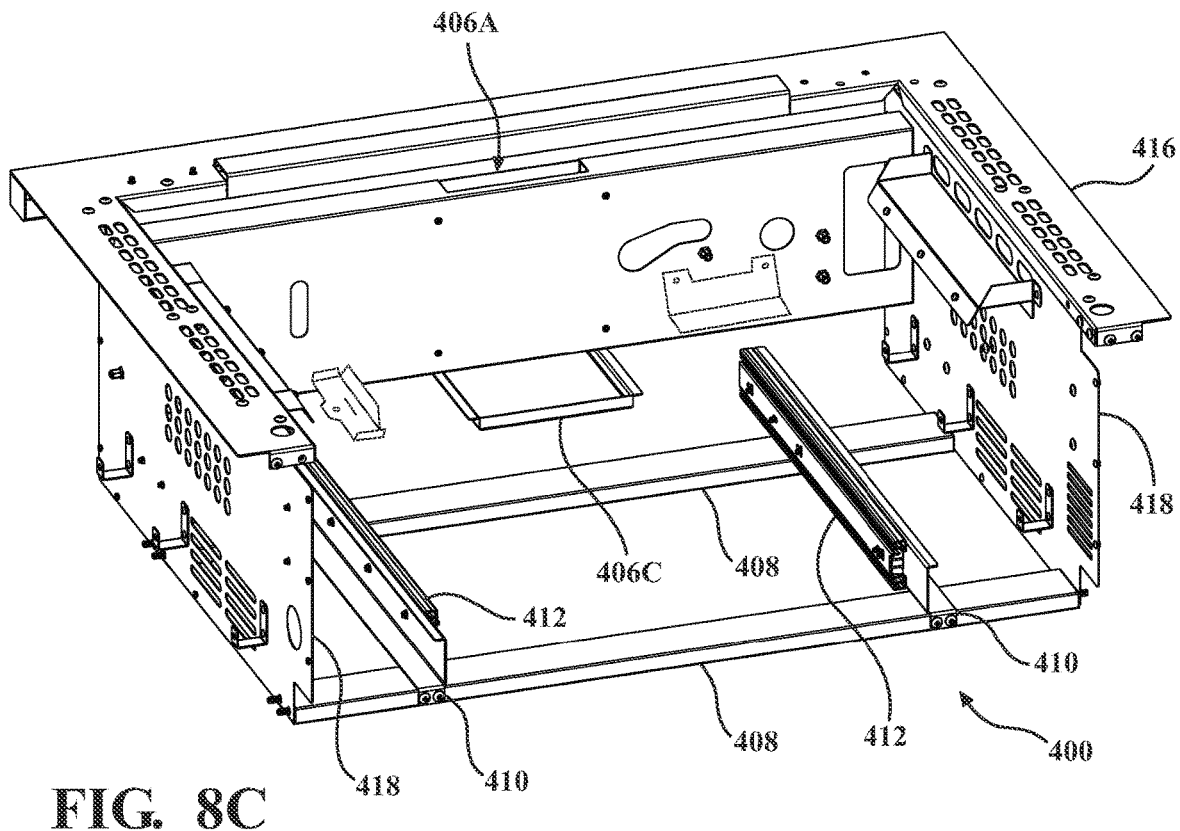
FIG. 8C is a third perspective view of the outer enclosure of FIG. 8A.
Figure 8D:
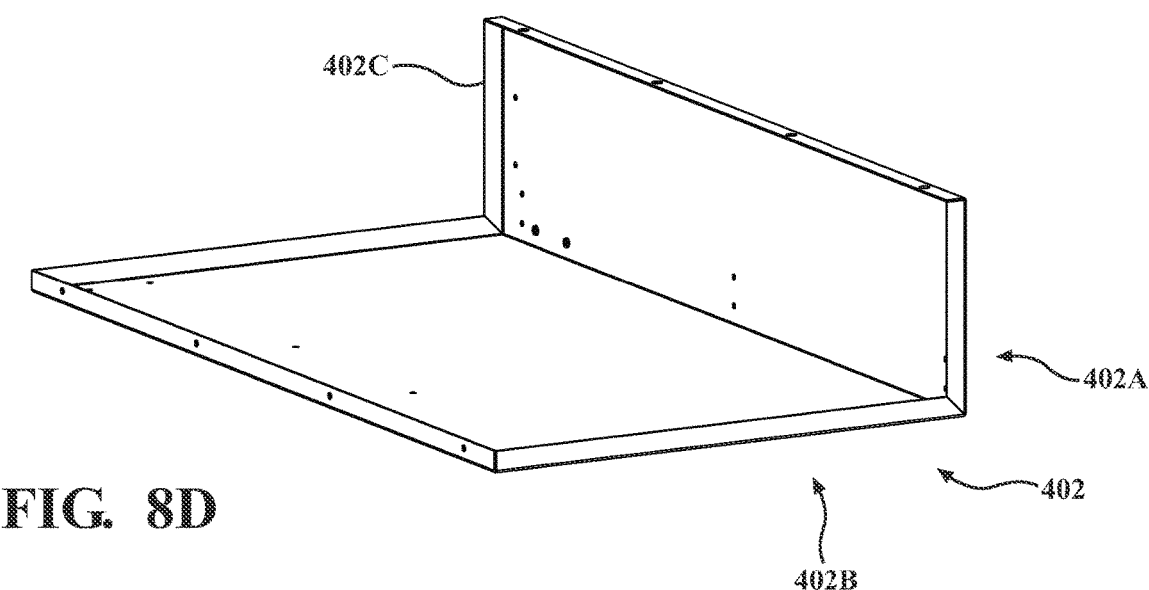
FIG. 8D is a perspective view of a heat shield bottom panel of a heat shield of the outer enclosure of FIG. 8A.
Figure 8E:
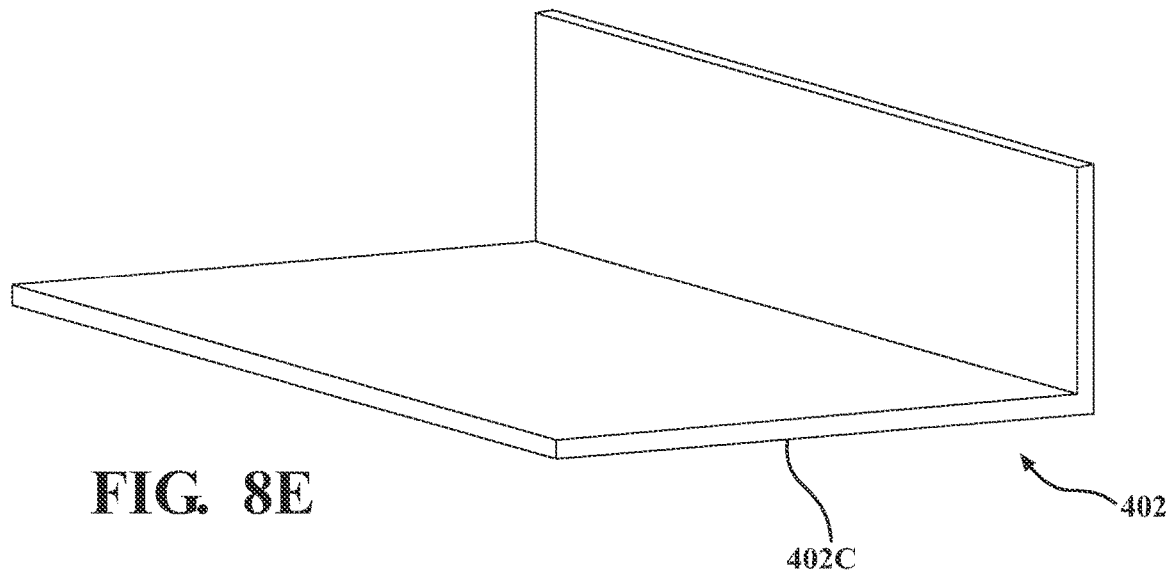
FIG. 8E is a perspective view of a heat shield insulation panel of the heat shield.
Figure 8F:
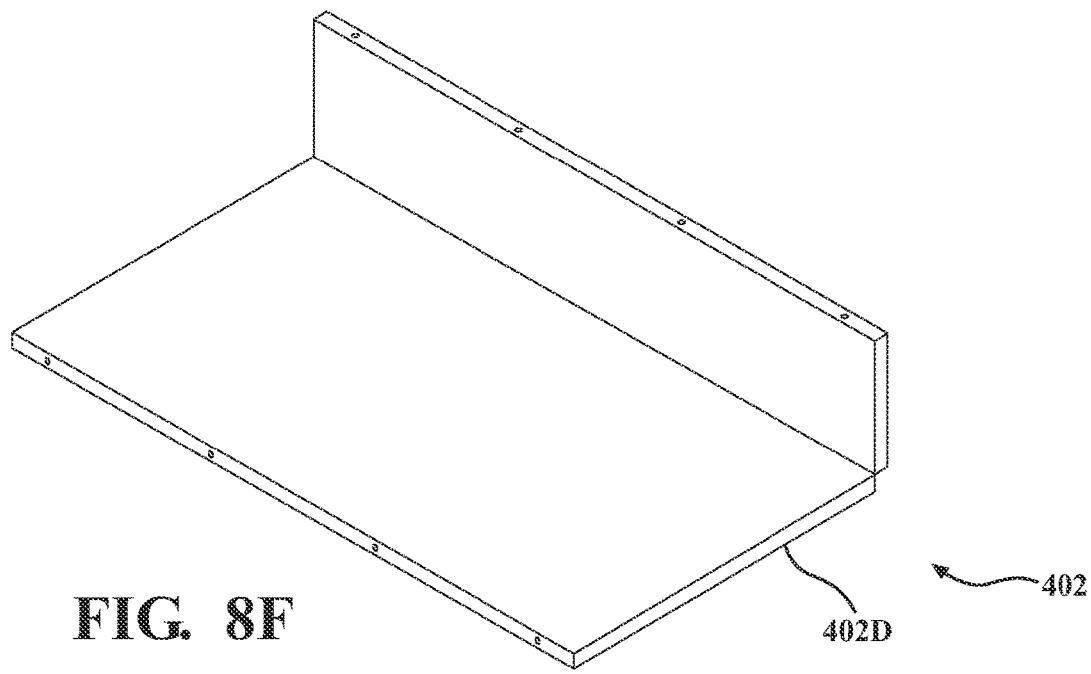
FIG. 8F is a perspective view of a heat shield bottom panel of the heat shield.
Figure 8G:
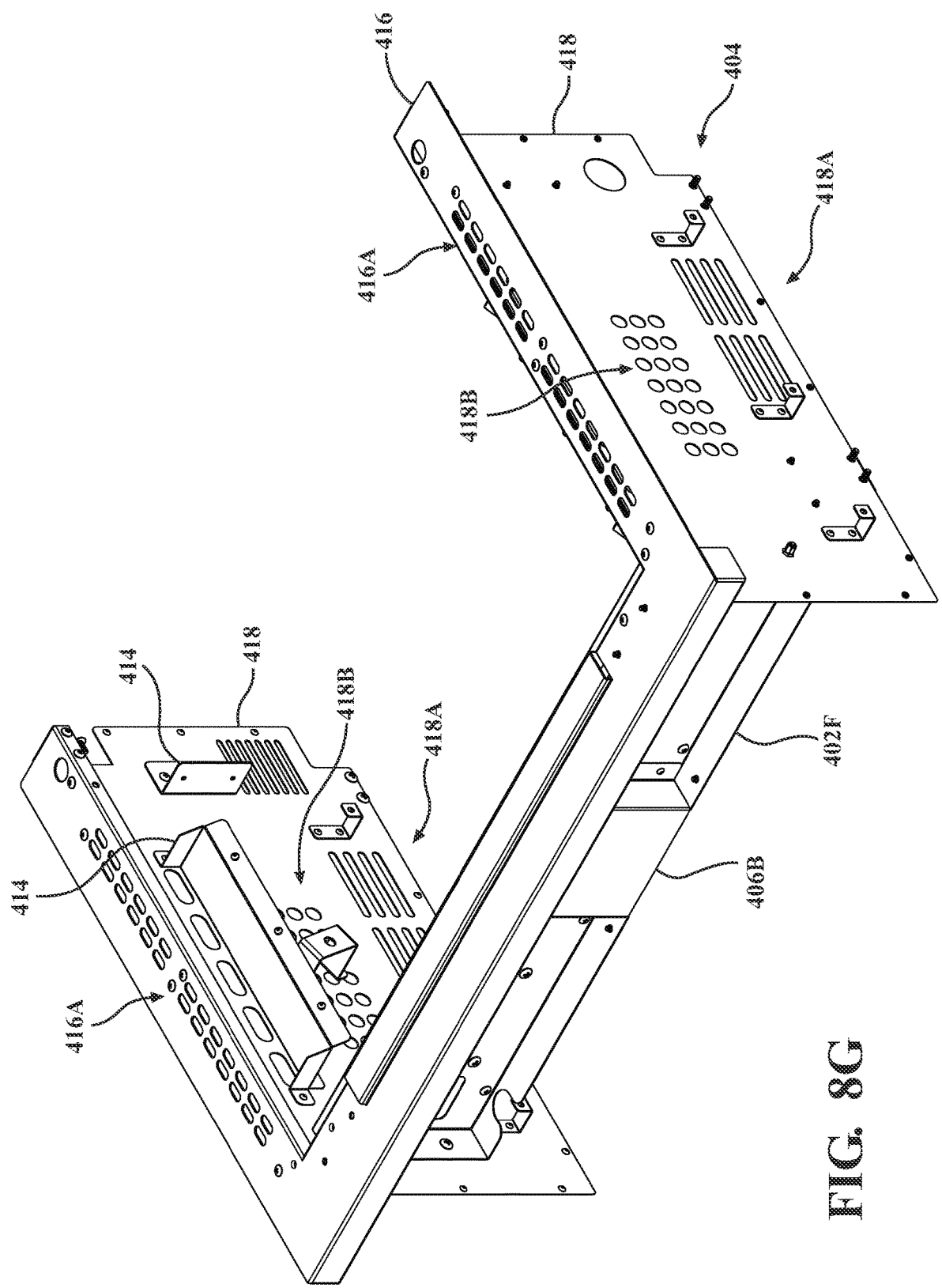
FIG. 8G is a first perspective view of a fire box support structure of the outer assembly of FIG. 8A.
Figure 8H:
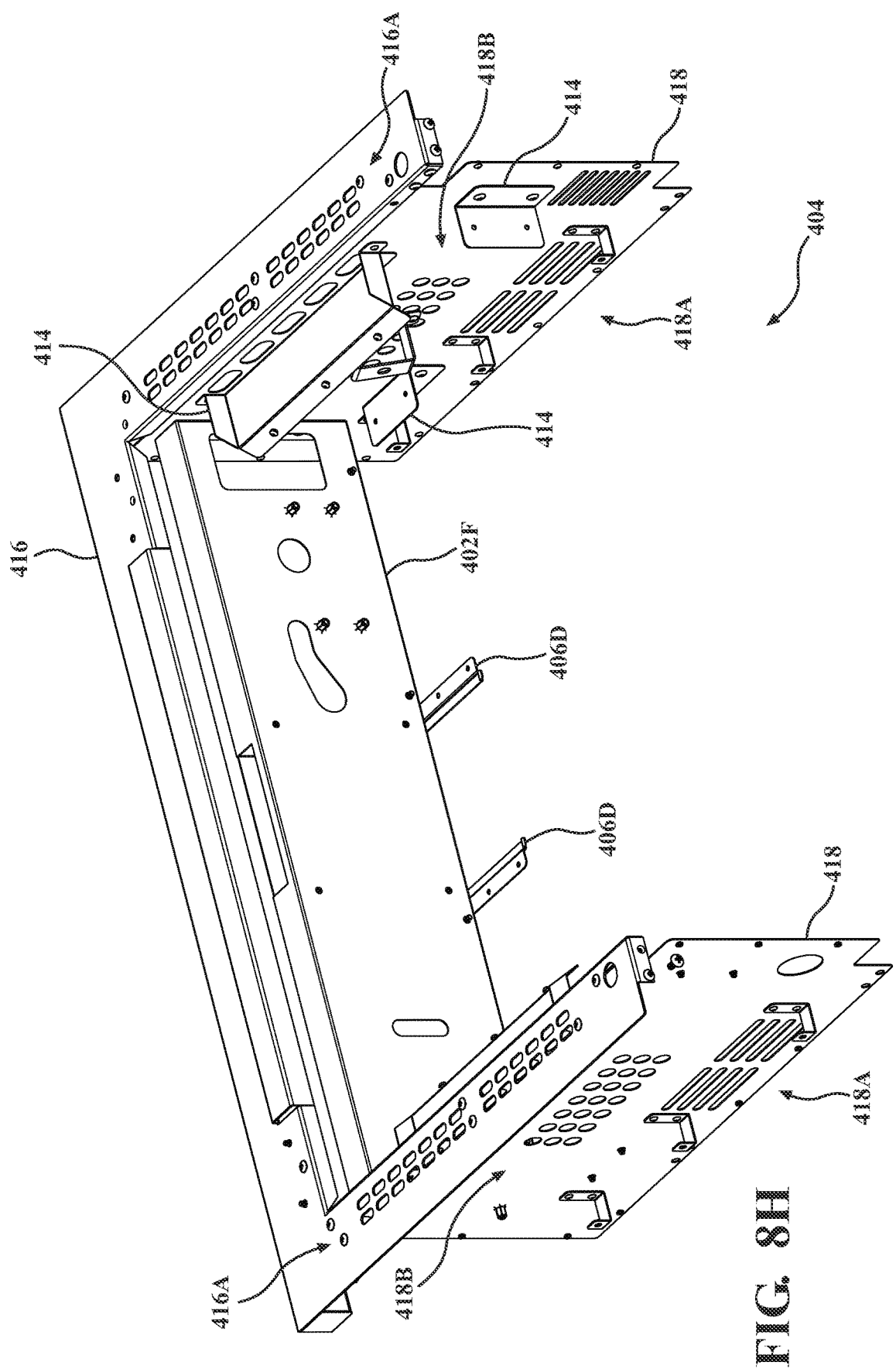
FIG. 8H is a second perspective of the fire box support structure of FIG. 8G.
Figure 9A:
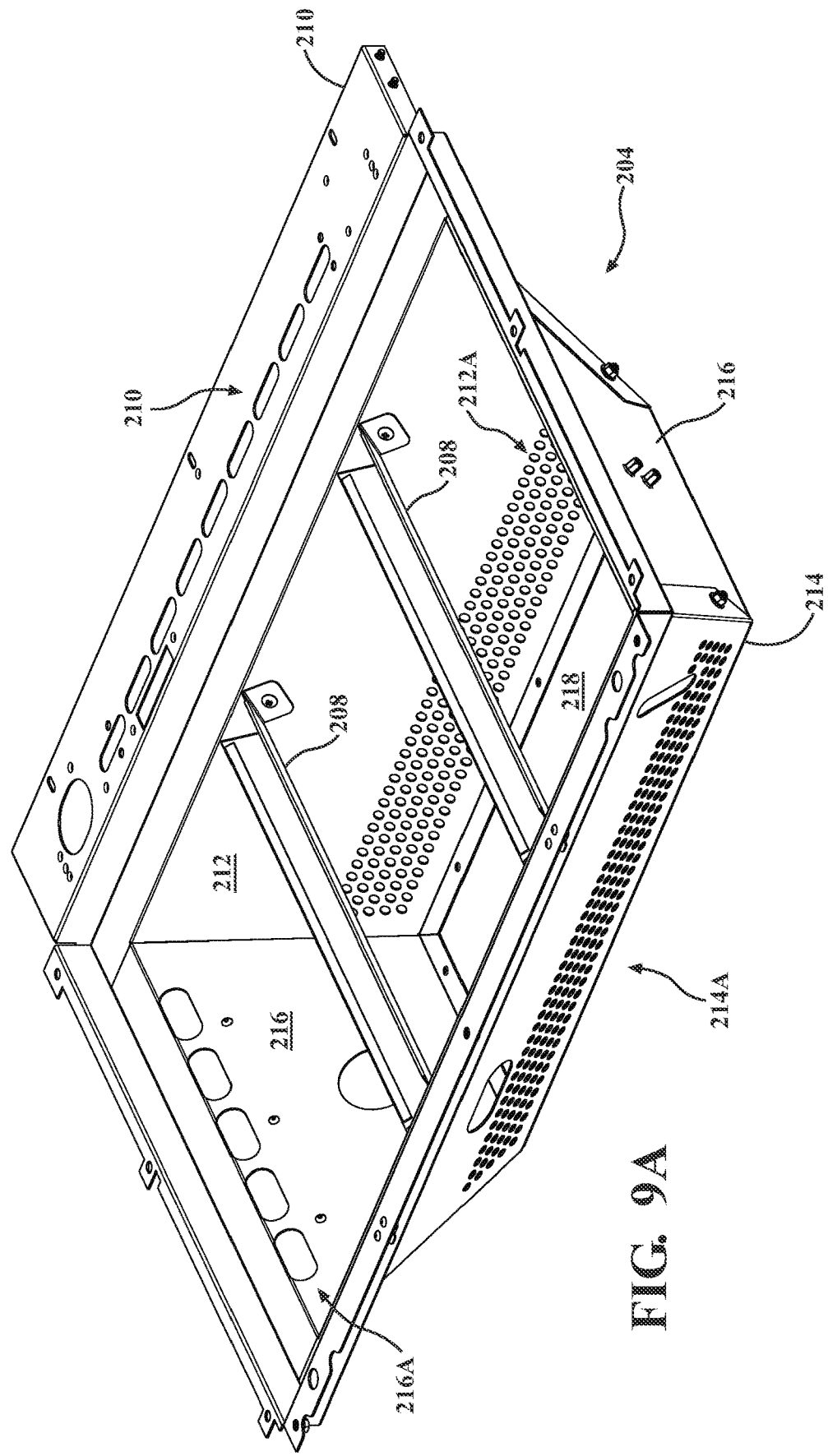
FIG. 9A is a perspective view of a fire box of the oven of FIG. 1A.
Figure 9B:
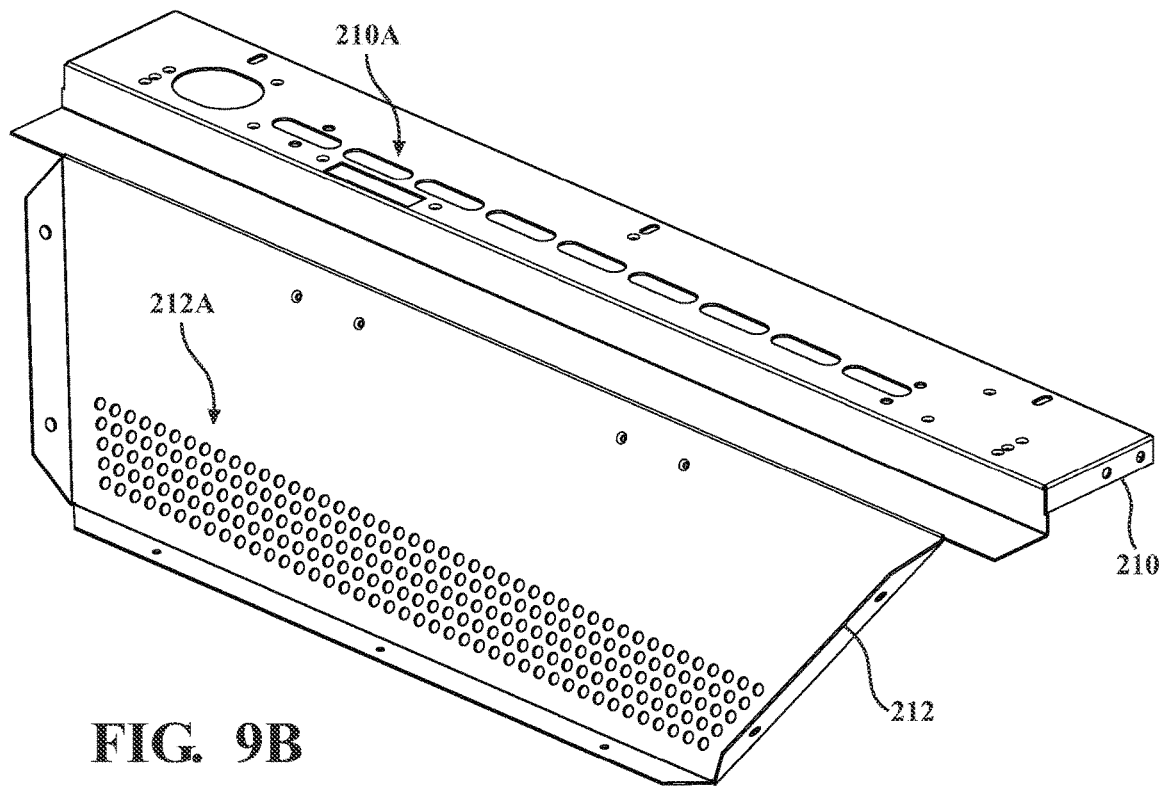
FIG. 9B is a perspective view of a fire box back panel of the fire box of the FIG. 9A.
Figure 9C:
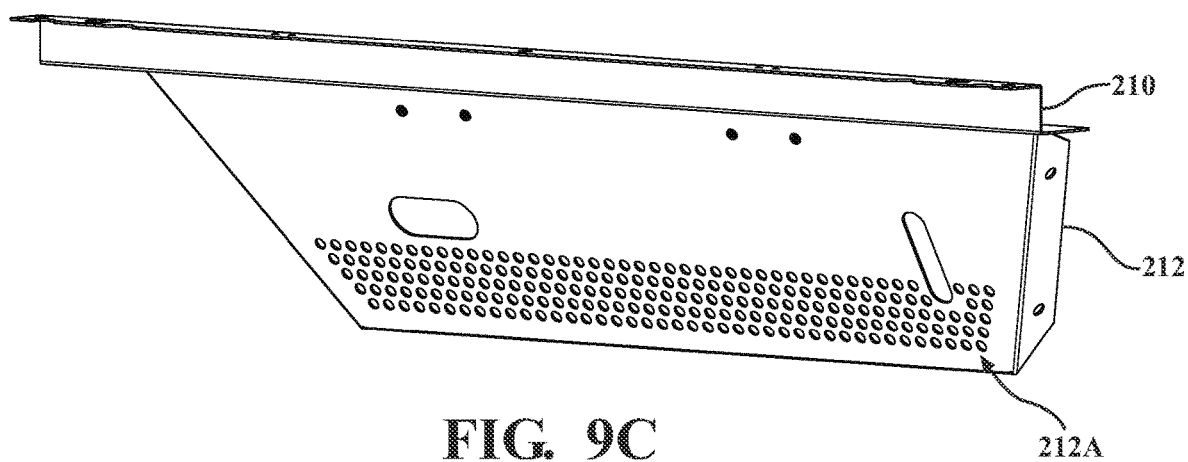
FIG. 9C is a perspective view of a fire box front panel of the fire box of FIG. 9A.
Figure 9D:
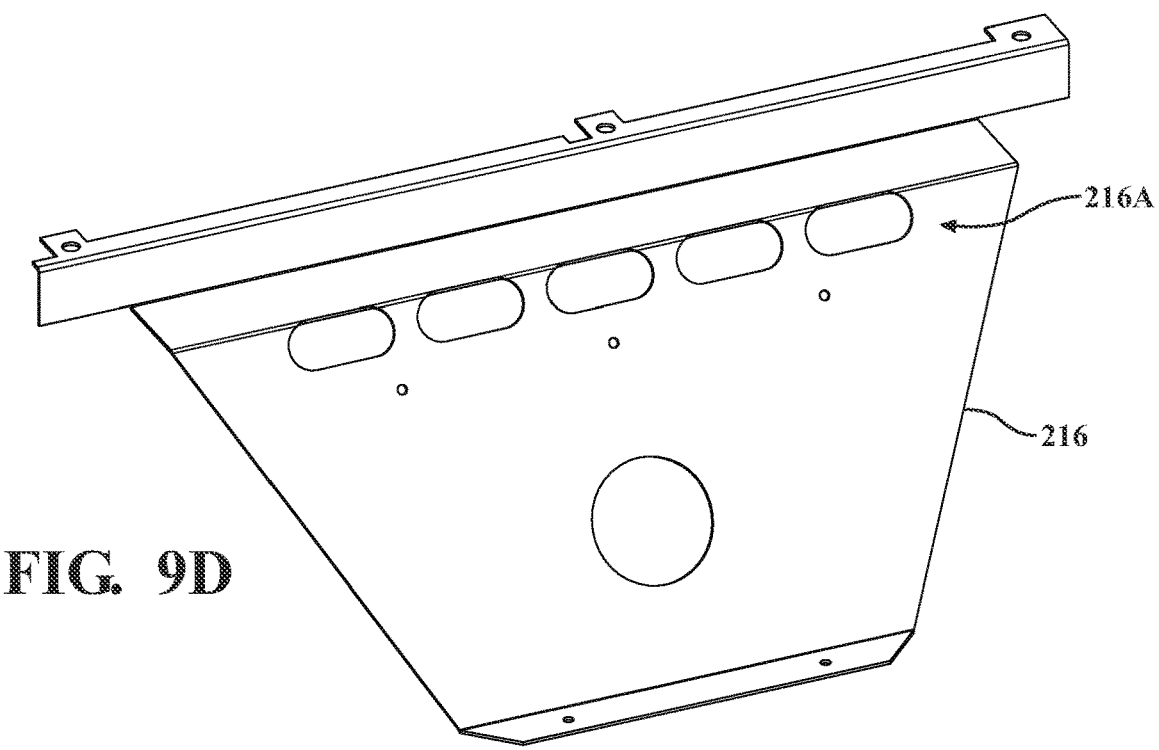
FIG. 9D is a perspective view of a first fire box side panel of the fire box of the FIG. 9A.
Figure 9E:
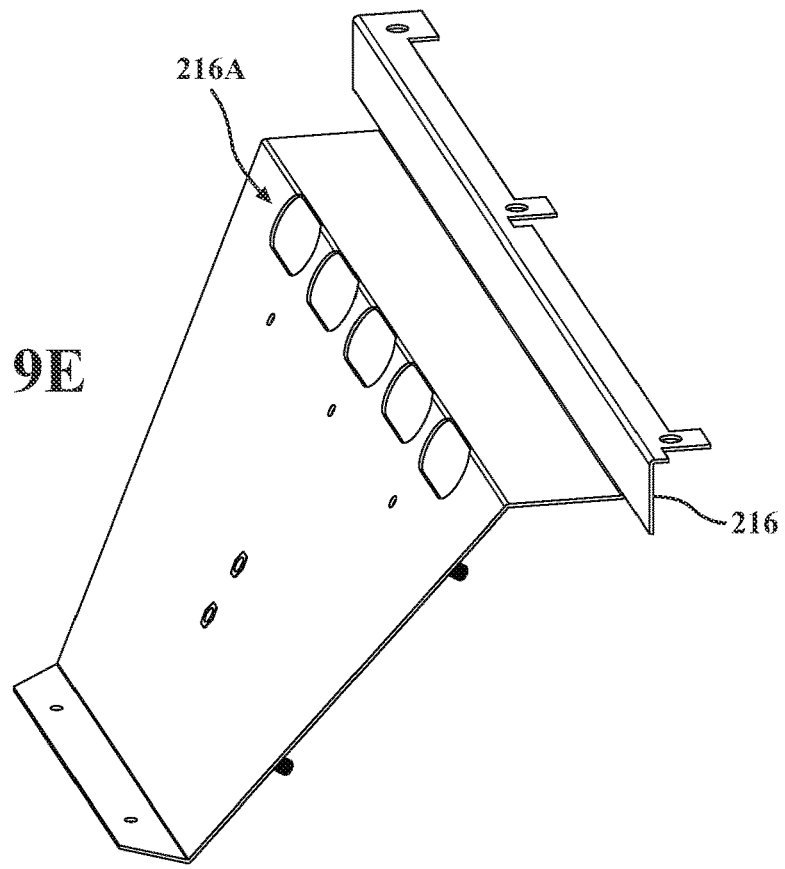
FIG. 9E is a perspective view of a second fire box side panel of the fire box of FIG. 9A.

With specific reference to FIGS. 7A-7C, the outer enclosure 300 includes an outer enclosure back panel 302 and first and second outer enclosure side panels 304, 306. The outer enclosure back panel 302 and first and second outer enclosure side panels 304, 306 are composed from stainless steel held together using appropriate fasteners (not shown). The first and second outer enclosure side panels 304, 306 include a plurality of first and second outer enclosure side panel flanges 304A, 306A and a plurality of side panel vents 304B, 306C. The first and second outer enclosure side panel flanges 304A, 306A includes a plurality of apertures for receiving the fasteners. As explained in further detail below, the side panel vents 304B, 306B allow external ambient air to enter the internal cavity 202 of the lower assembly 200.

The outer enclosure back panel 302 includes an opening 302A. Power is provided to the oven 10 via a transformer 312. The transformer 312 is mounted to a transformer cover 314 which is mounted to the outer enclosure back panel 302 adjacent the opening 302A. An outer back cover plug cover 308 is also mounted to the outer enclosure back panel 302 to provide protection to the internal cavity 202. A cable grommet 310 is positioned within an aperture in the outer back cover plug cover 308. The cable grommet 310 allows passage of a transformer power cord 316 (only a portion of which is shown).

With specific reference to FIGS. 8A-8H, the inner enclosure 400 includes heat shield 402, a fire box support structure 404 and a crumb collection assembly 406. The heat shield 402 provides thermal isolation between the fire box 204 and the rest of the lower assembly 200. The fire box 204 is supported by the fire box support structure 404. The inner enclosure 400 is shown without the heat shield 402 in FIGS. 8B and 8C.

The crumb collection assembly 406 allows crumbs funneled from the top of the cooking stones 62 (via opening 62A in one of the cooking stones 62) into a crumb collection slot 406A down a crumb collection chute 406B and into a removable crumb collection drawer 406C. The removable crumb collection drawer 406D slides along a pair of crumb collection drawer rails 406D mounted to a bottom surface of the fire box support structure 404 (see FIG. 8H). In the illustrated embodiment, the inner enclosure 400 includes a pair of spaced apart bottom support brackets 408 mounted across the bottom of the inner enclosure 400. A pair of spaced apart storage drawer brackets 410 are mounted to the bottom support brackets 408. A pair of storage drawer slides 412 are mounted to the bottom bracket 408. The drawer assembly 144 is mounted or connected to the drawer slides 412 to allow the drawer assembly 144 to be moved from open and closed positions.

In the illustrated embodiment, the heat shield 402 includes an upper vertical portion 402A and a lower horizontal portion 402B. The upper vertical portion 402A extends from a back edge of the lower horizontal portion 402B at a right angle. With specific reference to FIGS. 8D-8F, the heat shield 402 includes a lower pan 402C, an insulation panel 402D, and an upper pan 402E. The lower pan 402C and the upper pan 402E each have an inner cavity 202 and fit together to fully enclose the insulation panel 402D. In one embodiment of the present invention, the lower pan 402C and the upper pan 402E composed of stainless steel and are fastened together using a plurality of fasteners (not shown). A heat shield front panel 402F is mounted to the fire box support structure 404.

As shown in FIGS. 8A-8B and 8G-8H, the fire box support structure 404 includes a number of fire box support brackets 414 mounted to an interior of the fire box support structure 404. The fire box 204 rests within the fire box support structure 404 and is supported by the fire box support brackets 414.

In the illustrated embodiment, the first box support structure 404 includes a fire box support structure top panel 416 and a pair of fire box support structure side panels 418. In the illustrated embodiment, the fire box support structure top panel and side panels 416, 418 are composed from stainless steel and fastened together using a plurality of fasteners (not shown).

As shown, in the illustrated embodiment the fire box support structure top panel 416 includes a plurality of vents 416A located on opposite sides. Further, each fire box support structure side panel 418 includes a plurality of lower vents 418A and a plurality of upper vents 418B.

With reference to FIGS. 9A-9E, the illustrated embodiment the fire box 204 is composed from stainless steel and includes a fire box top panel 210, a fire box rear panel 212, a fire box front panel 214, opposing fire box side panels 216, and a bottom panel 218. The fire box top panel 210 includes a plurality of fire box top panel vents 210A and the fire box rear panel 212 includes a plurality of fire box rear panel vents 212A. Additional, each of the side panels 216 includes a plurality of fire box side panel vents 216A.

Air enters the oven 10 from below the oven 10 and/or through the vents 306B in the side panels 316 of the outer enclosure 300 and the lower and upper vents 418A, 418B of the fire box support structure side panels 418. Then, air enters the fire box 204 via vents 212A. The first and second airflow pathways 110, 112 start within the fire box 204 and exit the fire box 204 through the vents 216A in the fire box side panels 216. Air may also enter the oven 10 via gaps or vents located around the control panel 142A.

The first and second pathways 110, 112 proceeds through the vents 216A at either side of the top panel 216 of the fire box 204. As shown in FIGS. 2A-2B, the first pathway 110 traverses between the outer dome 106 and the inner dome 108. The first pathway 110 ends at the heating vents 114 in the inner walls 108A of the inner dome 108. The second pathway 112 also traverses between the outer dome 106 and the inner dome 108 and terminates at one of the upper and lower vents 118J, 118O in the outer dome top panel 118.

As discussed previously, gas is provided to the oven 10 via the swiveling elbow connector 116D. With reference to FIG. 10, gas is controllably provided to the first and second gas burners 206A, 206B using the first and second burner knob assemblies 20, 22 and a valve assembly 320. The valve assembly 320 includes a gas manifold 322 and first and second manifold burner valves 324, 326. The gas manifold 322 is connected to the swiveling elbow connector 116D via a first hose adapter 328, a first corrugated hose 330 and a second hose adapter 332. The first and second burner knob assemblies 20, 22 are mounted to respective stems 324A, 326A of the first and second manifold burner valves 324, 326. The gas manifold 322 is mounted to the fire box 204 via a pair of gas mounting brackets 338.

In the illustrated embodiment, the main gas burner 206A is an H-shaped burner having rated at 18,000 BTU. A burner air shutter 340 is connected to an input end of the H-shaped gas burner 206A. A burner orifice connector 342 is connected to the burner air shutter 340. A second corrugated hose (not shown) is between an output end 324B of the first manifold burner valve 324 and the burner orifice connector 342 via a third hose connector 334.

A first igniter assembly 344 is coupled to the first burner knob assembly 20. The first burner knob assembly 20 controllably supplies gas to the first gas burner 206A which then may be ignited by the first igniter assembly 344 using the first ignition button 24.

Figure 11:
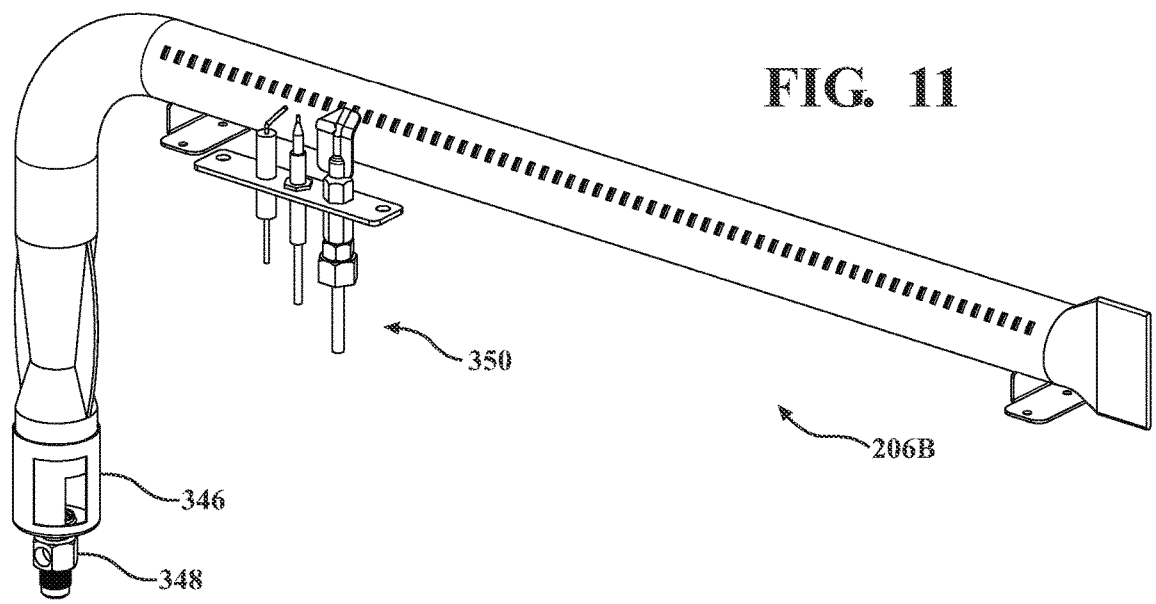
FIG. 11 is a perspective view of a rear burner of the oven of FIG. 1A.
Figure 12:
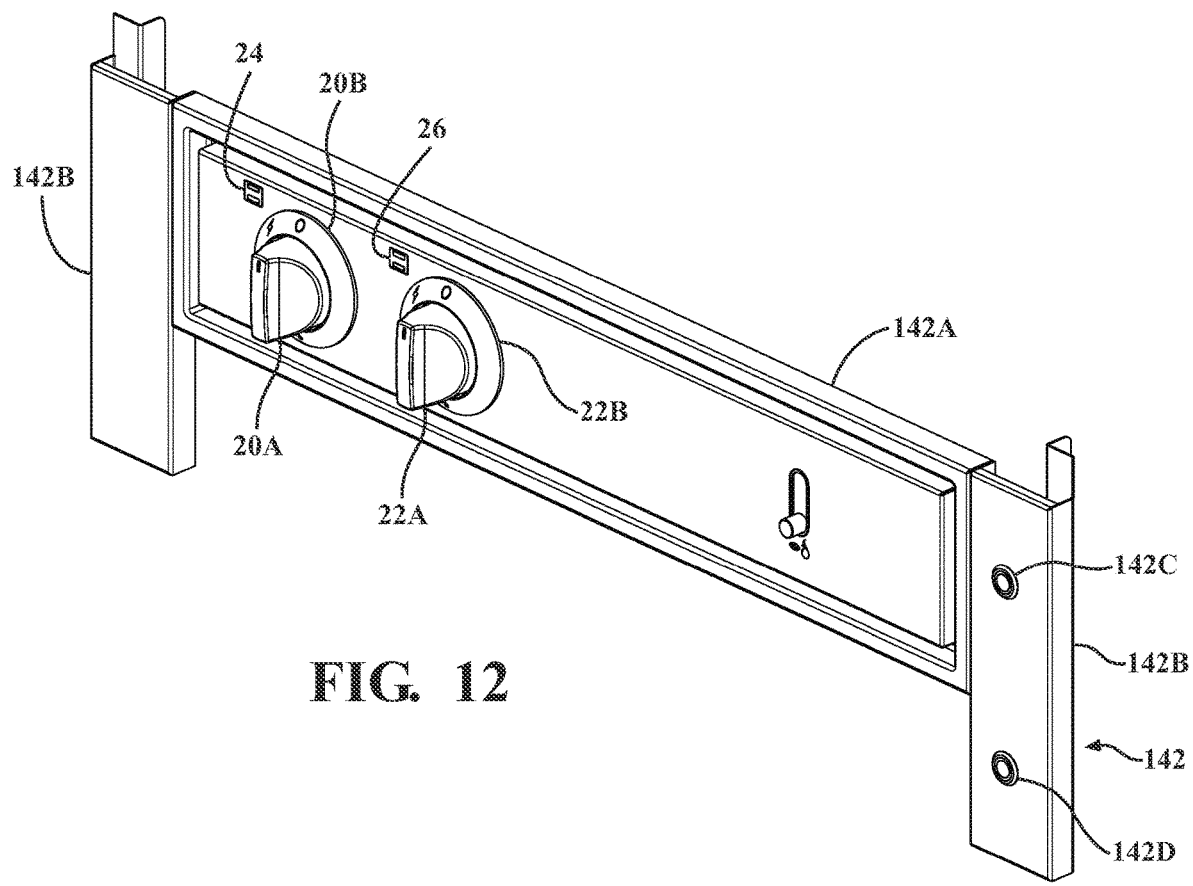
FIG. 12 is a perspective view of a control panel assembly of the oven of FIG. 1A; and, FIG. 13 is a perspective view of a drawer assembly of the oven of FIG. 1A.

With reference to FIGS. 10 and 11, in the illustrated embodiment a second burner air shutter is connected to an end of the second burner 206B. A second burner orifice connector 348 is connected to the second burner air shutter 346. A third corrugated hose (not shown) is connected between an output end 326B of the second manifold burner valve 326A (via a fourth hose adapter 336) and the second burner orifice connector 348. A second igniter assembly 350 is coupled to the second burner knob assembly 22. The second burner knob assembly 22 controllably supplies gas to the second gas burner 206B which then may be ignited by the second igniter assembly 350 using the second ignition button 26.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An oven, comprising:
an upper assembly having an upper portion and a bottom, and the upper assembly forming a cooking chamber and having a front side with an open entry to the cooking chamber;
a lower assembly located below the upper assembly with the lower assembly having an internal cavity;
a fire box located within the internal cavity of the lower assembly and having a first heat source;
a heat absorbing and emanating device located between the upper and lower assemblies and being configured to absorb heat from the heat source and emanate heat into the cooking chamber of the upper assembly; and
a see-through slide indicator having an indicator knob mounted within a single opening in the lower assembly, the indicator knob moveable within the single opening between an open position and a closed position with the firebox viewable within the internal cavity through the single opening when the indicator knob is in the open position.

2. An oven, comprising:
an upper assembly having an upper portion and a bottom, and the upper assembly forming a cooking chamber and having a front side with an open entry to the cooking chamber;
a lower assembly located below the upper assembly with the lower assembly having an internal cavity;
a fire box located within the internal cavity of the lower assembly and having a first heat source; and,
a heat absorbing and emanating device located between the upper and lower assemblies and being configured to absorb heat from the heat source and emanate heat into the cooking chamber of the upper assembly,
wherein the upper assembly includes an outer dome and an inner dome with the inner dome being located within the outer dome and forming first and second airflow pathways disposed between the inner and outer domes, each of the first and second airflow pathways having an open end located at the bottom of the upper assembly and being open to the internal cavity of the lower assembly with the first airflow pathway having a second end terminating at a vent located on an inner wall of the inner dome and configured to allow heated air from the heat source to enter the cooking chamber, and the second airflow pathway having a second end terminating in the upper portion of the upper assembly,
wherein the inner dome of the upper assembly further includes an inner dome upper portion coupled to the inner wall of the inner dome, with the inner dome upper portion having a top surface and a plurality of side panels extending from the top surface, and
wherein the top surface is closed such that the heated air within the cooking chamber of the inner dome is unable to exit through the top surface of the inner dome upper portion.

3. An oven, as set forth in claim 2, wherein the heat absorbing and emanating device includes at least one ceramic stone.

4. An oven, as set forth in claim 2, further including a second heat source located within the upper assembly for heating the cooking chamber.

5. An oven, as set forth in claim 4, further including a heat guard located between the second heat source and the cooking chamber.

6. An oven, as set forth in claim 2, wherein the upper assembly includes at least one exhaust vent located within the upper portion of the upper assembly near the second end of the second airflow path for allowing heated gas to exit the oven.

7. An oven, as set forth in claim 2, further including a thermometer for sensing a temperature associated with the cooking chamber.

8. An oven, as set forth in claim 7, wherein the thermometer includes an indicator for providing a visual indication of the temperature and a stem extending from the indicator into the cooking chamber.

9. An oven, as set forth in claim 2, further including at least one removable door rotatably coupled to the upper assembly within the open entry.

10. An oven, as set forth in claim 2, wherein the inner dome includes at least one insulation pad configured to retain heat within the cooking chamber.

11. An oven, as set forth in claim 2, wherein the outer dome forms an exterior of the upper assembly, the inner dome forms at least a portion of the cooking chamber, the first and second airflow pathways being located between the inner and outer domes.

12. An oven, as set forth in claim 11, wherein the inner dome includes at least one lower portion side panel, wherein the first and second airflow pathways are located between the exterior of the upper assembly and the at least one lower portion side panel.

13. An oven, as set forth in claim 11, wherein the inner dome includes first and second lower portion side panels located on opposite sides of the inner dome, wherein the first and second airflow pathways are located between the exterior of the upper assembly and each lower portion side panel.

14. An oven, as set forth in claim 13, wherein the heating vent is located within each of the side panels.

15. An oven, as set forth in claim 11, wherein the outer dome includes an outer dome top panel, the outer dome top panel having a rectangular shape defined by front, back and first and second side panels, the outer dome top panel further including a rectangular top surface and a plurality of sloping walls, each sloping wall extending from an edge of the rectangular top surface to a respective one of the front, back and side panels.

16. An oven, as set forth in claim 15, including a first exhaust vent located in one of the sloping walls, the second airflow path ending at the first exhaust vent.

17. An oven, as set forth in claim 16, the outer dome top panel including at least one flange facing downward and extending from a respective one of the front, back and side panels, the at least one flange including a second exhaust vent.

18. An oven, as set forth in claim 16, wherein one of the plurality of side panels includes an exhaust opening to permit heated air to exit the cooking chamber and route the heated air towards the first exhaust vent located in one of the sloping walls of the outer dome.

19. An oven, as set forth in claim 15, wherein the upper assembly further includes a second heat absorbing and emanating device within the second airflow pathway and located adjacent a top portion of the cooking chamber.

20. An oven, as set forth in claim 2, wherein one of the plurality of side panels includes an exhaust opening to permit heated air to exit the cooking chamber.

21. An oven, as set forth in claim 2, wherein the top surface includes an opening, and further comprising a ceramic cooking stone resting upon the top surface such that the ceramic cooking stone is exposed to the cooking chamber.

22. An oven, comprising:
an upper assembly having an upper portion and a bottom, and the upper assembly forming a cooking chamber and having a front side with an open entry to the cooking chamber;
a lower assembly located below the upper assembly with the lower assembly having an internal cavity;
a fire box located within the internal cavity of the lower assembly and having a first heat source;
a second heat source located within the upper assembly for heating the cooking chamber;
a heat guard located between the second heat source and the cooking chamber;
a thermometer coupled to the lower assembly for sensing a temperature associated with the cooking chamber;
at least one removable door rotatably coupled to the upper assembly within the open entry; and,
a heat absorbing and emanating device located between the upper and lower assemblies and being configured to absorb heat from the heat source and emanate heat into the cooking chamber of the upper assembly,
wherein the upper assembly includes an outer dome and an inner dome with the inner dome being located within the outer dome and forming first and second airflow pathways disposed between the inner and outer domes, each of the first and second airflow pathways having an open end located at the bottom of the upper assembly and being open to the internal cavity of the lower assembly with the first airflow pathway having a second end terminating at a vent located on an inner wall of the inner dome and configured to allow heated air from the heat source to enter the cooking chamber, and the second airflow pathway having a second end terminating in the upper portion of the upper assembly, wherein the upper assembly further includes at least one exhaust vent located within the upper portion of the upper assembly in the outer dome near the second end of the second airflow path for allowing heated gas to exit the oven, wherein the outer dome forms an exterior of the upper assembly, the inner dome forms at least a portion of the cooking chamber, the first and second airflow pathways being located between the inner and outer domes,
wherein the inner dome of the upper assembly further includes an inner dome upper portion coupled to the inner wall of the inner dome, with the inner dome upper portion having a top surface and a plurality of side panels extending from the top surface, and
wherein the top surface is closed such that the heated air within the cooking chamber of the inner dome is unable to exit through the top surface of the inner dome upper portion.

* * * * *